(12) United States Patent
Wesley, Sr. et al.

(10) Patent No.: US 10,691,715 B2
(45) Date of Patent: Jun. 23, 2020

(54) DYNAMICALLY INTEGRATED DISPARATE COMPUTER-AIDED DISPATCH SYSTEMS

(71) Applicant: Tellus Safety Solutions, LLC, Bountiful, UT (US)

(72) Inventors: Jonathan K Wesley, Sr., Bountiful, UT (US); Erik Cooley, Layton, UT (US); Nathan Daniels, Woods Cross, UT (US); John Harding, Bountiful, UT (US); Andrew Horlacher, Sandy, UT (US); Ryan McAlister, Salt Lake City, UT (US); Ryan Sealy, Layton, UT (US); Brian Taylor, Bountiful, UT (US)

(73) Assignee: CentralSquare Technologies, LLC, Lake Mary, FL (US)

( * ) Notice: Subject to any disclaimer, the term of this patent is extended or adjusted under 35 U.S.C. 154(b) by 226 days.

(21) Appl. No.: 15/289,883

(22) Filed: Oct. 10, 2016

(65) Prior Publication Data
US 2017/0024449 A1    Jan. 26, 2017

Related U.S. Application Data

(63) Continuation of application No. 14/473,896, filed on Aug. 29, 2014, now Pat. No. 9,465,839, which is a (Continued)

(51) Int. Cl.
*G06F 16/00* (2019.01)
*G06F 16/25* (2019.01)
(Continued)

(52) U.S. Cl.
CPC .............. *G06F 16/258* (2019.01); *G06F 8/65* (2013.01); *G06F 15/173* (2013.01); *G06F 16/245* (2019.01); *H04L 67/34* (2013.01)

(58) Field of Classification Search
None
See application file for complete search history.

(56) References Cited

U.S. PATENT DOCUMENTS

| 5,524,253 A | * | 6/1996 | Pham ........................ G06F 9/46 |
| | | | 703/27 |
| 5,884,312 A | * | 3/1999 | Dustan ................ H04L 63/0428 |

(Continued)

FOREIGN PATENT DOCUMENTS

| WO | WO 2005/084362 A2 | 9/2005 |
| WO | WO 2006/055899 A2 | 4/2007 |

OTHER PUBLICATIONS

Luo et al., "Integrating Wireless LAN and Cellular Data for the Enterprise", IEEE Internet Computing, vol. 7, Issue 2, Mar. 2003, pp. 25-33.

*Primary Examiner* — Polina G Peach
(74) *Attorney, Agent, or Firm* — David B. Tingey; Bryant J. Keller; Kirton McConkie

(57) ABSTRACT

Systems and methods for dynamically integrating disparate computer-aided dispatch (CAD) systems are disclosed. The systems and methods provide bi-directional interoperability between disparate CAD systems and maintain stateful ongoing interactions between interconnected CAD systems. Information objects in one CAD system are associated and bound to related objects in other CAD systems through a centralized information hub that transforms data items intelligently to facilitate communication and interaction between the CAD systems connected to the hub. The described systems and methods maintain complete and current perspectives of all relevant information for each CAD system connected to the information hub, thereby eliminating the need for point-to-point intelligence maintained by the CAD systems about the other interconnected CAD systems. As information updates are passed from CAD systems to the (Continued)

information hub and back out to other CAD systems, the information hub transforms and evaluates the information updates ensuring that only necessary information updates are forwarded.

22 Claims, 27 Drawing Sheets

Related U.S. Application Data continuation of application No. 13/215,196, filed on Aug. 22, 2011, now Pat. No. 8,825,795, which is a continuation of application No. 12/252,067, filed on Oct. 15, 2008, now Pat. No. 8,005,937, which is a continuation-in-part of application No. 11/070,391, filed on Mar. 1, 2005, now abandoned.

(60) Provisional application No. 60/549,432, filed on Mar. 2, 2004, provisional application No. 60/549,427, filed on Mar. 2, 2004, provisional application No. 60/602,470, filed on Aug. 18, 2004, provisional application No. 60/629,713, filed on Nov. 19, 2004, provisional application No. 60/629,835, filed on Nov. 19, 2004.

(51) Int. Cl.
*G06F 16/245* (2019.01)
*G06F 15/173* (2006.01)
*G06F 8/65* (2018.01)
*H04L 29/08* (2006.01)
*G06F 16/30* (2019.01)

(56) References Cited

U.S. PATENT DOCUMENTS

| | | | | |
|---|---|---|---|---|
| 5,961,595 A * | 10/1999 | Kawagoe | ............ | H04L 41/0213 709/223 |
| 6,041,362 A | 3/2000 | Mears et al. | | |
| 6,157,956 A * | 12/2000 | Jensen | ................ | G06F 11/3068 709/246 |
| 6,199,195 B1 * | 3/2001 | Goodwin | ................... | G06F 8/30 707/999.1 |
| 6,327,591 B1 * | 12/2001 | Osborn | ............. | G06F 17/30569 |
| 6,523,035 B1 | 2/2003 | Fleming et al. | | |
| 6,684,214 B2 | 1/2004 | Bata et al. | | |
| 6,738,975 B1 * | 5/2004 | Yee | .......... | G06F 9/541 719/310 |
| 6,772,216 B1 | 8/2004 | Ankireddipally et al. | | |
| 6,779,184 B1 * | 8/2004 | Puri | ......... | G06F 9/542 709/238 |
| 6,785,685 B2 * | 8/2004 | Soetarman | ........ | G06F 17/30914 |
| 7,080,073 B1 | 7/2006 | Jiang et al. | | |
| 7,103,593 B2 | 9/2006 | Dean | | |
| 7,159,214 B2 | 1/2007 | Rajaram et al. | | |
| 7,567,956 B2 | 7/2009 | Kadayam et al. | | |
| 7,698,016 B2 | 4/2010 | Jayaram et al. | | |
| 7,703,073 B2 | 4/2010 | Illowsky et al. | | |
| 7,761,406 B2 * | 7/2010 | Harken | .................. | G06Q 10/10 707/602 |
| 7,761,480 B2 * | 7/2010 | Toledano | ............ | G06F 21/6218 707/804 |
| 7,814,470 B2 * | 10/2010 | Mamou | .................. | G06F 16/254 717/162 |
| 7,814,476 B2 | 10/2010 | Ho | | |
| 7,882,253 B2 | 2/2011 | Pardo-Castellote et al. | | |
| 8,005,937 B2 | 8/2011 | Wesley, Sr. et al. | | |
| 8,307,109 B2 * | 11/2012 | Mamou | .................. | G06F 16/254 709/232 |
| 8,825,795 B2 | 9/2014 | Wesley, Sr. et al. | | |
| 2002/0026441 A1 | 2/2002 | Kutay et al. | | |
| 2002/0163520 A1 * | 11/2002 | Hardin | .................... | G06F 9/542 345/475 |
| 2002/0178273 A1 * | 11/2002 | Pardo-Castellote | .... | H04L 29/06 709/230 |
| 2003/0028533 A1 * | 2/2003 | Bata | ....................... | G06Q 10/10 |
| 2003/0051053 A1 * | 3/2003 | Vasko | ................ | G05B 19/4185 709/246 |
| 2003/0061405 A1 | 3/2003 | Fisher et al. | | |
| 2003/0147369 A1 | 8/2003 | Singh et al. | | |
| 2003/0217111 A1 | 11/2003 | McKay | | |
| 2004/0003266 A1 | 1/2004 | Moshir et al. | | |
| 2004/0006401 A1 * | 1/2004 | Yamada | .................. | G05B 15/02 700/83 |
| 2004/0225657 A1 | 11/2004 | Sarkar | | |
| 2005/0007249 A1 * | 1/2005 | Eryurek | ................ | G05B 23/027 340/511 |
| 2005/0015619 A1 * | 1/2005 | Lee | ......... | G06Q 10/10 726/4 |
| 2005/0046624 A1 * | 3/2005 | Jayaram | .................. | G06T 17/00 345/419 |
| 2005/0203892 A1 | 9/2005 | Wesley et al. | | |
| 2005/0216555 A1 * | 9/2005 | English | .................. | G06Q 50/18 709/204 |
| 2006/0017969 A1 * | 1/2006 | Ly | ......................... | G06F 3/1204 358/1.15 |
| 2006/0130045 A1 | 6/2006 | Wesley et al. | | |

\* cited by examiner

*Client establishes connection to master node*

*Master identifies sources of information*

Client sends crawlers to unknown data sources

New match found by crawler

| Disconnected Agency | CADfusion™ System | Other Agencies |
|---|---|---|
| 1 – Experiences Disconnect | 2 – Notifies other agencies of disconnect | 3 – Receive notification of disconnect |
| | 4 – Changes resource status of potentially-shared resources from disconnected agency to "link down" (unknown), but only for resources not currently assigned to other agency calls | 5 – Receive resource status of external resources from disconnected agency as "link down" |
| 6 – Disconnected agency manually creates calls and tracks the statuses of its "owned" resources, even if loaned to other agencies | | 6 – Any automatic aid calls requiring external resources are negotiated manually; external resource placeholders with "link down" status are dispatched through local CAD without being reflected to disconnected agency |
| | 7 – The call is tracked with a GCI in case other connected agencies become associated with the call, but resources with a "link down" status are only changed by the owning agency | |
| 8 – Reconnect to CADfusion™ System, refreshes CADfusion™ System with active information | 9 – Correlates all call information and most accurate resource status information; active calls without GCIs are not forwarded to other agencies or given call GCIs | |
| | 10 – Resources with "link down" status changed to reflect actual status | 11 – Resources from previously-disconnected agency are manually cleared from currently-assigned calls |
| | 12 – Forwards updated resource statuses to other agencies | 13 – Can now see external resource statuses |

Fig. 34

| Loaning Agency | CADfusion™ System | Borrowing Agency |
|---|---|---|
|  | 2 – Translates request; transfers call/assigns GCI | 1 – Requests external resource |
| 3 – Receives call; dispatches resource |  |  |
|  | 4 – Correlates resource; forwards status of GCI | 5 – Receives resource status |
| 6 – Experiences disconnect |  |  |
|  | 7 – Notifies borrower of disconnect; changes "ownership" of resource to Borrowing Agency in GCI | 8 – Initiates contact with resource agency/Loaning Agency |
|  |  | 9 – Updates resource status (to GCI) |
|  | 10 – Updates resource status of GCI (e.g. "enroute") |  |
| 11 – Reconnects to CADfusion™ System; refreshes CADfusion™ System with active information |  |  |
|  | 12 – Determines that reconnecting system still has valid GCI |  |
|  | 13 – Correlates all call information (GCIs) and most current resource status information; updates CAD systems with most current information |  |
| 14 – Reflects current information as in GCI |  |  |
|  | 15 – Notifies Borrowing Agency of reconnect; changes resource "ownership" back to Loaning Agency | 16 – Reflects current information as in GCI |
|  | 17 – Operations proceed as normal before disconnect |  |

Fig. 35

| Loaning Agency | CADfusion™ System | Borrowing Agency |
|---|---|---|
|  | 2 – Translates request; transfers call/assigns GCI | 1 – Requests external resource |
| 3 – Receives call; dispatches resource |  |  |
|  | 4 – Correlates resource; forwards status of GCI | 5 – Receives resource status |
| 6 – Experiences disconnect | 7 – Notifies borrower of disconnect; changes "ownership" of resource to Borrowing Agency in GCI | 8 – Initiates contact with resource agency/Loaning Agency<br>9 – Updates resource status (to GCI) |
|  | 10 – Updates resource status of GCI (e.g. "enroute") |  |
| 11 – Reconnects to CADfusion™ System; refreshes CADfusion™ System with active information | 12 – Determines that reconnecting system does not have valid GCI<br>13 – Does not re-transfer GCI call information to Loaning Agency (continue manual) |  |
| 14 – Loaned resource returned; status available | 15 – Ignores status update while Borrowing Agency is "owner" | 16 – Releases resource; closes call (GCI) |
|  | 17 – Closes call and returns "ownership" of resource to Loaning Agency in GCI<br>18 – Forwards resource status as per Loaning Agency | 19 – Receives update of external resource status |

Fig. 36

| Loaning Agency | CADfusion™ System | Borrowing Agency |
|---|---|---|
|  | 2 – Translates request; transfers call/assigns GCI | 1 – Requests external resource |
| 3 – Receives call; dispatches resource |  |  |
|  | 4 – Correlates resource; forwards status of GCI | 5 – Receives resource status |
|  |  | 6 – Experiences disconnect |
|  | 7 – Notifies loaner of disconnect; "ownership" of resource stays with loaner in GCI |  |
| 8 – Receives notification of borrower disconnect (GCI updated) |  |  |
|  |  | 9 – Initiates contact with resource agency/Loaning Agency |
| 10 – Update resource status (GCI) | 11 – Updates resource status of GCI (e.g. "enroute") |  |
|  |  | 12 – Reconnects to CADfusion™ System; refreshes CADfusion™ System with active information |
|  | 13 – Determines that reconnecting system still has valid GCI |  |
|  | 14 – Correlates all call information (GCIs) and most-current resource status information; updates CAD systems with most current information |  |
|  |  | 15 – Reflects current information as in GCI |
|  | 16 – Notifies Loaning Agency of reconnect |  |
| 17 – Reflects current information as in GCI |  |  |
|  | 18 – Operations proceed as normal before disconnect |  |

Fig. 37

| Loaning Agency | CADfusion™ System | Borrowing Agency |
|---|---|---|
|  | 2 – Translates request; transfers call/assigns GCI | 1 – Requests external resource |
| 3 – Receives call; dispatches resource | 4 – Correlates resource; forwards status of GCI | 5 – Receives resource status |
|  |  | 6 – Experiences disconnect |
|  | 7 – Notifies loaner of disconnect; "ownership" of resource stays with loaner in GCI |  |
| 8 – Receives notification of borrower disconnect (GCI updated) |  | 9 – Initiates contact with resource agency/Loaning Agency |
| 10 – Update resource status (GCI) | 11 – Updates resource status of GCI (e.g. "enroute") | 12 – Reconnects to CADfusion™ System; refreshes CADfusion™ System with active information |
|  | 13 – Determines that reconnecting system does not have valid GCI |  |
|  | 14 – Does not re-transfer GCI call information to Borrowing Agency (continue manual) |  |
| 15 – Update resource status information (to GCI) | 16 – Only transfers resource status "unavailable" to borrower because still manual | 17 – Receives resource status "unavailable" |
|  |  | 18 – Attempts to update external resource placeholder status |
|  | 19 – Ignores attempt to update status as no GCI exists |  |
| 20 – Loaned resource returns; status changed to "available" | 21 – Closes call/GCI | |
|  | 22 – Forwards resource status as per Loaning Agency | 23 – Can see external resource status |

Fig. 38

| CAD System(s) | CADfusion™ System |
|---|---|
| 1 – CAD system interface experiences disconnect with CADfusion™ System<br><br>2 – CAD system interface notifies dispatchers of disconnect (or utilizes CADfusion™ System heartbeat monitor)<br><br>3 – Reverts to manual for all automatic aid sharing of resources; initiates communication with other agency/agencies and to external resources as necessary<br><br>4 – Maintains "ownership" of all local resources and update resource statuses to borrowing agencies manually<br><br>5 – Utilizes placeholders to external resources to track status changes manually<br><br>6 – Continues updating call and resource status information through local CAD system<br><br>8 – Reconnects to CADfusion™ System; refreshes CADfusion™ System with active information<br><br>10 – CAD system accepts updates from CADfusion™ System and reflects changes | 7 – Becomes available and issues reconnection request<br><br>9 – Correlates all call information (GCIs) and most current resource status information; active calls without GCIs are not forwarded to other agencies, but are allowed to complete manually; updates CAD systems with most current information<br><br>11 – Operations proceed as normal before disconnect |

Fig. 39

DYNAMICALLY INTEGRATED DISPARATE COMPUTER-AIDED DISPATCH SYSTEMS

CROSS-REFERENCE TO RELATED APPLICATIONS

This is a continuation application of U.S. patent application Ser. No. 14/473,896, filed on Aug. 29, 2014, which is a continuation application of U.S. patent application Ser. No. 13/215,196, filed on Aug. 22, 2011(now U.S. Pat. No. 8,825,795), which is a continuation application of U.S. patent application Ser. No. 12/252,067, filed on Oct. 15, 2008 (now U.S. Pat. No. 8,005,937), which is a continuation-in-part of prior application Ser. No. 11/070,391, filed Mar. 1, 2005, which claims the benefit of U.S. Provisional Application No. 60/549,432, filed Mar. 2, 2004, U.S. Provisional Application No. 60/549,427, filed Mar. 2, 2004, U.S. Provisional Application No. 60/602,470, filed Aug. 18, 2004, U.S. Provisional Application No. 60/629,713, filed Nov. 19, 2004, and U.S. Provisional Application No. 60/629,835, filed on Nov. 19, 2004, which are all incorporated herein by reference

BACKGROUND OF THE INVENTION

1. Field of the Invention

The present invention relates to dynamically integrating disparate data systems, and more particularly to dynamically integrating disparate computer-aided dispatch systems.

2. Background and Related Art

When a computer software program is created, an application program interface is typically used. An application program interface is a set of routines, protocols, and tools for building software applications. A good application program interface makes it easier to develop a software program by providing the necessary building blocks. The programmer puts the building blocks together in order to create the computer software program.

Operating systems typically provide an application program interface so that programmers can write applications consistent with the particular operating environment. Although application program interfaces are designed for programmers, they also help users by guaranteeing that all programs using a common application program interface will have similar interfaces, which makes it easier for users to learn new programs.

Since a variety of operating systems are currently available, and thus a variety of corresponding application program interfaces are currently used, computer systems can be disparate and therefore experience difficulties in exchanging data or be unable to exchange data.

In a variety of different industries, desirable information is located in such disparate information systems. One such example is in the public safety industry, where driver license information, warrant information, and other desirable information is typically located in disparate and incompatible systems. Accordingly, public safety officials employ a plurality of independent radio and/or computer networks to access information.

One particular type of system utilized by the public safety industry is a computer-aided dispatch (CAD) system. While computer-aided dispatch systems are particularly useful to the public safety industry in providing computerized allocation and tracking of resources, such systems have limitations. In particular, a single municipality may have multiple such CAD systems corresponding to multiple agencies (fire, police, ambulance and various entities providing such and similar services, etc.). Where multiple CAD systems service a single entity, the municipality often wishes for improved communication between such systems. Additionally, neighboring municipalities often have mutual aid or other similar agreements between them, where resources of one municipality are committed to responding to an emergency situation in another municipality. Again, improved communication between the CAD systems of each municipality in such situations may be desired.

Many CAD systems utilize different technologies, computer languages, data, etc., making reliable communication between such systems difficult at best. A common solution for communicating between systems has been to provide a rigid and customized point-to-point adapter and data transformation operations. However, such designs have been difficult to implement on a large scale, as an increasing number of CAD systems needing to be integrated requires a number of orchestrations and data transformations equivalent to the total number of CAD systems multiplied by one less than the total number of CAD systems. Additionally, ongoing maintenance, customization, and/or upgrades requires support and customization of each point-to-point pipeline. Therefore, existing CAD system operability solutions have been less than adequate.

BRIEF SUMMARY OF THE INVENTION

The present invention relates to dynamically integrating disparate data systems. In particular, the present invention relates to systems and methods for seamlessly integrating disparate data systems to securely, customizably and dynamically collaborate and share real-time information, and for providing intelligent data sharing that supports multiple standards concurrently and provides automatic conversioning of data information. Implementation of the present invention is more particularly directed to dynamically integrating computer-aided dispatch (CAD) systems.

Implementation of the present invention provides systems and methods for dynamically integrating disparate computer-aided dispatch (CAD) systems. The systems and methods provide bi-directional interoperability between disparate CAD systems and maintain stateful ongoing interactions between interconnected CAD systems. Information objects in one CAD system are associated and bound to related objects in other CAD systems through a centralized information hub that transforms data items intelligently to facilitate communication and interaction between the CAD systems connected to the hub. The described systems and methods maintain complete and current perspectives of all relevant information for each CAD system connected to the information hub, thereby eliminating the need for point-to-point intelligence maintained by the CAD systems about the other interconnected CAD systems. As information updates are passed from CAD systems to the information hub and back out to other CAD systems, the information hub transforms and evaluates the information updates ensuring that only necessary information updates are forwarded.

Implementation of the present invention takes place in association with a dynamic network for use in seamlessly and customizably integrating data of disparate systems. In at least some implementations of the present invention, a Peer Intelligence® data sharing network is created that includes one or more from any of a system architecture suite, a technologies suite and/or an applications suite.

While the methods and processes of the present invention have proven to be particularly useful in gathering information from disparate systems in the area of public safety, those skilled in the art can appreciate that the methods and processes can be used in a variety of different applications and in or across a variety of different industries to yield a seamless integration of disparate systems to securely, customizably and dynamically collaborate, share and/or access information.

Further, implementation of the present invention allows for providing secure data sharing of integrated disparate systems and the ability to dynamically update computer systems/devices among other techniques that cover any type of industry that employs, requests or otherwise uses electronic data or communication.

Therefore, implementation of the present invention provides a method for dynamically integrating disparate computer-aided dispatch (CAD) systems, comprising providing a common exchange information hub; communicatively connecting a plurality of CAD systems to the hub; deriving common data elements at the hub representing shared data aspects between the plurality of CAD systems; mapping data elements of each connected CAD system to the common data element of the hub; and facilitating communication between the CAD systems through the hub by transforming information from a first CAD system into a format understood at a second CAD system using the mapping of the common data elements.

Further implementation of the present invention provides a system for integrating disparate computer-aided dispatch (CAD) systems comprising a central hub; a plurality of disparate CAD systems communicatively connected to the central hub; and a plurality of intelligent data connections each configured to transform information between one of the CAD systems and the hub and between the hub and the CAD system, the plurality of intelligent data connections transforming information between formats used by the disparate CAD systems and a common format used by the hub.

Further implementation of the present invention provides a method for dynamically integrating disparate computer-aided dispatch (CAD) systems, comprising providing a common exchange information hub; communicatively connecting a plurality of CAD systems to the hub; and facilitating communication between the CAD systems through the hub by transforming information from a first CAD system into a format understood at a second CAD system, whereby information to be shared and updated between the first CAD system and the second CAD system is forwarded to the hub by the first CAD system and is transformed by the hub so as to be understood by a second CAD system.

Further implementation of the present invention provides methods for addressing failures, outages, or other disconnect events that occur. Such events can occur at a single CAD system or at the common exchange information hub. The illustrated methods provide an illustrative set of methods for dealing with such events.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIGS. 34-39 illustrate processes that occur in some embodiments upon disconnection of one or more interconnected CAD systems.

DETAILED DESCRIPTION OF THE INVENTION

The following disclosure is grouped into two subheadings, namely "Dynamically Integrating Disparate Systems and Providing Secure Data Sharing" and "Dynamically Integrating Disparate Computer-Aided Dispatch Systems." The utilization of the subheadings is for convenience of the reader only and is not to be construed as limiting in any sense.

Dynamically Integrating Disparate Systems and Providing Secure Data Sharing

The present invention relates to dynamically integrating disparate data systems. In particular, the present invention relates to systems and methods for seamlessly integrating disparate data systems to securely, customizably and dynamically collaborate and share real-time information, and for providing intelligent data sharing that supports multiple standards concurrently and provides automatic conversioning of data information.

Figure 1:
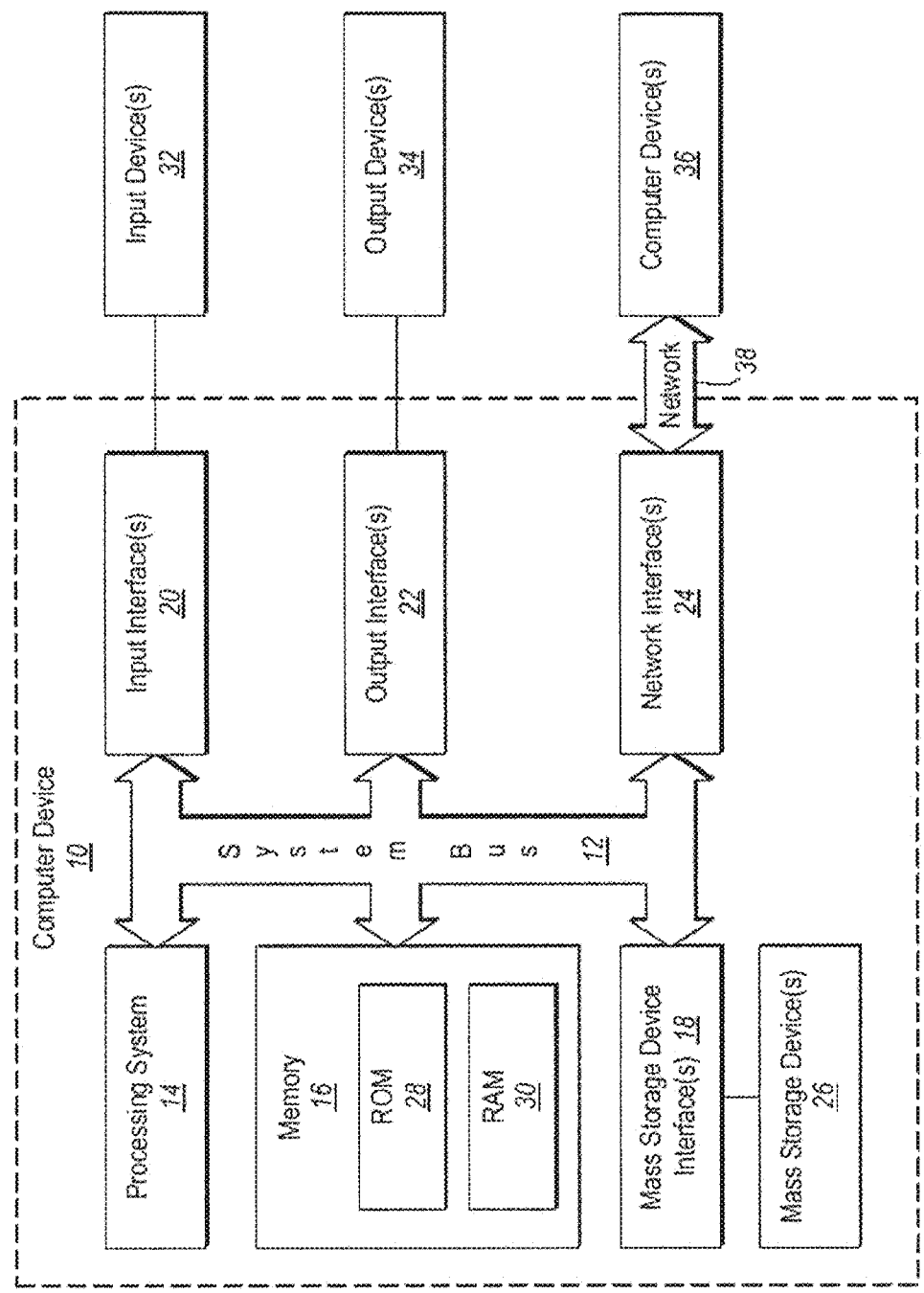
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration. Further, one skilled in the art will appreciate that some embodiments of the present invention embrace one or more client devices that are not computer devices.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
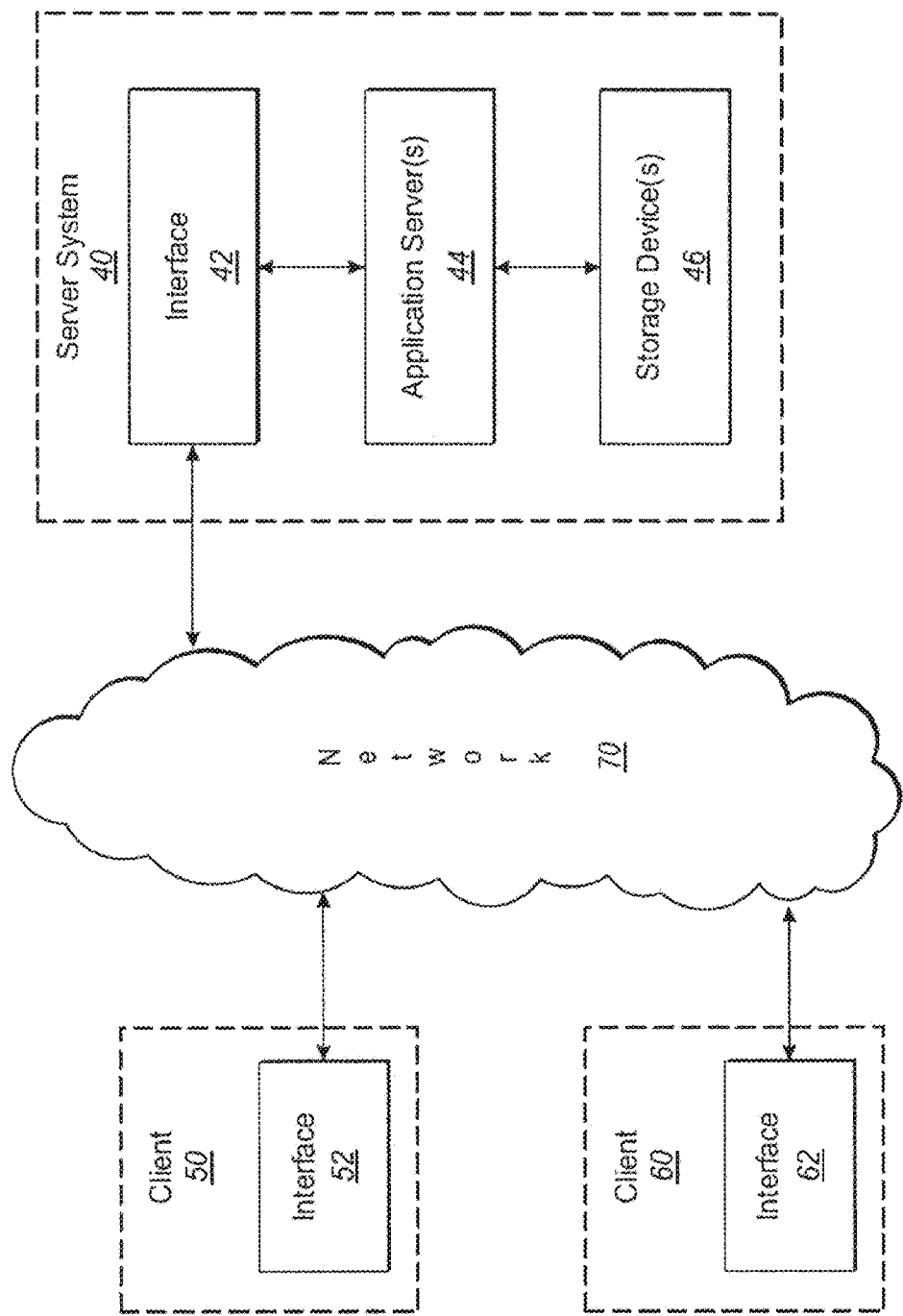
FIG. 2 illustrates a representative system configuration that may be used in accordance with an embodiment of the present invention.
Figure 3:
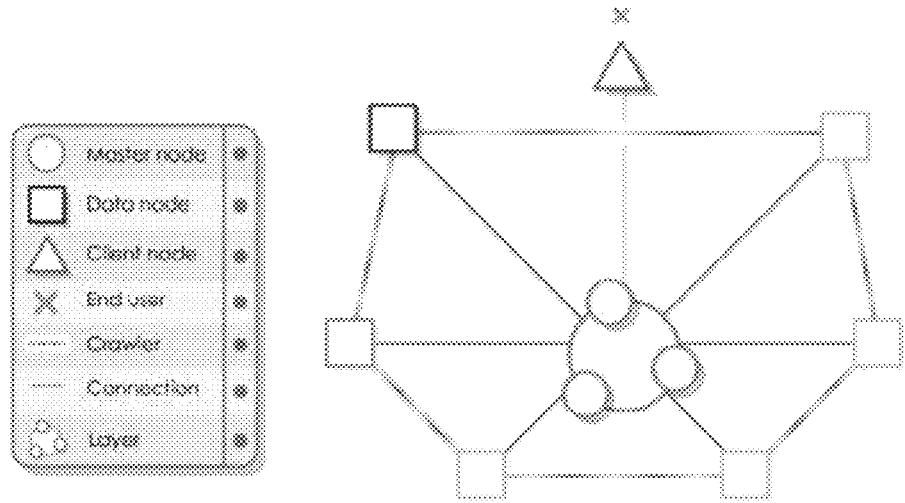
FIGS. 3-7 illustrate representative processing and system configuration in association with an embodiment of the present invention.
Figure 4:
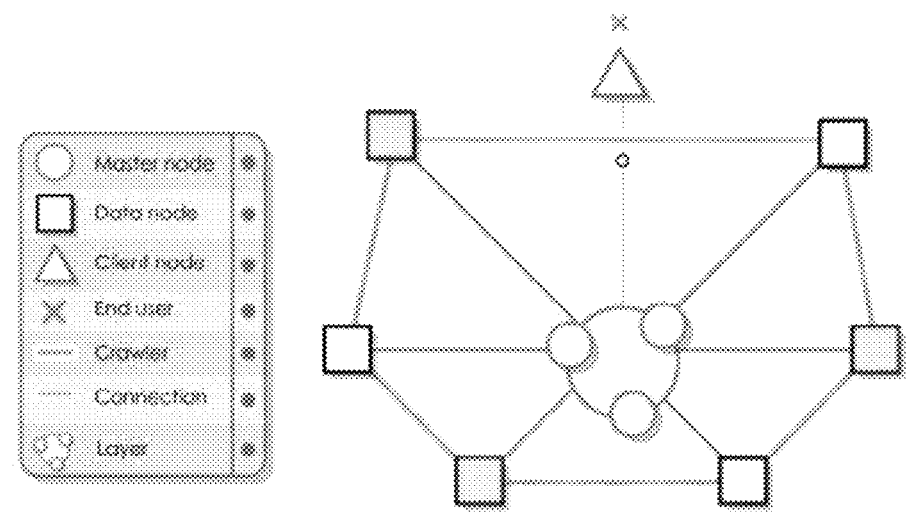
Figure 5:
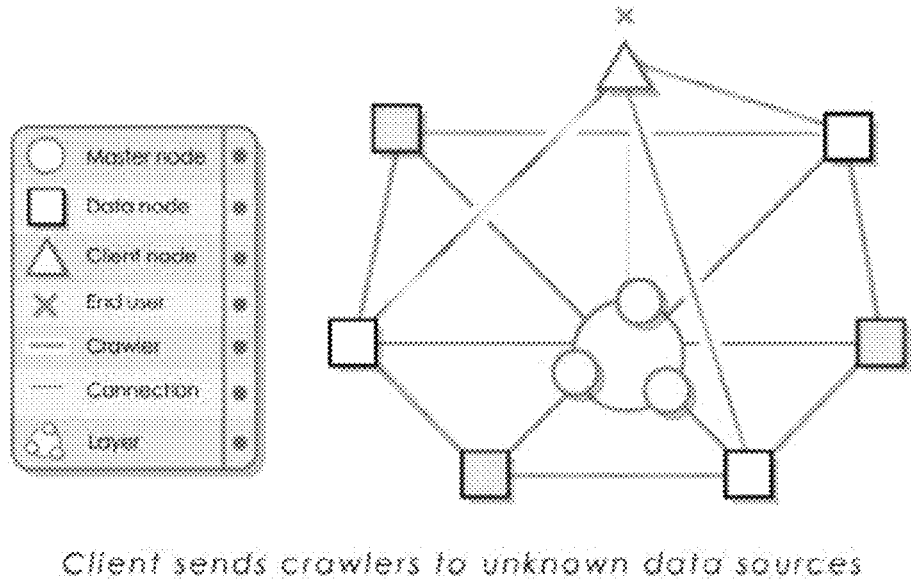
Figure 6:
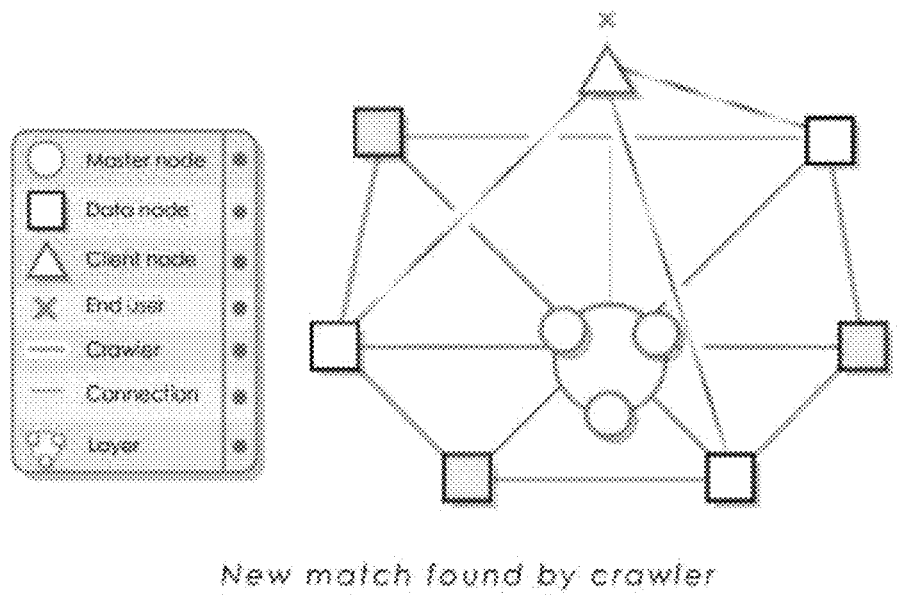
Figure 7:
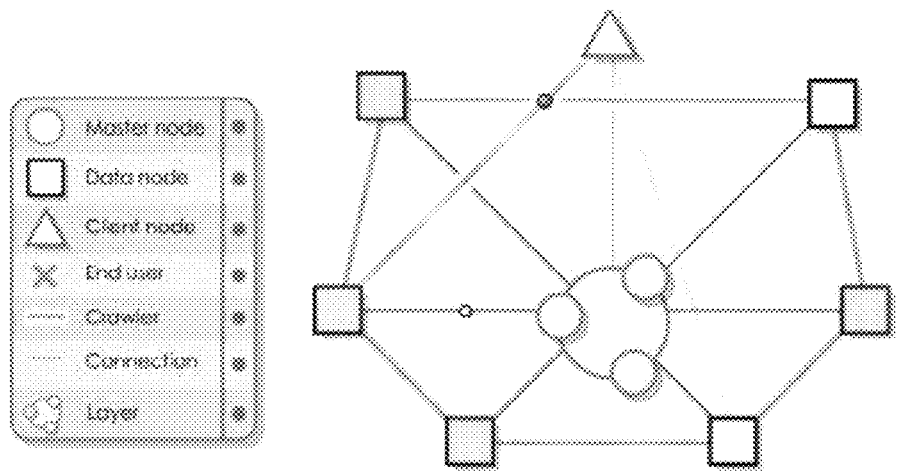

While those skilled in the art will appreciate that the invention may be practiced in networked computing environments with many types of computer system configurations, FIG. 2 represents an embodiment of the present invention that enables one or more client computer devices and/or one or more servers in a networked configuration to be used to implement methods and/or processes disclosed herein to integrate disparate system information and/or to provide secure data sharing. While FIG. 2 illustrates an embodiment that includes two clients connected to the network, alternative embodiments include one client connected to a network or many clients connected to a network. Moreover, embodiments in accordance with the present invention also include a multitude of clients throughout the world connected to a network, where the network is a wide area network, such as the Internet.

In FIG. 2, server system 40 represents a system configuration that includes one or more servers that may be used to implement methods and/or processes disclosed herein. While FIG. 2 illustrates the use of a server system 40, those skilled in the art will appreciate that methods and/or processes of the present invention may be performed by the use of a single computer device or without the use of a computer device, as will be further discussed below. Thus, by way of example, server system 40 may be a single server in cases where a single server can process and preserve the entire amount of information required to perform the methods and systems of the present invention, as will be further explained below. Alternatively, server system 40 may be a conglomeration of servers that process and preserve a high volume of information. Moreover, in some embodiments the servers interact in a peer-to-peer manner and automatically update each other to maintain current information.

The emergence of the Internet has enabled a very large number of computer devices across the world to be connected across a wide area network in order to participate in the utilization or exchange of information. The following is a discussion of a representative embodiment of the present invention that includes a plurality of clients (illustrated as clients 50 and 60) that are connected to server system 40 across the Internet (illustrated as network 70) to seamlessly integrate disparate data systems to securely, customizably and dynamically collaborate and share real-time information.

Seamless integration of disparate systems allows, for example, a user to access information from disparate systems without being aware that the information is obtained from disparate systems. For example, the information obtained from the disparate systems include the same look and feel for the user. Thus, the user may think that the disparate systems are a single system. Further, the look of the obtained information may be different for the user, but it is all displayed on a single user interface. Moreover, seamless integration includes a user being unaware that a new system has been added to the system. For example, the system is dynamic in nature to allow databases and/or system resources (e.g., XML, serial and/or data sources) to be added/modified without having to take the system down.

As has been provided herein, embodiments of the present invention embrace a dynamic system that integrates disparate systems. Changes are able to be made on the run, without having to turn off the system. For example, databases and/or data resources may be added/removed/modified during utilization of the system. Further, the system is able to adjust to the particular environment. For example, when a node of the system is down, redundant data replication allows for other nodes to be used as necessary. Further dynamic integration includes, for example, the ability to change as the environment requires in order to complete desired tasks. Further dynamic integration includes, for example, being able to change settings (e.g., assign rights, roles, access, etc.) without stopping the system, providing data redundancies among nodes, adapting to the surrounding environment, modifying the network status, changing routes as nodes become unavailable. Further, as shall be discussed herein, the dynamically integrated systems may be on and then rules may be applied. Moreover, the dynamically integrated systems may be integrated or modified without affecting users or data systems.

With reference to FIG. 2, clients 50 and 60 each include a network interface (respectively illustrated as network interfaces 52 and 62) and optionally a Web Browser or other user interface (respectively illustrated as browsers 54 and 64). Network interface 52 is a communication mechanism that allows a client, such as client 50 to communicate to server system 40 by a network 70, such as the Internet or other network configuration.

Server system 40 includes network interface 42, peer-to-peer application servers 44, and storage device 46. Network interface 42 is a communication mechanism that allows server system 40 to communicate with one or more clients via a network 70. Application servers 44 include one or more disparate servers for processing and/or preserving information. Storage device 46 includes one or more storage devices for preserving information, such as data, objects and/or other information to perform the methods enclosed herein. Storage device 46 may be internal or external to servers 44.

Thus, a user or an application program at one of the clients, such as client 50, may access information maintained and/or preserved by one or more disparate servers 44. For example, a user or application program at one of the clients, such as client 50, may request data information from server system 40. The request includes the receipt of the data information in a particular protocol, regardless of the particular protocol that the data information is currently in. Upon establishing authorization to obtain the data information, servers 44 locate and return the requested data information in the requested protocol, format or standard regardless of which storage device 46 includes the data (or a portion thereof) and regardless of the original protocol, format or standard.

While the discussion above has presented a representative system configuration that may be used to implement methods and/or processes of the present invention, those skilled in the art will appreciate that the methods of the present invention and processes thereof may be implemented in a variety of different system configurations for dynamically integrating disparate systems and/or providing secure data sharing of integrated disparate systems.

For example, at least some embodiments of the present invention embrace providing secure data sharing of integrated disparate systems in a FATPOT™ Peer Intelligence® data sharing network that provides real time critical data access from any integrated data source to any authorized individual or system using any integrated computer system, application, or device. In at least some embodiments clients, servers, requests for data, and their associated means of communications and transmission throughout a FATPOT™ Peer Intelligence® data sharing network are highly functional over countless disparate computer systems, databases, standards, protocols, formats, applications, devices, and networks. A FATPOT™ Peer Intelligence® data sharing network is a highly scalable, secure, interoperable multi-system peer-to-peer network that utilizes methods and processes associated with dynamically accessing, converting, and transmitting data over networks in real time from disparate data sources to disparate client systems, applications, and devices. The open standards-based nature of the FATPOT™ Peer Intelligence® architecture, in association with the powerful capabilities of its core and utility components, allows breakthrough integration speeds with today's disparate systems and provides expansion both in terms of the network itself and the needs of peer members.

A FATPOT™ Peer Intelligence® data sharing network is not dependent of any particular operating system, application, or device, and provides maximum flexibility and customization to accommodate differing needs of peer members within a network, while maintaining the integrity of the overall system functionality. A FATPOT™ Peer Intelligence® data sharing network removes significant technological barriers that have precluded disparate data systems from working together as one. Examples of such barriers relate to authorization and access control management across business, government and/or jurisdictional entities, maintaining local control over a database without replicating to a central data warehouse, limits on scalability, end-user accountability, addressing variances in hardware limitations (bandwidth/processing power), hardware disparity, operating system disparity, database disparity, network disparity, protocol standards disparity, application disparity, and the like.

In a FATPOT™ Peer Intelligence® data sharing environment, data flow occurs by request or by a push, such as from an external system. In both instances, information is transmitted and/or received across a plurality of disparate systems, applications, and/or devices, across a plurality of disparate networks regardless of the protocol employed by any of the plurality of disparate systems, applications, and/or devices. For such data flow processes, systems and methods are employed for identifying which data resources on the plurality of disparate systems the user is allowed to access. Further, based on a user's level of authorization for access of information, results are seamlessly displayed on a user interface at a client device, or on the web, in an integrated manner regardless of the disparate systems and plurality of networks from which the results were obtained and transmitted. These systems and methods allow seamless and dynamic integration with other systems, applications, and devices that access and utilize information obtained for unlimited purposes within or across industries, as will be further discussed below.

As provided herein, embodiments of the present invention relate to dynamically integrating disparate data systems. In particular, embodiments of the present invention relate to systems and methods for providing intelligent data sharing that support multiple standards concurrently and provides auto conversioning of data information.

Embodiments of the present invention embrace a dynamic network for use in seamlessly and customizably integrating disparate data. In at least some embodiments, information is dynamically integrated across disparate systems by using a universal language to obtain information across a plurality of disparate systems regardless of the protocol employed by each of the plurality of disparate systems, identifying which resource(s) on the plurality of disparate systems the query is allowed to access based on a level of information for which a user of the client device is allowed access, and seamlessly displaying the results of the query on a user interface at the client device in a fully integrated manner regardless of the disparate systems from which the results were obtained.

A universal language is, for example, a computer language that is capable of universal integration. While reference is made to the utilization of a universal language, those skilled in the art will appreciate that other embodiments of the present invention embrace utilization of other protocols and/or scripting languages.

In at least some embodiments of the present invention, mechanisms are provided that allow for the dynamic sharing of data information in a way that can alter themselves and support multiple standards concurrently. When data is retrieved from a network, it can be obtained in any type of standard, format, file or protocol desired regardless of the standard, format or protocol of the data at the source. Examples of such standards include dot, slash, comma, delimited, not delimited, XML, a proprietary protocol, or another standard, format, file or protocol.

In at least one embodiment, structure is provided at the data nodes and the network that identifies the request and causes one or more servers to convert the data information as information is being streamed to a client node so that the data will flow. The structure converts the information and delivers it to the requestor in the requested format. Accordingly, the structure provides automatic conversioning of data information.

Thus, for example, if a user's company has an agreement with a corporation that the user's company can access information from the company's record management system, but the corporation does not want to disclose its proprietary application program interface, the proprietary application program interface only exists on the data mode server and thus the proprietary application program interface is not disclosed.

In at least some embodiments, information is automatically transformed. For example, when a request for information is made from the data node side, it can use itself on itself to automatically transform. So internally, one device writes a plug in to a first protocol to get the data, and the data is translated to a second, desired protocol. Thus, at least some embodiments of the present invention provide for a universal protocol translator that enhances data communication among systems.

With reference now to FIGS. 3-7, a representative process and system configuration is provided in accordance with an embodiment of the present invention. In the embodiment illustrated in FIGS. 3-7, a system includes data nodes and a client node. An application connects to a client node. The client node checks and performs authentication. It determines identity, whether a valid certificate exists, whether the user is allowed into this network if the user has current information and/or a current version, etc. The client node communicates to the other data nodes throughout the network as well as to the master node.

The master node functions as a central index that remembers where everything is located. Thus, when a request for information is made, the master node knows where each part of the information is located. As soon as a user provides a request for information to the client node, it instantly promulgates back and forth and identifies any or all locations of the requested data information. The more information is given in the request, the more narrow the location result.

On the data node side, the user can categorize priorities and restrict what information is pushed to what type of individual based on the certificate. Further, it can block information to be sent so that the user is not aware that the blocked information exists. Further, an embodiment includes a general information contact that is sent back to the requestor to inform that something is there and indicate a person to contact.

In some embodiments, pure members of master notes are configured so that when a request is made, they are all aware of it. Accordingly, if one becomes unavailable, busy or inoperable, the information is obtainable from a different source. And, if all of the master nodes go down at the same time, it will still work since the client nodes can communicate to other data nodes for information since they remember and cash the information they previously received.

Two or more master nodes may be referred to as a layer. If the layer is destroyed, the client node will spawn crawler. The crawler hops around for a period of time. Parameters are established relating to the number of hops that can be performed and/or the length of time that the crawling can occur. So, when a client node communicates to another one to request information, it keeps hopping and bouncing. Pre-established rules may be set, such as having one go 20 hops with only one crawler. After it reaches its 20 hops, it dies. It may further allow ten crawlers up to 5 hops a day. In some embodiments, hops are determined based upon location of data information. Those skilled in the art will appreciate that embodiments of the present invention embrace any number of hops and/or at any frequency or period of time.

In the public safety industry, a user at a remote client enters information (e.g., a license plate or other information) into a query and dynamically obtains results from a variety of disparate systems, such as systems from a variety of different agencies and/or precincts. Based on the type of information for which the user is authorized to access, the results of the query include a seamless integration of relevant information relating to the information entered. Such results may identify, for example, the owner of the vehicle, whether the vehicle is stolen, if the vehicle is registered, if the owner has a warrant for his arrest or is a risk to the general population, etc. based on the user's pre-established level of authorization.

While the methods and processes of the present invention have proven to be particularly useful in the area of public safety, those skilled in the art will appreciate that the methods and processes can be used in a variety of different applications and in a variety of different industries to yield a seamless integration of disparate data systems to securely, customizably and dynamically collaborate, share and/or access information.

For example, in the healthcare industry, a user at a remote client enters information (e.g., a patient name or other information) into a query and dynamically obtains results from a variety of disparate systems, such as systems from a variety of different hospitals, practices and/or clinics. Based on the type of information for which the user is authorized to access, the results of the query include a seamless integration of relevant information relating to the information entered. Such results may identify any unpaid balances owed by the individual, prescriptions currently being taken by the individual, allergies experienced by the individual, recent health problems, historical information on the individual's family, etc.

Alternatively, in the banking industry, a user at a remote client enters information (e.g., a social security number or other information) into a query and dynamically obtains results from a variety of disparate systems, such as systems from a variety of different banks, financial institutions, court systems, creditors, etc. Based on the type of information for which the user is authorized to access, the results of the query include a seamless integration of relevant information relating to the information entered. Such results may identify any unpaid balances owed by the individual, assets owned, particular details on the assets, such as the type of personal property and if there are any current liens, financial histories and other relevant information.

Solutions are provided for integration with disparate systems and means for secure data sharing. Accordingly, government agencies, for example, have the ability to securely collaborate and share information with other Government agencies, the media and public.

Any of a variety of nodes of the network knows the location within the network of the requested data information or any portion thereof. Thus, the information requested is received as requested regardless of the original protocol of the data information. FATPOT™ Peer Intelligence® data sharing network provides real time critical data access from any integrated data source to any authorized individual or system, using any integrated computer system, application, or device. Clients, servers, requests for data, and their associated means of communications and transmission throughout a FATPOT™ Peer Intelligence® data sharing network are highly functional over countless disparate computer systems, databases, standards, protocols, formats, applications, devices, and networks.

A FATPOT™ Peer Intelligence® data sharing network is a highly scalable, secure, interoperable multi-system peer-to-peer network that utilizes unique methods and processes associated with dynamically accessing, converting, and transmitting data over networks in real time from disparate data sources to disparate client systems, applications, and devices. An open standards-based nature of the Peer Intelligence® architecture, in association with the powerful capabilities of its core and utility components, allows breakthrough integration speeds with current disparate systems and sets the stage for expansion both in terms of the network itself and the needs of peer members.

Peer Intelligence® is not dependent on a particular operating system, application, or device, provides maximum flexibility and customization to accommodate differing needs of peer members within the network, while maintaining the integrity of overall system functionality. It includes FPScript™, a proprietary scripting language, and other core and utility technologies, which are all based on universally accepted development, interfacing, and communications standards. Peer Intelligence® removes significant technological barriers that in the past have precluded disparate data systems from working together. Examples of some barriers include: authorization and access control management across business/government/jurisdictional entities, maintaining local control over a database without replicating to a central data warehouse, limits on scalability, end-user accountability, addressing variances in hardware limitations (bandwidth/processing power), hardware disparity, OS disparity, database disparity, network disparity, protocol standards disparity, and application disparity.

Data flow processes occur either by request or by a push from an external system. Information is transmitted and received across a plurality of disparate systems, applications, and devices, across a plurality of disparate networks, regardless of the protocol employed by each of the plurality of disparate systems, applications, and devices. Systems and methods are employed for identifying which data resources on the plurality of disparate systems the user is allowed to access. Based on a level of authorization for a user of the computer or other device is allowed access, results are seamlessly displayed on a user interface at a client device, or on the web, in a fully integrated manner regardless of the disparate systems and plurality of networks from which the results were obtained and transmitted. Such systems and methods allow seamless and dynamic integration with other systems, applications and/or devices that access and utilize information obtained for unlimited purposes within or across industries.

In at least some embodiments, the foundational structure and network architecture for systems and methods of disparate data integration and authorized access comprises a completely interoperable peer-to-peer network comprised of multiple client/server and peer-to-peer nodes as outlined in FIGS. 3-7

Regarding the data flow process through interoperable structural "nodes", multiple solutions have been implemented to reduce the amount of network traffic while providing a secure, auditable, fast, and reliable data-sharing network. There exist multiple node types to address network congestion, security, auditing, and reliability. An End User Node is where a request is spawned into the network. The Client Node receives the End User Node request and verifies the user, and associates the user with a digital certificate. The digital certificate is then passed throughout the network with the request for authentication, data segregation, and filtering. The Client Node tracks the request for auditing purposes and determines to which Network Layers the request will be distributed. Further, the Client Node assists in the reduction of network flooding by queuing End User Node requests based upon multiple factors, and determines the number of requests to concurrently distribute into the network. Consideration is given to such factors as Client Node network bandwidth, memory and processor load, and the current load of peer members. Based upon data congestion and flow, the appropriate degree of data transmission management is implemented.

A Network Layer includes multiple Master Nodes. Each Master Node is a peer member of a central indexing network. One of its functions is to track request criteria with search hits from Data Nodes throughout the network. Master Node peer members are clones of each other. When a Master Node is made aware of information, it is then replicated to all peer Master Nodes. The Master Nodes provide an interface to quickly lookup the locations of known data records matching the input of indexable criteria. The peer group of Master Nodes include similarly related information (i.e., public safety information, financial information, medical information, etc.) for the ease of management and distribution of the data. When a Client Node distributes the End User Node request, it performs a hit test with a lookup to a Master Node to quickly determine known Data Nodes that include information related to the request. The Client Node also spawns Crawlers to navigate to any Data Nodes throughout the network to search for information pertaining to the request, in the event that the Network Layer is unaware of a possible request. If the Network Layer is unaware of a location of the requested data, the crawlers propagating through the Data Nodes find it and notify the Master Nodes of its location. This approach allows the network to continuously learn and educate itself when information is being searched.

The Network Layer is educated based upon search results as Crawlers navigating throughout the network. The Network Layer and Master Nodes expedite searching and reduce network flow. The Network Layer and Master Nodes are unaware of the content stored at each Data Node, but are aware of where information is residing. Thus, they function as a directory to information, rather than a data warehouse.

A Data Node interfaces with one or more data systems for a specific agency, company, or locale and provides the interface between their data and the Peer Intelligence® data-sharing network. The Data Node is able to accept requests from Client Nodes and determine what information to retrieve, if any, based upon the digital certificate associated with the request. The Data Node may not respond to the search request because the digital certificate and current settings dictate that it should remain silent. Accordingly, it replies back with no results except contact information for the agency, company or locale. The Data Node may respond back with search results if the digital certificate meets the necessary authorized rights. Further, the information is filtered when the Data Node determines that the rights require sending partial information, but not all related information. The information sent back is based upon settings put into place for that Data Node for the group rights, roles, and/or identity information contained within the digital certificate making the request.

After the information is received at the Client Node it is formatted for the End User Node. The format to send to the End User Node is determined and configured at the Client Node. Depending upon the Network Layer for the request, the format type is specified within the digital certificate and the available formatting rules available. The Client Node performs the formatting translation before delivering to the End User Node. There can be an unlimited number of formatting rules for each Client Node. Users of the system are able to design and develop their own formatting rules to meet their needs. Some examples of formatting include XML, HTML, SGML, comma-delimited, proprietary formats, etc.

When Crawlers are spawned by a Client Node to navigate to any Data Nodes throughout the network to search for information pertaining to the request sent by an End User Node, the number of Crawlers, where they navigate, and how long they live depend upon multiple factors. Crawler patterns are optimized to utilize the network to its full capacity. Thus, in one embodiment, every request does not crawl to every destination. The more crawlers are processed, the more accurate the Master Nodes become and the less likely it is to have a crawler hit a Data Node that the master node didn't know about.

In one embodiment, there is as much information as possible at the Master nodes, which makes the role of the crawlers less relevant. This means a crawler can be dropped without worrying as much about missing something important.

When a Data Node receives a crawl request, it queues it up into a low-priority job list. It is more desirable to get out the records people know are present, than to check on the endless lookups coming in from all sources. The Data Node checks the jobs in the queue when it has the opportunity, thus providing idle processing. If a queue becomes too big, the crawl requests that have been around the longest are dumped. The ones at the top have the greatest effect, so dropping the crawler will have the most drastic effect. The ones at the bottom are thus dropped first, and then the higher ones as needed.

A crawl out to another data node/crawler replies the status of the current workload such as in bandwidth and CPU usage. If either exceeds a particular threshold, crawl requests are stopped for a short period.

In public safety and other industries, it is desirable that the most relevant records be grouped geographically. Peer Intelligence® crawlers/data nodes have a geographical association in latitude and longitude. Crawlers are sent out first to a general locale and near locations of known hits, and then are branched outward. For example, the data systems in a particular county/state are higher on the pyramid and have greater priority over searches from other states and countries.

Bandwidth bottlenecks are overcome by embodiments of the present invention. Redundant servers offload the crawler search work (CPU bottleneck), but the network pipe to an agency is generally fixed. Transport layer compression, as well as keeping communications brief and to a minimum, helps with overall system performance.

Data Nodes remember and study crawler behaviors and effectiveness to learn optimal routing patterns. Master Nodes provide a smooth operation of large-scale Peer Intelligence® networks. Data redundancy ensures that a system never goes down entirely. Master Nodes include potentially large lists of records. To keep a large number of records, such as a million plus records, synchronized between master nodes, Cerebro™ is employed.

Cerebro™ assigns an incremental version number to each addition/modification/deletion of a record and propagates it to its peers. Where Master Nodes are peers under Cerebro™, all modifications to indexes are propagated to every master node. If a Master Node is down for a period of time, when it comes back online, it is immediately informed of the record modifications it missed while offline. Redundancy and load balancing are provided. Since all Master Nodes are peers, any node can service another node's requests. If a Master Node becomes too busy, it offloads its work to another Master Node. Also, Client Nodes randomly pick a Master Node, which gives a more even distribution of work load to all peers in the Master Node core.

Cerebro™ allows for Peer Intelligence® to be scaled and for the handling of larger inquiry requests. As a result, several lower cost/lower performance machines can collectively do the same work as a few hi-cost, hi-performance servers.

Thus, in at least some embodiments of the present invention, a Peer Intelligence™ data sharing network is created that includes one or more from any of a system architecture suite, a technologies suite and/or an applications suite to perform or otherwise provide one or more embodiments of the present invention. For example, a system architecture suite includes architecture, systems and methods for data access, retrieval and/or transmission. Further, as a representative example, a technologies suite includes such technologies as FATPOT Scrip™ (a universal scripting language that is able to facilitate integration of disparate systems, applications, and devices, and is able to run across multiple platforms and/or over multiple technologies), FATPOT Cerebro™ (a direct active data pass through server that doesn't require a query/request from a client to send to one or many clients the latest updated information available from associated networks and/or programs), FATPOT CADi™ (a computer aided dispatch interface), FATPOT Data Broker™, FATPOT Call Notify™, FATPOT DataSync™ (dynamically updating computer devices/systems), FATPOT Intelligent Sockets™, FATPOT Sockets™ (communication or data transmission between client and server programs in a network), FATPOT Message Switch™, and/or FATPOT Router™ (relay). A representative applications suite can include one or more of Mystique™, PSI Powwow™, Landmark™, Enfuego™, FATPOT Patient Care Record™, Mapview™, and Crime Analysis™. Further, functions are provided that are available in applications over other devices. Moreover, while client devices include computer devices, as discussed above, embodiments of the present invention also embrace clients that are not computer devices.

FATPOT™ Intelligent Sockets™ provides for communication or data transmission between client and server programs in a network through application program interfaces. It is a multi-threaded layer such that it uses one object to interface with any number of open communications channels. It provides the ability to securely and efficiently manage multi-connections. It consolidates application program interfaces that currently exist in multiple locations and provides many types of socket connections, including but not limited to the industry-standard SSL, as well as a more advanced connection. It provides an easy-to-use application interface for managing connections, as well as over disparate devices. Examples of such connections include local area network cards, 802.11 hot spots, cellular, GPRS, M/A-COM EDACS and OpenSky system connections, and so forth.

FATPOT™ Sockets™ provides secure connectivity to multiple wireless and broadband networks simultaneously, and provides the capabilities for the communications layer to utilize TCP/IP and UDP protocols simultaneously or independently while connected concurrently. Hybrid use of these and other protocols is also made possible through FATPOT™ Sockets™. An example includes a desire to use encryption at times, and not at other times. This may be due to disparate network utilization, and possible network constraints or restrictions therein.

FATPOT™ Sockets™ is built in encryption that complies with federal and proprietary requirements and also has the capability to strip unnecessary data overhead (i.e., HTML tags). It also compresses data for maximum transactional efficiency, and offers the capability of streaming, clumping, and/or trickle-feeding data packets depending on bandwidth and other performance mechanisms associated with disparate networks available throughout Peer Intelligence®. These capabilities are particularly important in environments where critical data is efficiently sent through a very tight bandwidth. The intelligence in FATPOT™ Sockets™ to coordinate these data/bandwidth needs in very complex technological environments is very powerful.

A capability within FATPOT™ Sockets™ relates to its ability to intelligently send and receive data packets over disparate public and private radio networks. Such methods and processes occur based on the ability to examine, categorize, prioritize, segregate, and route data packets to clients systems, applications and/or devices over available disparate radio networks. The key element involved herein is the ability to intelligently match data packet sizes and the associated critical nature of the data with available networks and their associated bandwidth capabilities. Business rules are applied such that specified data packets (e.g., small, critical, etc.) are sent at a specified time, over specified networks, to specified client systems, applications, and devices. For example, the most critical data packets are sent over tight bandwidth networks. When higher bandwidth networks are available, larger data packets are sent through to the clients.

Some additional capabilities of FATPOT™ Sockets™ include an intelligent network selection that utilizes available devices based upon availability and user selection; a transaction priority so that transactions are sent over specific networks based upon availability and user selection; a transaction queuing to queue up data packets to be sent to specific networks based upon availability and user selection (an example of this would be to not send large data packets over tight bandwidth networks); and a network transaction routing that routes specific data to networks based upon availability of the appropriate networks and user-identified selection. The routing is also capable of sending certain data packets over different available networks. An example of this is that a critical email may be sent over one of many different available networks, but if there is an attachment of restrictive network proportions, the attachment may be queued and routed upon the availability of a higher bandwidth environment. Such capabilities create efficient network utilization, and provide for the highest job effectiveness for users within Peer Intelligence®.

FATPOT™ Socket Relay™ is another capability of FATPOT™ Sockets™. It routes data over concurrent sockets to multiple formats, such as (but not limited to) such data transport standards as TCP/IP, UDP/IP, HTTP, SOAP, Serial Line, ODBC, etc.

FATPOT™ Call Notify™ system is a client-side peer member of the Peer Intelligence® data sharing network. It interfaces directly in to the Peer Intelligence network in many different ways, including but not limited to interfacing directly in nodes, as well as servers such as Cerebro™, CADi™, or a Data Broker™. Based upon business rules applied to specific dispatch information, Call Notify™ is able to examine information and determine the appropriate segregation, and routing to external data applications, systems, and devices. It is capable of formatting data into the appropriately chosen protocols and works as a seamless pass through agent, routing key data to the interfaced systems, applications, and devices. A small sampling of the possible systems, applications, and devices that may be interfaced to FATPOT™ Call Notify™ are paging, mapping, GPS, email, cellular, mobile and other clients, records systems, servers, zetron station toning, statistical analysis, media, and the like. Call Notify™ is able to format any combination of information within a network, and route the information concurrently to any combination of external applications, systems, and devices associated with the network. FATPOT™ Call Notify™ also uses combinations of internet protocols, which include but are not limited to SOAP, HTMS, Web services, XML, and so forth. These are also applied by appropriately configured business rules.

FATPOT™ DataSync™ is a client/server technology that dynamically auto-updates computer systems and associated digital devices with computer programs and other relevant data. This included but is not limited to the technology to software updates, patches, and full installations. DataSync™ is able to automatically detect disparate public and private radio networks. It intelligently utilizes available radio networks and dynamically coordinates transmission of appropriately-sized data packets in a trickling-feeding method, so as not to consume inordinate amounts of available bandwidth. It identifies when to send data, and how much data to send based upon available public and private radio networks. Working in conjunction with other associated technologies, DataSync™ data is sent over secure sockets (FATPOT™ Intelligent Sockets™) and in whatever protocol and format the receiving client requires (e.g., FATPOT™ Script™ or Data Broker™). Based upon a system's access control lists and applicable business rules, authenticated users may access system programs, documents, files, and other authorized job-related data. DataSync™ performs in the background, allowing other prioritized data transactions to utilize the necessary bandwidth for job-critical needs. DataSync™ works without user intervention on the client side, can alter packet sizes to conform to the capabilities of available network devices, and can alter the frequency of data transmission based upon the network device capability. The capability to enable/disable/restrict is all available as part of DataSync™.

DataSync™ dynamically auto-updates computer systems and/or other digital devices with the latest versions of computer programs, fixes, patches, or other relevant data. It further dynamically installs applications on computer systems and other digital devices, intelligently utilizes available radio networks and their associated bandwidths, and sends appropriately-sized data packets by a trickling-feeding method.

FATPOT Script™ is a universal scripting language that is designed to be extremely flexible, and facilitates integration of disparate systems, application, and devices. The scripting language runs across multiple platforms and over multiple technologies, and can be incorporated into existing languages via COM, DLL, LIB, or a stand-a-lone executable. It can be digitally signed and distributed, guaranteeing that it was unaltered, identifying who developed the script, when to enable/disable the script, who can execute it, and where it can be executed. The scripting language incorporates many key integration capabilities, ranging from, but not limited to, UDP sockets, TCP sockets, FATPOT™ advanced socket protocol, serial communications, database communications, file manipulation, operating system access, parser, and regular expressions.

FATPOT™ Script™ can sit on either end of a transaction and configure data such that a seamless data receipt and transmission occurs. Data is integrated into FATPOT™ Script™ upon receipt, thus making it very simple to output said data to any protocol of systems, servers, applications, and devices almost instantaneously.

Uniform methods for querying, receiving and transmitting data from disparate sources are available. One example in the Homeland Security market is the Global Justice™ XML standard FATPOT™ Script™, which addresses the purposes of utilizing open, required or other proprietary protocol standards that might need to be applied in differing circumstances and markets. Through the use of FATPOT™ Script™, the process of integrating, conforming, and maintaining protocol standards are provided.

A variety of capabilities are provided by one or more embodiments of the present invention. For example, automated daily logs tie across all systems to allow the automated recording of daily activities. Calls, time stamps, free form narratives, anything relating to training, education, and automatically populated into the daily log. This removes a dependency on paper-based logging. Field reporting (NFIRS) sends report dynamically to a particular jurisdiction. Inventory provides full enterprise-level inventory management and/or property management (chain of custody), up to the management level. It tracks and manages funding of accounts, delegation of responsibility to departments for managing accounts. This trickles to a first responder, allows the item to be tracked instantly from a department's inventory all the way to a billing company.

A manage locations floor plans, and/or plans for commercial areas, and the development of premise history from disparate records management systems. Thus, response to an incident gives a full array of information to give knowledge to a response. This manage locations capability is particularly desirable for such industries where location is important, such as the fire fighting industry.

A personnel management capability provides a roster and intelligent scheduling shifts, an ability to track training, licensing, and certification for all associated personnel, performance recording, fitness reports, in a desired manner for managing personnel.

Client Programs, including mobile clients, such as but not limited to PSI Powwow™ LANDMARK™, ENFUEGO™, etc. are client programs to Peer Intelligence™, and are available within a public safety suite. Each program offers a secure, encrypted communications suite with one or more of the following capabilities: total mobile client integration with cross jurisdiction, cross agency CAD systems for CAD calls and silent dispatching; interagency communication of real time vital information (Attempts-to-Locate, Hot sheets, Amber Alerts, etc.); access by MDTs (mobile data terminals) to NCIC, state, county & local agencies, Internet, and intranet records, databases, and alerts (i.e.: Amber Alerts etc.); built in buddy lists, online notifications, instant chat and email with all users and agencies across the system; access information stored in multiple agencies which use disparate operating systems, applications, and databases; trigger application processes within the agencies, systems, applications, and databases; drive these information exchanges and processes using national standards as outlined in the Specification section of the RFP and as approved by the PDCC; listen for, evaluate, and transform messages based on pre-defined business rules and security parameters, then use the information derived from these messages to trigger other processes in disparate partner systems; and/or access information through existing applications or using a standard web browsers, also using a wide variety of disparate hardware options including servers, desktops, laptops, tablets, and handheld devices.

A verification and authentication capability allows upon proper login from a client, a public safety suite server to convert a verified username and password into an MD5 format. Usernames and passwords are not stored or sent out with requests as open text. The authentication process within the Peer Intelligence™ data sharing network involves user authentication into unlimited servers. Digital certificates are used to distribute requested data based upon authorized access control. The certificates define identity, as well as the authorized rights associated with the defined identity. An example of this in the Homeland Security sector, for example, would be a Police Chief whose rights to privileged data sources are far more extensive than a part-time dispatcher. Although both are verified as system users, the access available is very different, and the authentication process and associated digital certificates permit access to an appropriate level of information based upon the identity and rights associated therein. Different servers within Peer Intelligence™ authenticate rights based upon appropriately verified requests inside the network. For example, if the part-time dispatcher asks for information that is not authorized, then the server will not respond to the request with that information for that particular identity. The request will also be logged as a possible management auditing resource.

In Peer Intelligence™ there is a second layer of authentication. A server within the Peer Intelligence™ network is a back up authenticator, as the first request from an agency server has already verified and authenticated the user initially. That agency server also has to be a trusted server within the system to allow it to make a request to another server within the system. Thus, the second layer precludes unauthorized entrance of both the requesting server and the originating client making the request.

Access control mechanisms embrace a digital certificate identity, trust lists, access control lists, user classification, rules based on username or group classification, and trust issuing authority.

FATPOT™ Intelligent Look Ups™ is a capability associated with the querying of data. Based on data requested, possible matching data sources with associated data fields to those entered in the request appear in the interface automatically as possible relational sources of the queried information. This process saves a client (user) significant time, as one click of a search button then covers all possible look ups on the particular information entered. This technology is also extended to use geographical and other enhancements. For example, if a requestor only desires information on a person in a particular county instead of from the entire state, the search is configured to accommodate that specific information instead of searching more data sources than the requestor desires.

Dynamic data deployment allows for system modifications at the server level that are automatically deployed and immediately functional by a user on the network without user intervention.

Histories of inquiries, as well as AVL are kept as histories on the server side as set up by the network administration for each customer. Histories are also cached on the client-side for quick recovery to help with report-writing needs. All transactions are logged at every point passed on the network. An initial log is made when the request to push a call is received. A log is also made at the final push into the recipient CAD system, as well as any point the transaction may pass along the way. Messages are logged to a database at each node. If a database is unavailable, then the messages are logged to a text file. The log file may be imported into a relational database for review with database reporting software. In addition to logging transaction histories, network conditions and failures are also stored in system logs.

Session persistence is available throughout Peer Intelligence®. In the event of communication failure, when communication is reestablished, a handshaking protocol is used to identify and ensure that lost data is re-transmitted. The status can be monitored from the FATPOT™ CADi™ monitor screen. All transactions are TCP/IP level connections incorporating software-level TCP ACKS.

In at least some embodiments, dynamic paging is provided. For example, two-way paging is provided for the exchange of information. In one embodiment, when a user responds to a pager, the response goes back to the server and may be forwarded to one or more clients. Further, a user may make a request by using a pager to another pager or computer device. The request is authenticated and then answered with the requested information. Further, a user of a computer device can be contacted via his/her pager through the system when he/she is not available or not logged into the system. Further, in some embodiments, such dynamic data exchange takes place via instant messaging. Moreover, a remote user may make a request (e.g., via telephone, pager, instant messaging, or in another electronic manner) and can receive the requested information electronically without even being logged into a computer system.

At least some embodiments of the present invention embrace six layers of disparity to unity, namely: the operating system; CAD/RMS and other database systems and protocols; client programs (PSI™, Call Notify™, Media™, etc); radio networks—GPRS, M/A-COM, T-Mobile, Verizon, etc.; internet protocols/standards—XML, Sockets, Web services, etc.; and device protocols and formats—PC, laptop, blackberry, pager, cell phone, iPAQ.

FATPOT™ Terminal Emulation™ relates to relaying information from the terminal server. Clients talk to a server, which always has a connection to another server. So, if a client loses connection, when communications come back up the exchange of information begins where it left off. A server may be positioned on the LAN as a UNIX® box, and other servers. Clients out in field connect to Terminal Broker™. That connection is encrypted, which prevents someone from connecting in, seeing data, and/or accessing to RMS. Multiple terminal broker clients may connect in and share the same terminal emulation session to the server. A terminal session may have tech support or unlimited possible clients connect into the same session, and a client can join a session, just as if they were sitting in front of the same keyboard typing.

Cerebro™ provides a direct, active data pass through server that does not require a query/request from a client to send to one or many clients the latest updated information available from associated networks and programs.

Scripts, Sockets, and programmatic business rules apply to identification, examination, analysis, conversion, segregation, caching, routing, and transmission of data to associated systems, applications, and devices are written and function according to the protocols and formats of both the active pass through side of Peer Intelligence™ (Cerebro™), as well as the passive query/respond side (Data Broker™).

Mystique™ is the front end application framework that utilizes the technologies including FATPOT™ Script™, definitions, rules, and so forth. It includes capabilities to communicate to a server, define/obtain definitions (e.g., based upon the login), and confirm or determine which definitions to obtain to change the display. Thus, when a user logs in, Mystique™ will authenticate to the server and obtain the appropriate scripted definitions based on the login, and alter the display for the application. The display becomes an unlimited number of applications.

A CADi™ message switch provides scalability, security and flexibility. The encrypted and access control management peer-to-peer architecture allows Computer Aided Dispatch (CAD) systems to plug in and be part of the secure network. This allows instant interoperability within the entire network. The Peer Intelligence network is set for expansion, and the addition of new agencies/systems is relatively simple. The new agency is integrated by adding their CADi™ message switch to the trusted list and applying any necessary business rules. All other capabilities within the network become available to a new agency/system upon plugging into the system.

Functions and capabilities of a FATPOT Message Switch™ include access control lists, certificate verification, rights management, business rules analyzer, data analyzer, data publisher, input translators, output translators, protocol translator, VPN technology supporting RSA/AES/SSL, session persistence, unlimited protocol support, dynamically adding and/or removing data exchange standards (XML, open standards, proprietary APIs, ODBC, etc).

In a Peer Intelligence™ data sharing network, Rules may be controlled at the individual agency level. Each agency/jurisdiction/group controls authorization and transmission of its own proprietary data. Moreover, each controls to whom it will be made available. Furthermore, each agency determines where it will receive calls from, and what types of calls will be accepted under different scenarios/priorities. Rules involve any of the fields transmitted, including but not limited to nature, address, time, priority, GPS coordinate, etc. Each system receiving the information may apply additional rules to restrict the data that is deemed not necessary, thus reducing the amount of traffic over the network. Customization of these rule sets is a significant feature in the FATPOT suite of tools.

A FATPOT™ Peer Intelligence™ data sharing network may either function as a centralized, decentralized or hybrid network. For example, a hybrid network is made up of centralized and decentralized networks. This provides flexibility for the easy integration of cities or counties that already have an infrastructure in place.

In one embodiment, Net Motion™ relates to providing a selection as to which network device to send traffic through. In a particular embodiment, it is in an application layer, where it indicates that it needs to send one chunk instead of another because the radio network is active/available. In at least some embodiments, the program is running and doesn't allow this to happen on this program while a user is on this device, pause it now, or allow it to run. Thus, for example, an update program is not allowed to run on a particular network. Alternatively, capabilities are allowed to occur, with some restrictions such that it provides high efficiency.

Relating to system design, a main message switch processing occurs in a separate thread and/or process from the network communications module.

The FATPOT Peer Intelligence data sharing network for CAD provides the ability for all CAD information to be available to all users and dispatch centers simultaneously or independently. (Provided access rights are established). A message can just as easily be sent to a single destination as well as broadcast to multiple ones, or even to every individual/agency on the network. For example, in a mass casualty incident, a single dispatch center may forward incident information to as few, or as many of the surrounding dispatch centers to assist as the need would dictate.

Relating to identity, users are able to have more than one identity within a system because users can play different roles.

In at least some embodiments, dynamic paging is provided. For example, two-way paging is provided for the exchange of information. In our embodiment, when a user responds to a pager, the response goes back to the server and than can be forwarded to one or more clients. Further, a user may make a request by paging another pager or computer device. The request is authenticated and then answered with the requested information. Further, a user of a computer device can be contacted via his/her pager through the system when he/she is not available or not logged in to the system. Further, in some embodiments, such dynamic data exchange takes place via instant messaging. Moreover, a remote user may make a request (e.g., via telephone, pager, instant messaging, or in another electronic manner) and can receive the requested information electronically without even being logged into a computer system.

In some embodiments, a training module is provided that enables training, or any other form of online education.

Relating to Terminal Emulation™, there includes a terminal emulator that is server side that relays information from a terminal server. The terminal emulation server communicates to our server. Clients out in the field talk to a server and the server has a connection to the real terminal emulator server. Thus, if for some reason the client loses connection, the terminal emulator doesn't disconnect the client session. The client session is still active because the server is keeping it active. The heartbeats are going, everything else is going forward, so everything is behaving the way a real terminal emulator server is expecting it. It just acts like no one is typing in the keyboard right then. But, the server is positioned on the local area network on the same network as the UNIX box and other servers that are going to do terminal emulation. Thus, the clients out in the field connect to the terminal broker, and that connection is encrypted. Thus, you never have to worry about someone somehow connecting in and having access to your RMS system because the clients out in the field are connecting to the terminal broker in an encrypted manner and the terminal broker then talks to the terminal emulator server locally.

In one embodiment, there are multiple terminal broker clients connected in and sharing the same terminal emulation session to the terminal emulator server. So you have the terminal emulator server (e.g., an HP system) and then since we have a terminal broker, the broker sends and receives keyboard and data information from multiple terminal broker clients and sends it to both locations. Thus, training can be performed. So, if I'm doing a terminal session and suddenly I have a problem and tech support is going to hop in, I can allow that terminal broker client to join my session and we both are sharing the same session, just as if we are sitting in front of the same keyboard typing.

Socket Relay™ is an application that runs as window service in the background. It includes a series of open socket listeners that are ready for communication and attached to each listener is a set of rules for relaying that information. It includes a list of rules. There's a port that it listens on and there is a mode of communication that is expecting data to arrive. These modes can vary from regular rod TCP/IP sockets to UDP data packets to secure the sockets. It is also adapted for serial communications and listening on all ports. As information arrives on the socket in a format, it is converted based on the rules of that format to a plain text description of the information and then it is passed into the rule for that listener. The rules determine where the information should be routed to and in what format. Further, it can be routed to one or more destinations. For a one to one relay of information one destination is set up and the same protocol may be chosen for outgoing data as the protocol arrives. So if you were listening on SSL, you would send out to that one location also on SSL. The socket relay can also be used as a translator, for example, if you had an application behind a firewall at two different sites and you wanted to transmit information securely over secure socket layer and that application does not support SSL, then you can put a socket relay within the firewall at both locations.

At the source location, the application sends regular sockets, the socket relay receives that and according to its rule you convert that to SSL and send it out to the second socket relay. A second socket relay receives SSL and according to its rule format back to regular data and forward that on to the application. So, a tunnel is created that translates from regular TCP/IP sockets to a secure socket Layer.

A socket relay may also be adapted to broadcast to more than one destination. This is helpful for splitting a normally connection protocol such as TCP/IP. Each computer is capable of listening to the data that comes across from the source location and the rules set up on the socket relay application determine which one of the multiple destinations is allowed to send information back. So, an established rule may include to forward the information onto computer A and on computers B and C it would also like to listen in or spy on the traffic speeding past back and forth, but not have any input—not be able to write near that dialog. This can be used for creating redundancy. A single port comes into one computer. That computer can be rock solid, running on Linux or off some system that has very little application and its sole purpose is to stay up running. It doesn't have to worry about crashes from other software applications.

The information from the socket relay on that computer can be split out to multiple destinations or multiple servers. Each one of those servers may be running on a different machine at potentially different locations. With that sort of configuration, the socket relay acts as a redundant switch and it will forward that information on to each and every server, all to be handled separately. Any one of those servers can reply back to the connection and forward it back to the original requester.

The socket relay can also narrow its rules down to segregate based on the IP address of the incoming connection. This sort of configuration also acts as a software router. Multiple computers may connect into one listener and each of those computers send information on to different applications. The socket relay may look at the IP address of the incoming connection and forward that connection on to a particular server.

Thus, for example you could specify if it comes from an internal computer. If the incoming connection is within a local LAN, you would forward that connection on to an in-house data server and then if the data comes in from an external IP address it wants to see productions, so you forward it on to your productions server. So, both your internal development work stations and your outside public computers all connect to the same location and the socket router looks at that information and figures out what destination server to forward the connection onto.

A socket relay includes the ability to incorporate load balancing to monitor the computers that are destinations for their processor loads as well as bandwidth loads and able to selectively choose which destination out of multiple to forward connections based on the load capacity of the destination computer. Another application of the socket relay program is that it can be used for network sharing. You can set up a dummy server on a socket relay computer that can have a dial up access or single point of internet access out to the internet and you could have multiple computers within the local LAN all connect to the socket relay on that gateway computer. That socket relay will forward those connections out over the internet or dial up or whatever connection is available to the host server. Thus, you have multiple clients connecting into a socket relay all go into a single server and the computer of the socket relay is running as a shared network computer.

At least some embodiments of the present invention include mapping capabilities, which may be referred to as a map client. In one embodiment, a window provides a graphical representation of a geographical location and includes functionality for the tracking of dynamic objects or objects which move around or locations that are dynamically added.

A map client renders a geographical representation (map) of a building, an area, a city, a state, county, a country or other geographical representation that is title based and includes a collection of images that are small puzzle pieces that are dynamically put together to draw the map. This provides for sufficient use of memory, speed and flexibility. The images can be a collection of street maps, elevation maps, aerial photographs, satellite images, or any representation needed. The collection of tiles is able to be separated as different layers. So, a different layer of tiles will be rendered depending on a zoom level setting. Rendering is a based on a current coordinate by latitude, longitude and zoom level.

Further, the geographical representation provides a user interface. A user can employ a mouse to zoom in and out, or to rotate the map. In one embodiment, a small map is also included to provide a convenient alternate view, and to allow a user to zoom in and out so the user has a high level view the whole area while the main map is centered on a small section.

In a further embodiment, a map client includes the ability to plot locations. For example, in the public safety industry, the locations can be cars, CAD calls, accidents, etc. Thus, CAD calls may be plotted on the map as they are received. A user can switch to a split screen mode with the map client and select a CAD call and the CAD call will be placed on the center of the map and the user can see exactly where that call is located and information pertaining to the call. A user can click on the call on the map to highlight which call it is in the CAD display. Such functionality is also available for inventory items, and to be able to listen and receive local GPS device signals. Further, a user uses a GPS device in association with a client computer device to have the client listen for signals and dynamically plot on the map in real time.

In a further embodiment, the map provides tracking features for dynamic objects. A user selects multiple locations, cars, calls, etc. and tracks them. The map automatically zooms around the locations that are selected or allows the user to select a location and it automatically centers on that location and then rotates as the particular unit rotates. So if the individual is driving a car, it will follow the car and dynamically represent all movements. Locations can also be assigned a wave point, which is a destination factor. Once a wave has been set, an arrow appears on the map that points to that wave point. So, if a user is driving a vehicle, a call to which the user is assigned is be set as the wave point and an arrow always points in the direction of the call. Thus, the user can just follow the arrow to the location. Indicators are also available that represent where other units are located on the map. Further, there is a compass that can be toggled on/off to show an orientation, and will rotate with the map.

In some embodiments, layers are selectively defined in the mapping technology. Each layer is a particular category or sub-category, and can be selectively enabled/disabled. Layers can be used to identify inventory, events, resources, occurrences, or the like, can be dynamically blended in such a way as to allow the user to control the mount each layer is present. In one embodiment, the control is provided as a slider to control blended amounts of each layer.

A login verification authentication process may be used in multiple locations throughout the applications that we have and it is done differently based upon the needs for each component or piece of the application. Client applications perform authentication by going over to the public safety suite server using a username and password. When that goes across, the information is then MD-5'd and compared with other MD-5s so that none of the passwords are ever stored open text so someone could just look at it and figure out what it is.

The authentication process depends upon what it is for, and whether it occurs at multiple locations. When the client logs in, the server will respond back to the client indicating that these are the type of capabilities this user has so you need to make sure that they are not allowed to do those types of things to see it on the screen. Then, what will happen is if for some reason the client application was wrong, and it went across the server, the server can say sorry, although you sent me this, you are not allowed to do it so I'm not doing it. So you have the client trying to stop a user from doing something, and if for some reason there was a mistake in the software, the server is the secondary back-up trying to prevent or guard against it Further, you have from the client to the caddy and what that process does, after it logs in, the client receives its filters from the server that the client might have set for his own profile and only showing me latent calls and only showing me minutes that are online. So at that point, the client talks to the caddy and indicates the username, password, and filter. Then the caddy will then talk back to the public safety server and says hey, this guy is asking for this information and this is his username and password. Is this really him? And then the server takes that information, double checks that it is that person that has those types of rights, and then communicates back appropriately.

The server double checks it again because it has already allowed that person to log in. But then, the client is talking to the caddy, which is another person that you need to verify. The client is talks to the caddy and the caddy talks to the public safety server to say hey, is this really this guy and is he allowed access to the caddy? Upon authentication, the server will allow it to happen. The caddy is added to the public safety suite server's trusted list to say this caddy is allowed to ask those types of questions and I'll talk to him so in case somebody else tries to talk to him, he won't talk back to him. So, only if you are trusted will the server even perform those types of authentication commands. Each goes through a couple of different processes to get authenticated. And clients have to be trusted by the server so that the server will communicate back to the caddy to say yes or no even. So, in at least some embodiments, the caddy is on the client. Otherwise they could use brute force and go through every single known possible word combination and number combination in history to finally get passed. This way there is no way to allow for unauthorized access.

If you log into a client and the client is going to talk to the server and ultimately talk to the caddy, but the problem is we don't want just anybody connecting to the caddy for information so the caddy then itself asks the server saying do you know this guy? Is he right? Yes he is. But for anybody even to ask the server do you know this guy, you have to be trusted in the first place. The caddy is the one that is asking the server to verify.

But see we use the same technique for the media webpage and we use the same technique for the GPS broker but those servers are trusted to the public safety suite server so the public safety suite server knows it is allowed to respond and talk to say yes or no to those other servers. Because if you don't do that, if you don't even put that roadblock there, anybody could talk and ask the server: Is this the right username or password? And, over time you'd get it. So you only talk to trusted devices.

Relating to the login verification authentication with Peer Intelligence™, on the public safety suite server, since we trusted that login, it will associate that login identification with a digital certificate that represents that login. So, if you do a look-up, that digital certificate is what floats around and is used to verify and/or determine access rights. A digital certificate is trusted as it goes around. So that is what happens and based upon that, it knows what type of information you can even be aware of or for instance if you look up a particular user, he may not even know he had a citation because you are not even allowed to even know anything that deals with citations but if you are allowed to know a citation, you may not be allowed to have any information, only a contact person or yes but only these type of fields or here are all the information. Thus, it is based on authorized rights.

Thus, embodiments of the present invention relate to dynamically integrating disparate data systems. In particular, embodiments of the present invention relate to systems and methods for providing intelligent data sharing that supports multiple standards concurrently and provides auto conversioning of data information. Further, embodiments of the present invention relate to systems and methods for seamlessly integrating disparate data systems to securely, customizably and dynamically collaborate and share real-time information.

Embodiments of the present invention embrace a dynamic network for use in seamlessly and customizably integrating disparate data over any type or number of protocols. In at least some embodiments, information is dynamically integrated across disparate systems by using a universal language to perform an electronic query for information across a plurality of disparate systems regardless of the protocol employed by any of the plurality of disparate systems, identifying which resources on the plurality of disparate systems the query is allowed to access based on a level of information for which a user is allowed access, and seamlessly displaying the results of the query on a user interface at the client device in a fully integrated manner regardless of the disparate systems from which the results were obtained.

Further, some embodiments of the present invention embrace multiple industries sharing data. For example, in some embodiments, police forces, emergency crews, fire protection forces, hospitals, doctors and the like share data from the various disparate computer systems. Thus, while the following discussion of systems and methods of the present invention is focused on the area of public safety, embodiments of the present invention embrace accessing any type of information across disparate systems and industries for use of the information. Not only can data be shared that is obtained from user entered information (requests/queries), but seamless transmittal of data entered by users within programs, applications, reports, or the like can also be available to all associated users within a transaction, based upon proper authorization to relevant data.

Some embodiments relating to public safety technology solutions, include a variety of client software applications (e.g., FATPOT™ PSI Powwow™ System, FATPOT™ Public Safety Suite, FATPOT™ Landmark™ System, FATPOT™ Enfuego™, FATPOT™ Landmark™ Handheld—Pocket PC/Blackberry/Palm, FATPOT™ Patient Care Record System™, etc.), a data sharing network (e.g., FATPOT™ Peer Intelligence™, FATPOT™ CADi™, FATPOT™ Call Notify™, FATPOT™ IP Router etc.), FATPOT™ DataSync™, Mapping and GPS clients and servers (e.g., FATPOT™ GPS Gateway™, FATPOT™ GPS Broker™, FATPOT™ Mapview™ FATPOT™ Mapclient™, etc.), and communications FATPOT™ Media Access, Amber Alert Server/Ticker, High Priority Alert Ticker(s), Radio Notification Interface, 911 Interface, etc.).

Some embodiments of the present invention provide software and hardware solutions for all levels of government, the media, and the public, or other industries. Solutions are provided for integration with disparate systems and means of secure data sharing. Accordingly, government agencies, for example, have the ability to securely collaborate and share information with other Government agencies, the media and public, or other industries.

Some embodiments include a highly functional software package, which supports real time data inquiry needs of public safety officers in the field, at headquarters, and dispatch centers. It addresses the need to have a reliable access to central crime information databases and other pertinent data systems over wireless and broadband networks for police, fire, EMS, and other public safety agencies using a variety of operating systems and hardware devices without requiring all agencies to use the same platform. The design assures complete security; with access limited to authorized users only. Its operational characteristics are responsive to the variety of difficult situations that confront officers in the field. It allows them to do their job, without requiring them to become computer experts.

In addition to providing access to databases, the system provides a variety of messaging, customization, and convenience capabilities that dramatically enhance its operational values. For example, an authorized individual can instantly broadcast "Amber Alert" messages to all users, a select group, or users within a particular geographical location using a variety of devices (e.g., hand held, pager, computer system, etc), thus speeding up response time to a missing child situation. Among other features, it supports a secure digital full-bodied interagency email, instant messaging discussions, and real time notification of the user's status.

Embodiments are not dependent on any particular IP wireless communication service. Accordingly, embodiments enhance the ability of an unlimited number of public safety agencies to communicate with each other in real time and to cooperate in the resolution of incidents that encompass multiple jurisdictions. When an officer is in motion and moves from one wireless transmission area to another, or when a transmission is interrupted for any reason, the system can pick up the session where it left off once a connection is reestablished without losing data from the session before losing connection, and without requiring any intervention on the part of the officer. It maintains histories, facilitates access to multiple databases, improves server performance, and simplifies file installations and updates.

Some data systems of the present invention provide (i) access to NCIC, III, State, County, Local Agency RMS, other Agency RMS, Internet, and Intranet Records and alerts (i.e., Amber Alert) and (ii a user friendly data entry process to enter search criteria. Based upon the entered criteria, the system automatically determines what systems are able to provide the requested information. Once initiated, searches concurrently take place, searching all selected databases (e.g., FATPOT™ Intelligent Look Ups™) as key information is entered into the query screens regarding the desired information about objects, persons, vehicles, properties, and other items relating to public safety. Thus a system is able to determine which databases can be queried depending upon the information entered for submission. Further data systems of the present invention provide (i) a built in buddy list, online notifications, high priority information alerts and tickers, instant chat, and email with all users and agencies throughout the network (ii) a roaming profile of user (e.g., All customizable settings follow the user login and not the machine); (iii) A customizable theme support (e.g., Users have the ability to select/toggle/create color themes for day or night use); (iv) easy to understand icons that depict the current status of inquiries/events; (v) icons designed for touch screens, mouse navigation, and hot keys; (vi) audible alerts for incoming events and messages; (vii) an ability to remember the work flow of users and pre-select inquiries to reduce the input necessary for users; (viii) being able to perform sub inquiries without additional data entry (e.g., Users can instantiate new inquiries from returned results); (ix) a history for each user allowing them to retrieve previous inquiries without performing data entry; (x) integration with CAD/RMS systems for CAD calls and silent dispatching; (xi) interagency communication of real time vital information (ATLs & Hotsheets); and/or (xii) capabilities for Dispatchers, Patrol, Detectives, Administrators, and the like.

The client and server are secure, reliable, and easy to maintain. Intelligent Sockets (FP Sockets™) are used. When multiple radio network devices exist to access the network, the technology is able to detect and choose the fastest and most reliable device(s) and perform a multitude of decision-based algorithms to format the data packets for optimal performance. Public Safety Inquiry (PSI Powwow™), Landmark™, Enfuego™, and FATPOT Public Safety Suite™ are embodiments and are able to function over Public, Private, Static, Roaming, NAT, and Rolling IP addresses. For example, they can be used over such wireless networks as: AT&T CDPD, AT&T GPRS, IPMobileNet, OpenSky, Sprint PCS, T-Mobile GPRS, NEXTEL, 802.11b, etc. The technology used allows intelligent network selection, transaction priority, transaction queuing, concurrent network routing, and network transaction routing (FP Sockets).

Regarding security, the technology is compliant with federal requirements, and uses 128-bit RSA and AES encryption for all communication. Additional encryption and security features can be added to increase security when needed without manual redeployment of the clients and servers saving time, money, and resources. Interagency data sharing is performed with the use of FATPOT™ Peer Intelligence™, and FATPOT™ CADi™ (Cerebro/CADi). Embodiments allow agencies to share dispatch calls, units, and RMS data if they enable the capabilities. The client portion of this technology can mold the graphical user interface to show only the authorized capabilities available to a user, or limit the capabilities available for the user. In other words, it can dynamically limit the amount of information a user is able to view or access based on access control lists and business rules applied for users.

Dynamic data support is provided. If the capability is enabled, users are able to control and prioritize the amount of data they receive for dispatch information. (i.e., changing of dispatch centers, cities, zones, priorities, etc.) A PSI server native firewall is used to restrict access to the server and it graphically displays all connections, transactions, and histories of activities.

Figure 8:
FIG. 8 illustrates a representative login process of a system architecture suite in accordance with an embodiment of the present invention.
Figure 9:
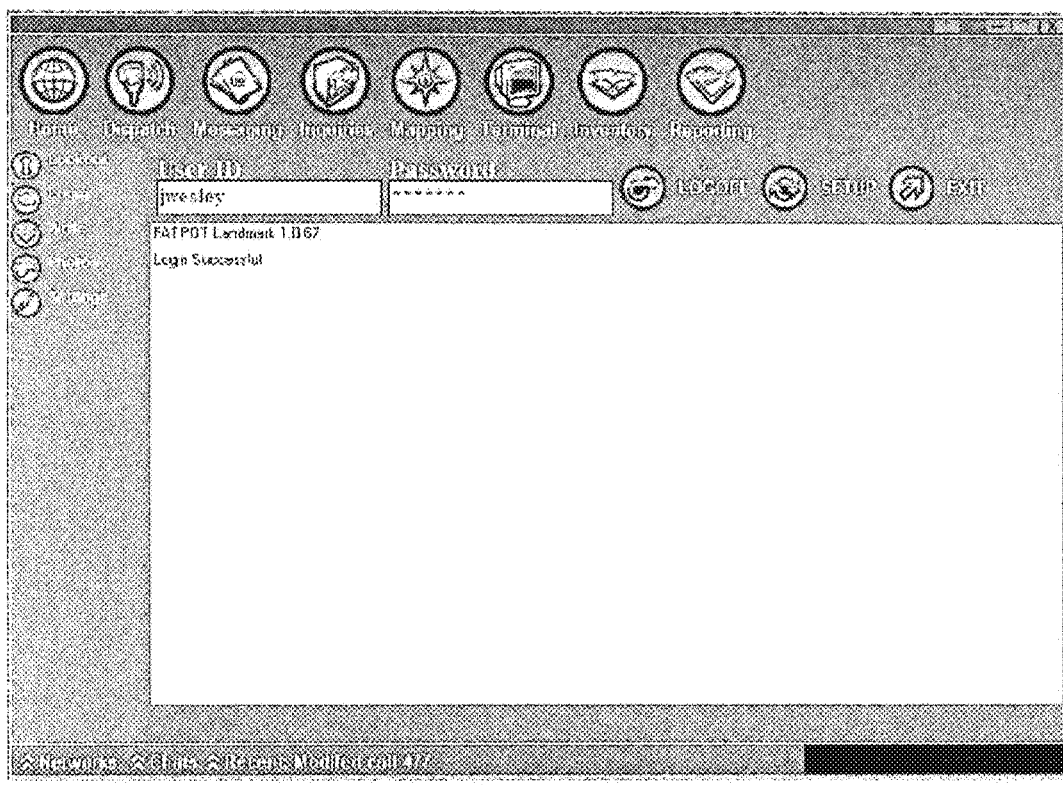
FIG. 9 illustrates a representative user interface indicating a successful login and allowing access depending on the user's level of authorization in accordance with an embodiment of the present invention.

Reference is now made to FIGS. 8-27, which provide a representative application. FIG. 8 illustrates a representative login process. FIG. 9 illustrates a representative user interface indicating a successful login and allowing access depending on the user's level of authorization. Users have the ability to select and access different screens depending upon pre-established authorization levels.

Figure 10:
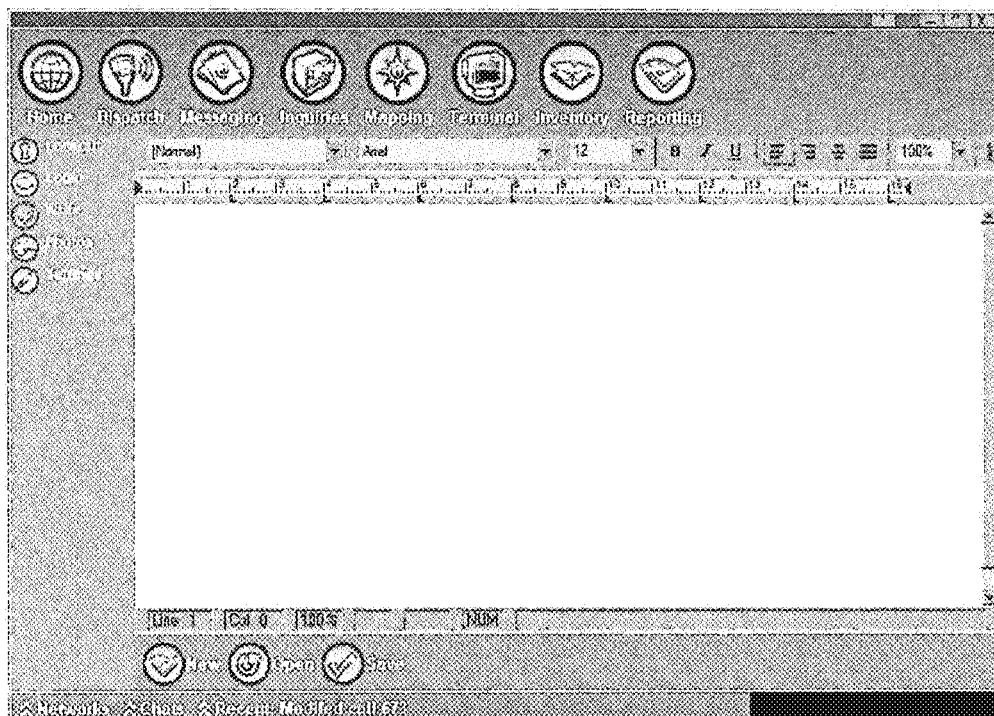
FIG. 10 illustrates a representative word processing capability available in accordance with an embodiment of the present invention, wherein data (e.g. text, graphics, etc.) are dynamically shared between users/precincts/agencies/industries/jurisdictions.
Figure 11:
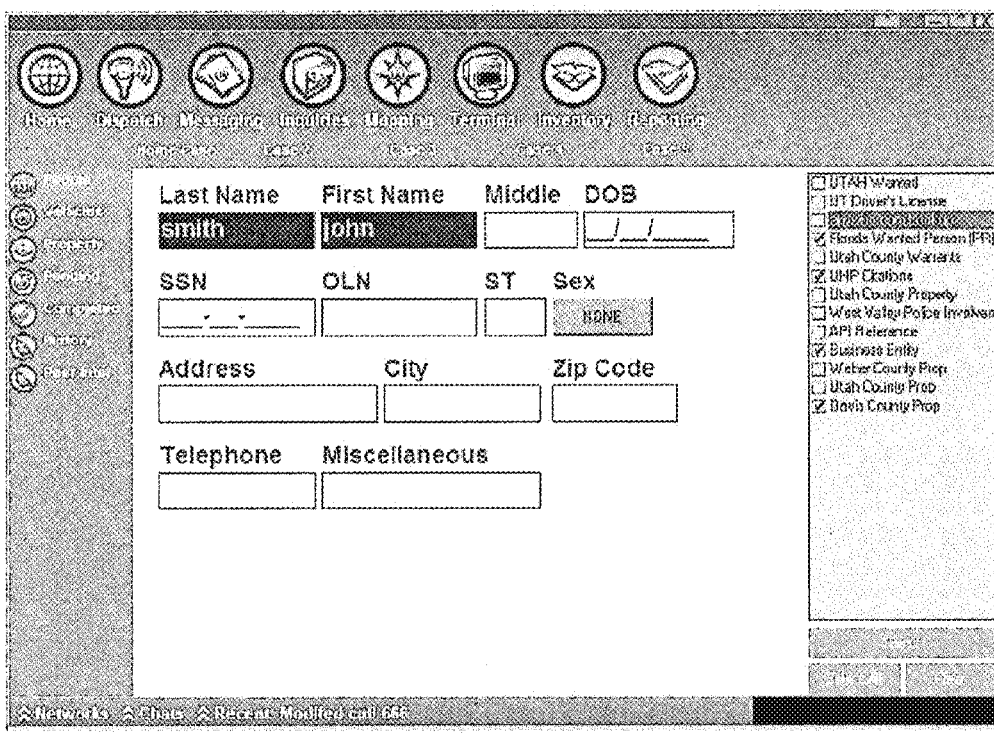
FIG. 11 illustrates a representative search process, wherein the disparate systems can be searched for any or all data that pertains or relates to any input field or any combination of input fields according to authorization in accordance with an embodiment of the present invention.
Figure 12:
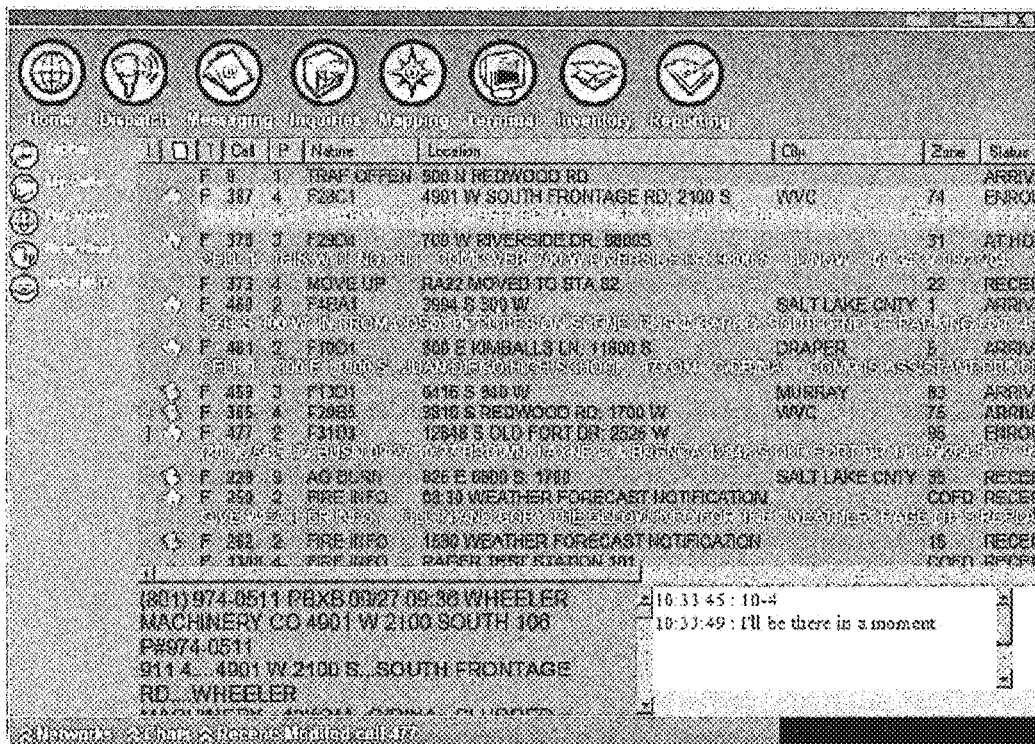
FIG. 12 illustrates a representative dispatch that includes a narrative and a built in chat room for a selected call or contact and identifies location in accordance with an embodiment of the present invention.
Figure 13:
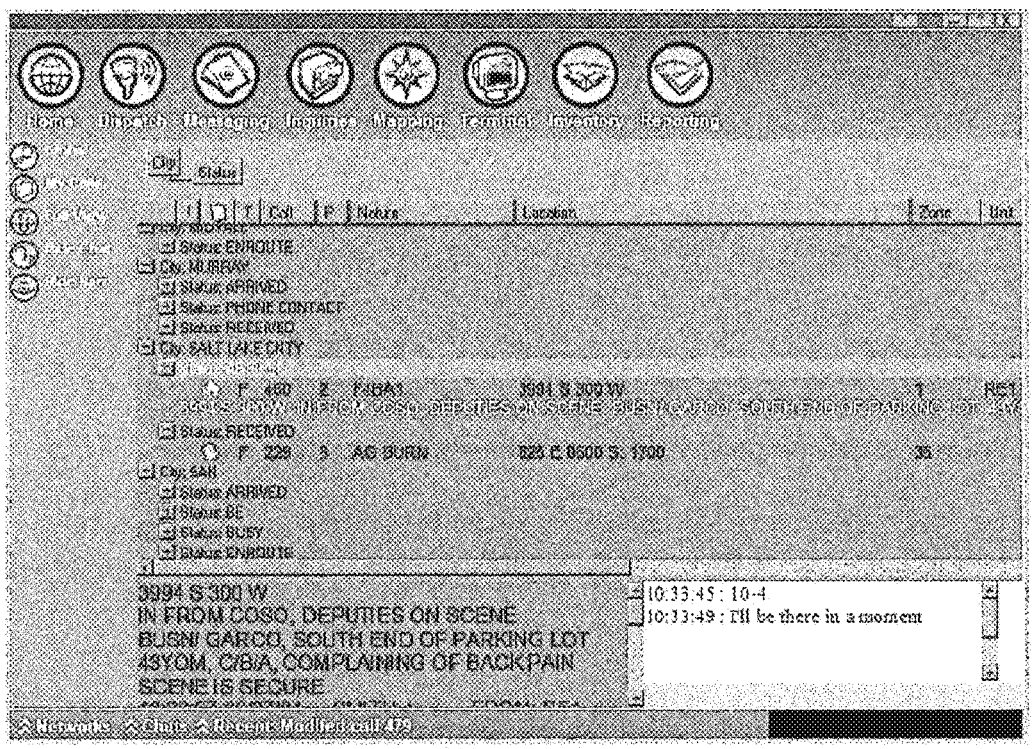
FIG. 13 illustrates a representative grouping of dispatch information in accordance with an embodiment of the present invention.

FIG. 10 illustrates a representative word processing capability available in accordance with an embodiment of the present invention. FIG. 11 illustrates a representative search process, wherein the disparate systems can be searched for any or all data that pertains to any input field or any combination of input. FIG. 12 illustrates a representative dispatch that includes a narrative and a built in chat room for the selected call or contact. FIG. 13 illustrates a representative grouping of dispatch information. Sub groupings may be created to segregate information to facilitate navigation through large amounts of information.

Figures 14, 15:
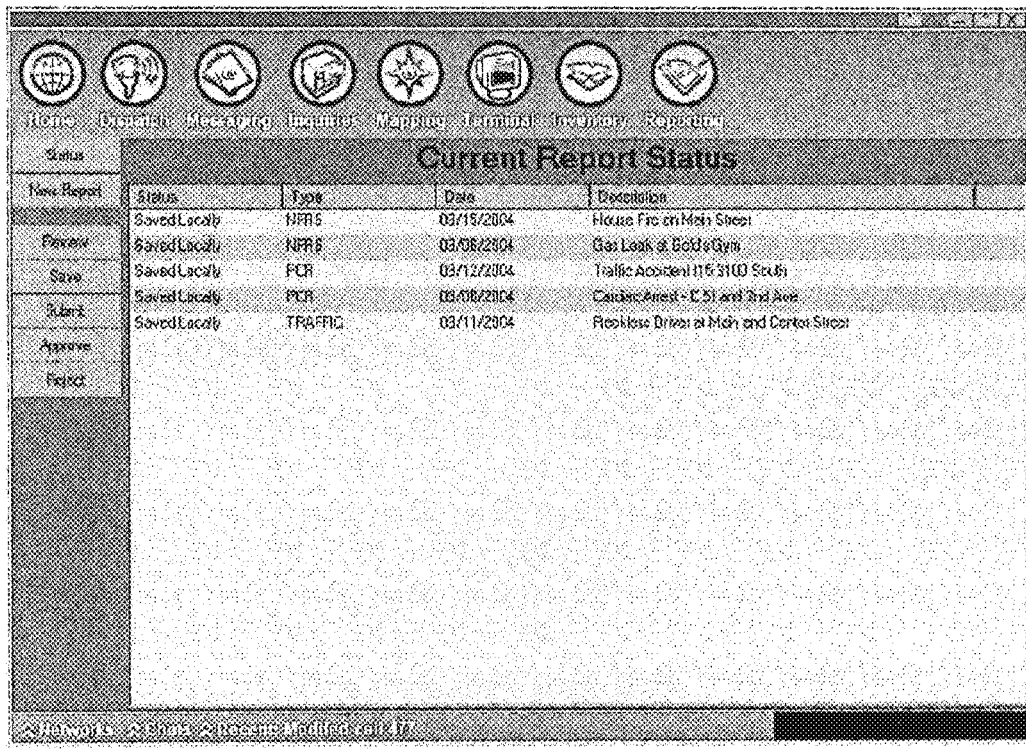
FIG. 14 illustrates a representative field reporting that provides a list of reports for a user to dynamically create, modify and/or submit in accordance with an embodiment of the present invention.
FIG. 15 illustrates a representative dynamic field engine to selectively and dynamically retrieve and/or preserve information across a disparate system in accordance with an embodiment of the present invention.

FIG. 14 illustrates a representative field reporting that provides a list of reports for a user to create, modify and/or submit. FIG. 15 illustrates a representative dynamic field reporting engine. The engine allows users to enter and submit data that is to be evaluated, approved, or denied. Any form can be loaded and the system will populate the form with relevant information. The form can then be submitted to the relevant agency.

Figure 16:
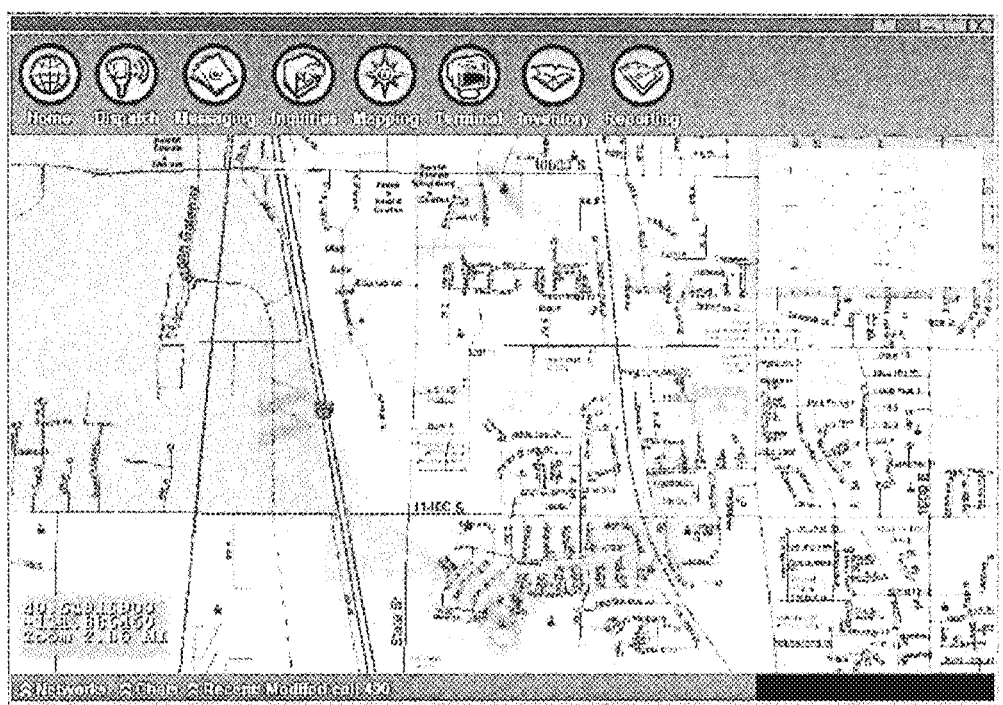
FIG. 16 illustrates representative dynamic mapping of a desired area, giving both a detailed and global view in accordance with an embodiment of the present invention.
Figure 17:
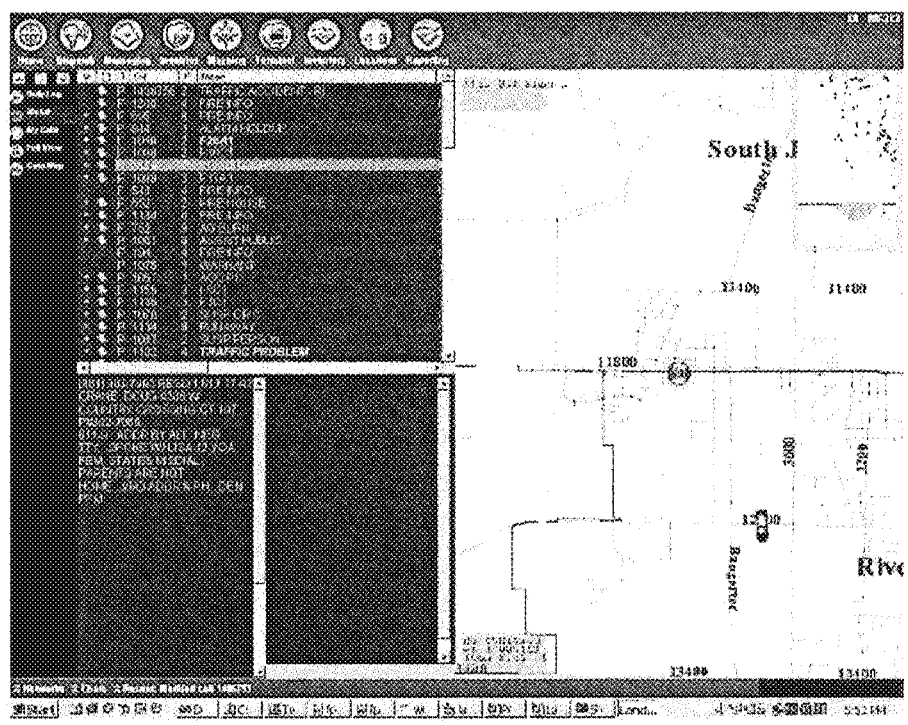
FIGS. 17-18 illustrate dynamic dispatch and mapping technology that identifies precise and current location of units/users/devices in accordance with an embodiment of the present invention.
Figure 18:
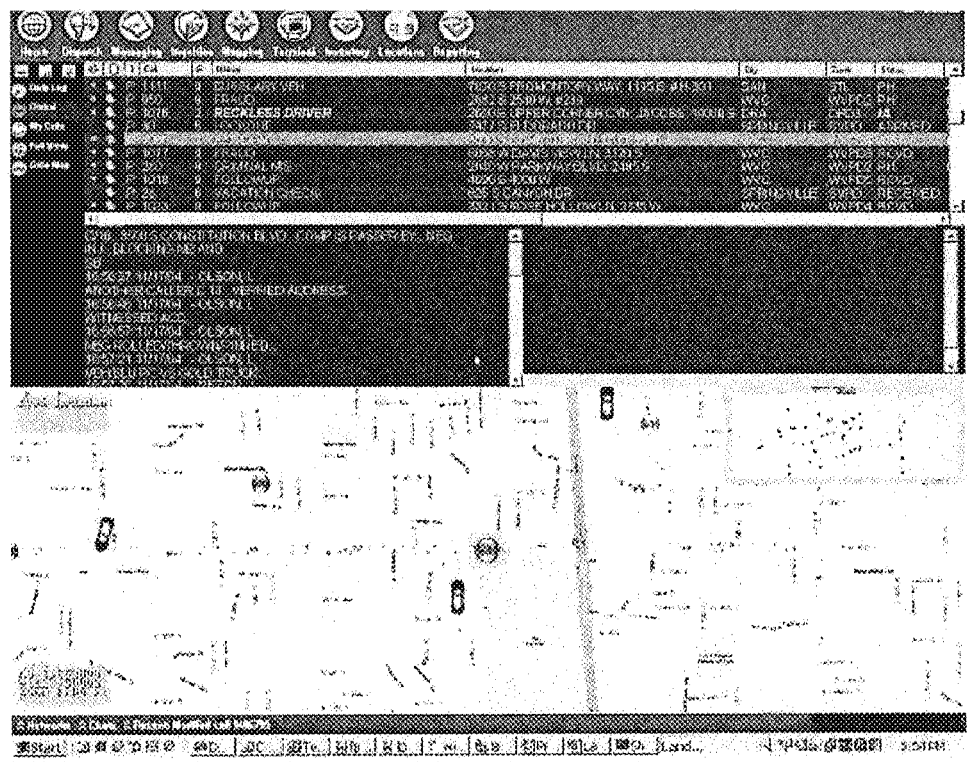
Figure 19:
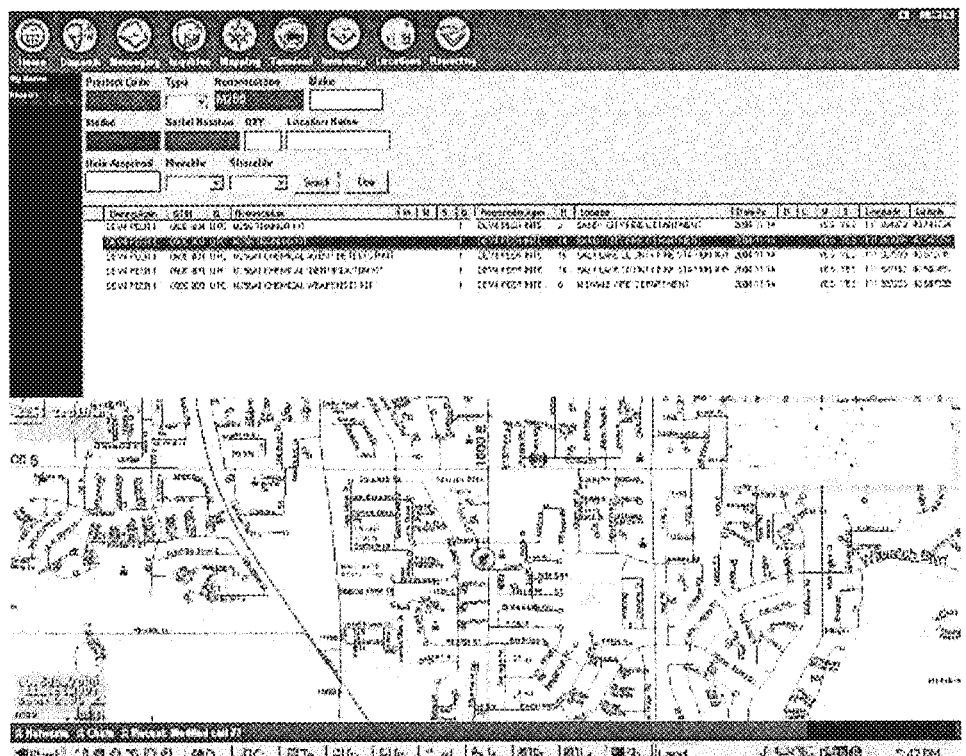
FIGS. 19-20 illustrate additional dynamic mapping technology that identifies various available resources in accordance with embodiments of the present invention.
Figure 20:
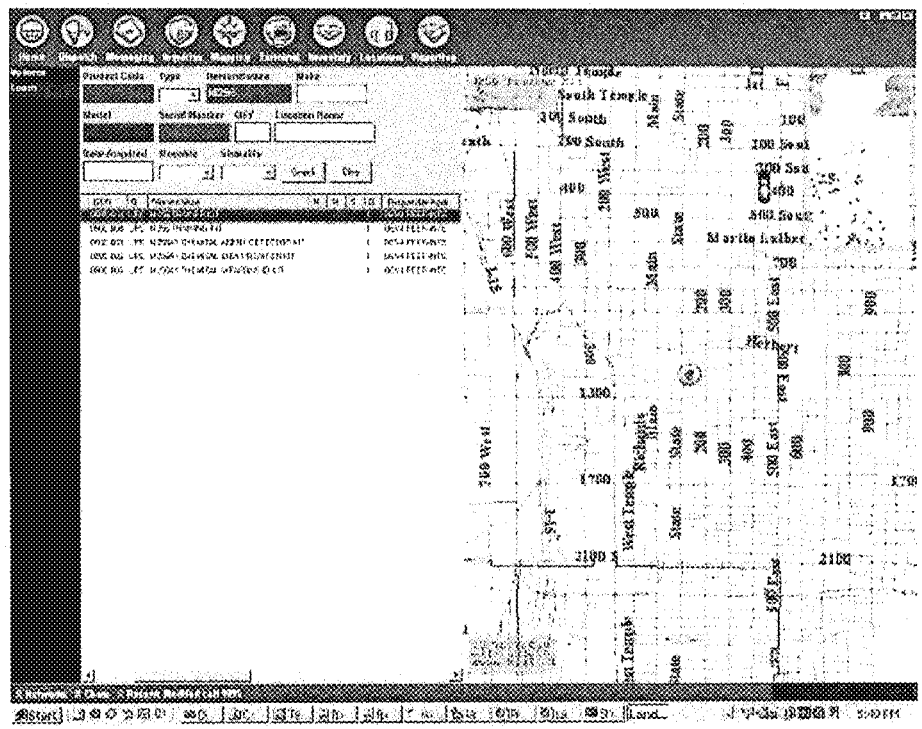
Figure 21:
FIG. 21 illustrates dynamic messaging in accordance with an embodiment of the present invention.

FIG. 16 illustrates representative mapping, which includes a digital compass, large map and a mini-map. The mini-map shows a global image of the region while the large map displays the current area. A variety of information can be displayed on the map including calls, units, buildings, hydrants, and other geographically related information. FIGS. 17-20 illustrate representative mapping and dispatching technologies. FIG. 21 illustrates representative messaging. In FIG. 21, a chat screen is provided listing users within the system and their current status, agency, username, etc. Real-time communication takes place within and/or across agency boundaries.

Figure 22:
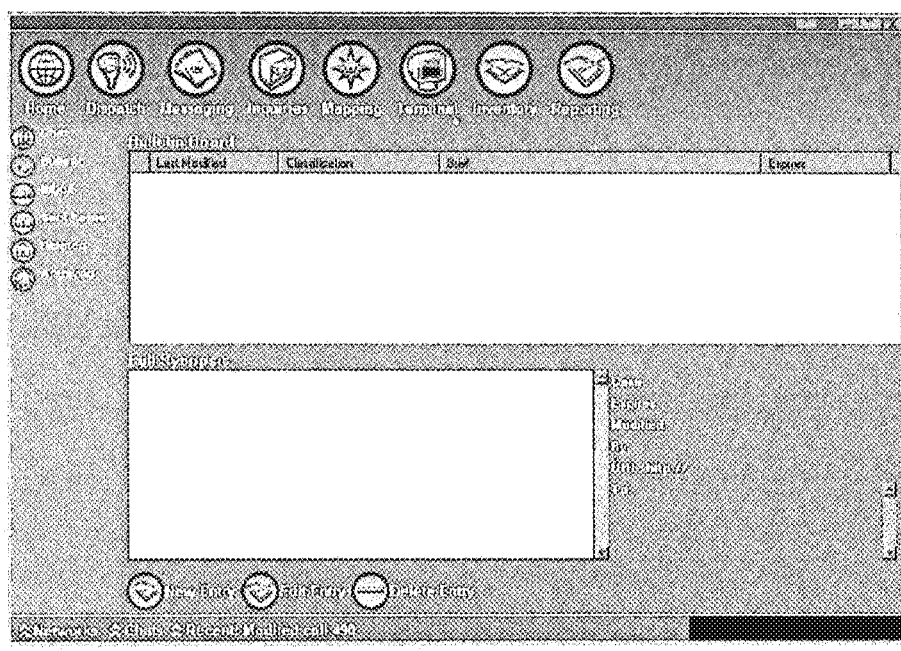
FIG. 22 illustrates a representative broadcast or bulletin available across disparate agency or jurisdictional boundaries in real time in accordance with an embodiment of the present invention.

FIG. 22 illustrates a representative broadcast or bulletin available in real-time across agency or jurisdictional boundaries. Active bulletins may pertain to stolen vehicles, attempts to locate, missing persons, Amber alerts, wanted persons, or the like.

Figure 23:
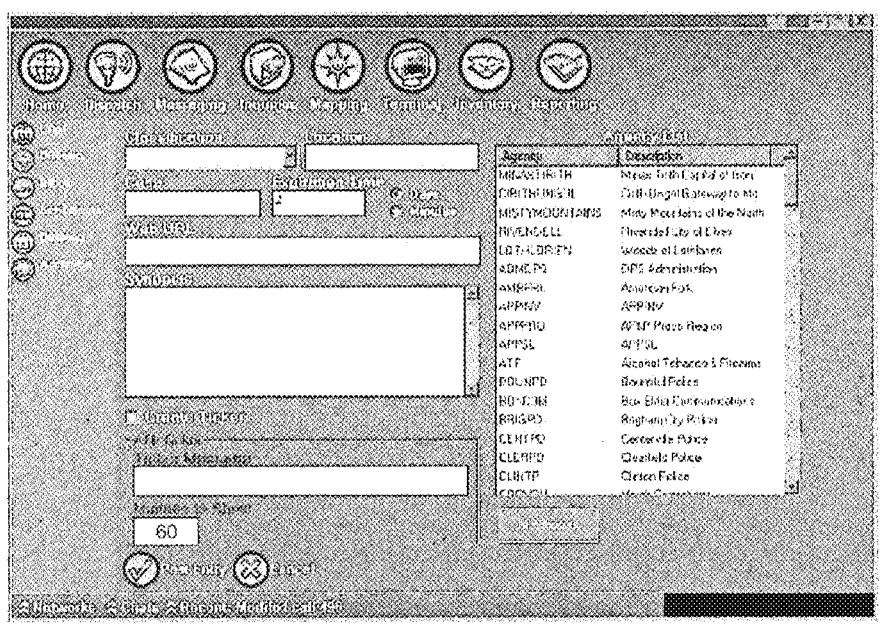
FIG. 23 illustrates a representative manner for dissemination of information across disparate jurisdictional boundaries in accordance with an embodiment of the present invention.
Figure 24:
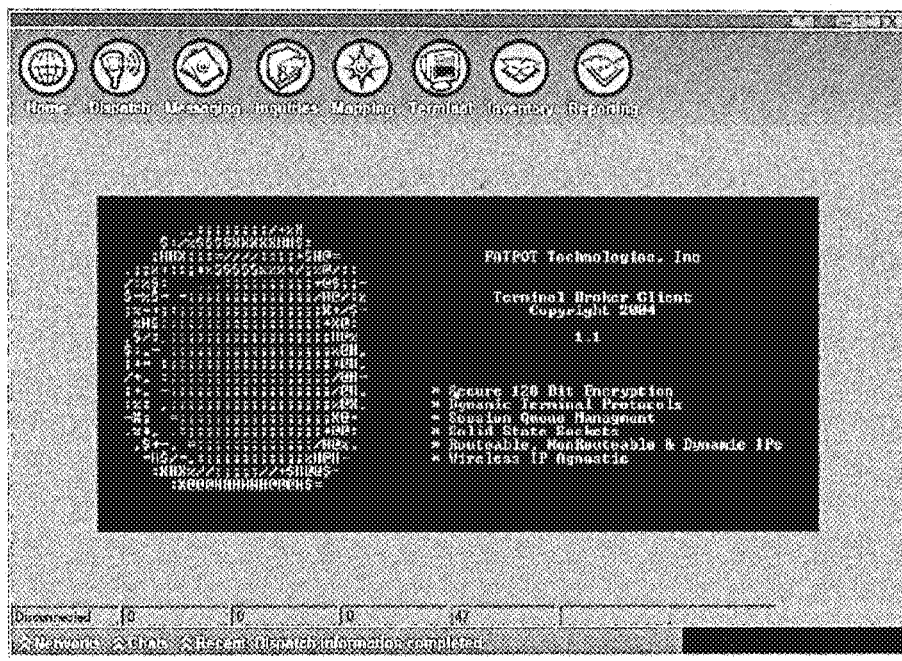
FIG. 24 illustrates representative terminal emulation to access telnet capable systems across disparate boundaries in accordance with an embodiment of the present invention.
Figure 25:
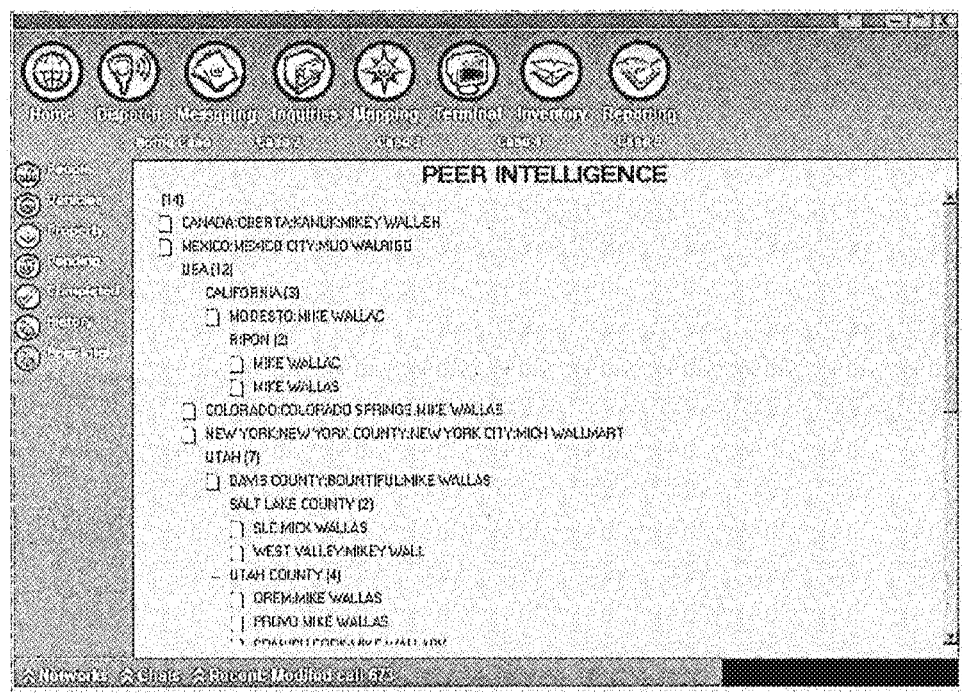
FIG. 25 illustrates representative information that is found and grouped into a display in accordance with an embodiment of the present invention.

FIG. 23 illustrates a representative manner for dissemination of information across jurisdictional boundaries. In at least some embodiments, the dissemination is in real-time. FIG. 24 illustrates representative terminal emulation to access telnet capable systems (Terminal Emulation™). For example, users can securely communicate over disparate wireless mediums. FIG. 25 illustrates representative information that is found and grouped into a display.

Figure 26:
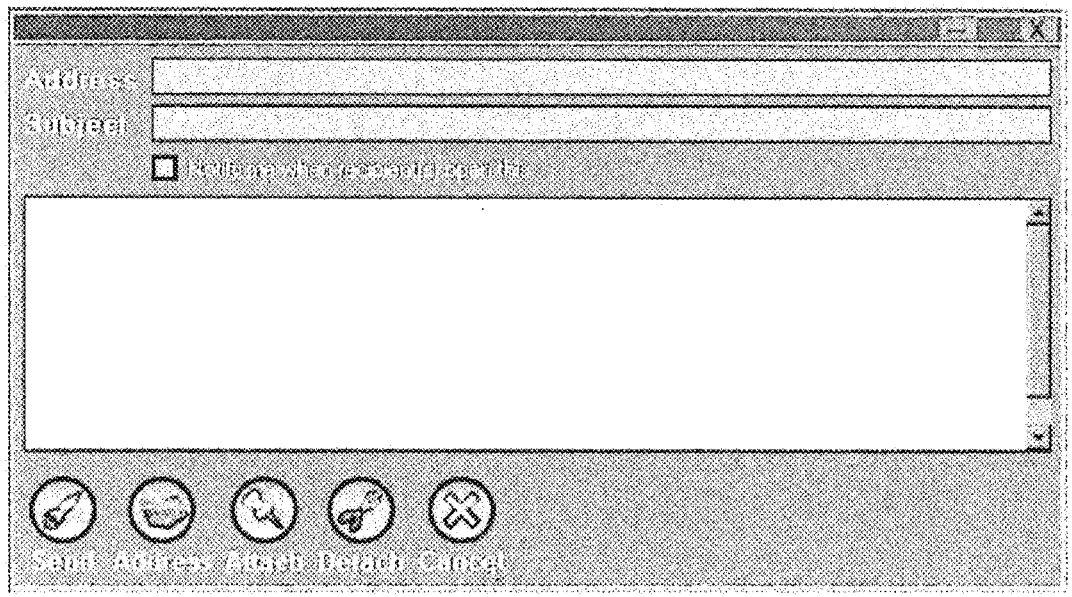
FIG. 26 illustrates representative email capabilities available to dynamically access users across disparate jurisdictional boundaries in accordance with an embodiment of the present invention.
Figure 27:
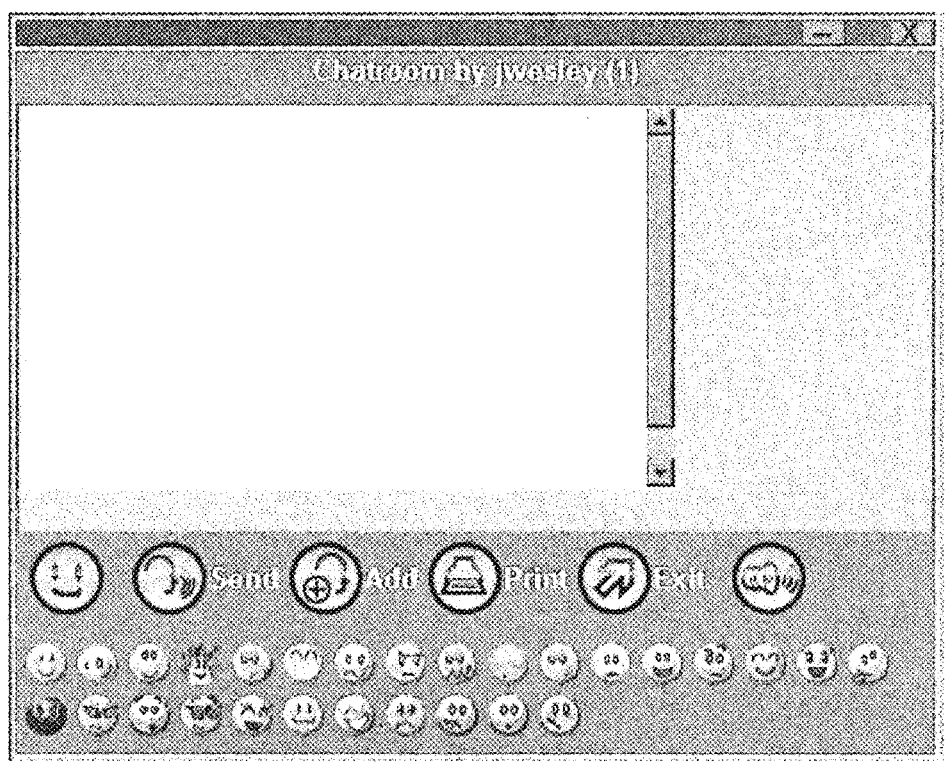
FIG. 27 illustrates dynamic instant messaging available for instant use between users of disparate systems in accordance with an embodiment of the present invention.

FIG. 26 illustrates representative email capabilities available to access users across jurisdictional boundaries. FIG. 27 illustrates representative instant messaging available between users. In at least some embodiments, real-time communication occurs within and/or across jurisdictional boundaries.

At least some embodiments of the present invention embrace use of a network, messaging, mapping, inquiries, field reporting, dispatch and/or terminal emulation. For example, a network includes (i) enhanced wireless protocol for increase performance, (ii) intelligent caching for reducing network traffic and time, (iii) multiple concurrent network support (e.g., 802.11, CDMA, CDPD, GPRS, etc, all running individually or concurrently), (iv) intelligent network protocol segregation (e.g., ability to activate/disable/pause/resume features depending upon available network interfaces), (v) secure and reliable encryption methodologies (e.g., RSA/AES/128 bit cipher strength and higher if necessary), and/or (vi) secure session persistence (e.g., In at least some embodiments, there is no need to use VPN or other expensive network middleware).

Relating to messaging, there exists (i) grouping contact lists with icons depicting status, (ii) mail integration with SMTP and POP3 complaint email servers (i.e., GroupWise, Exchange, etc.), (iii) standard email look-and-feel (e.g., Inbox, Sent Items, Deleted Items, etc.), (iv) easy access to first responders and other users for interoperability communications, (v) broadcast alerts, hot sheets, and any other critical information to local, county, and state agencies within your region or across the country, (vi) a chat room capability to easily be informed of all users and their status while communicating, (vii) a change status to inform users when away, busy, etc., and/or (viii) the ability to read incoming messages to the user.

Mapping capabilities include the dynamic mapping of units responding to a call (within local or remote agency boundaries) or not assigned to the call, but at the scene.) Relating to mapping, there exists (i) auto tracking of all units responding to same call, (ii) the ability to view all calls/units within specified region or location, (iii) customizable images to depict the variety of units, calls, and objects, (iv) units to depict the actual heading while moving, (v) electronic compass, waypoints, and markers to assist user to quickly analyze and locate first responders/calls, (vi) the ability to receive critical information pertaining to the call by location (i.e., floor plans, hydrant data, photos, etc. . . . ), (vii) a self guiding map (e.g., The driver does not have to determine location and bearing from the displayed electronic map and unit position—The map rotates to show exactly what is in front of the unit as it is moving), (viii) zooming capabilities allow the user to view within 1 mile to 100+ mile radius of the unit, and/or (ix) intelligent memory management that examines utilization of the information displayed and caches for performance while reducing the amount of memory required to use a real time interactive mapping system. Embodiments embrace the functionality of the split-screens, and the ability to not only plot the calls on a map, but also the ability to highlight a call by clicking on the icon on the map, or bringing any call (icon) to the center of the map by clicking on the dispatch line on the split screen portion that shows calls in text format.

Regarding inquires, there exists the ability to (i) perform lookups to numerous external systems without redundant field entry (ii) provide a self-limiting inquiry selection (e.g., The system is able to determine which databases can be queried depending upon the information entered for submission), (iii) easily read inquiry results with tables, colors, and images, (iv) read inquiry results to user (if desired) in order to reduce the time for an officer to interact with the system when the user is performing multiple tasks concurrently, and/or (v) segregate multiple inquiries into an easy to understand manner using multiple forms of tabs, groups, and lists. (e.g., the design allows an end user to easily track, manage, and locate information on the desired search criteria.)

Regarding field reporting, there exists the ability to provide (i) auto field population of report forms and systems from inquiry results, which reduce the amount of redundant data entry, (ii) approval process for data submissions (e.g., Authorized individuals can reject submissions for correction or accept for official document), (iii) self updating forms and data entry constraint (e.g., Does not require manual installation and upgrades for modifications), (iv) inquiries on submitted data before final approval, (v) functionality that does not allow data to be submitted for approval until all fields meet the required constraints, (vi) the ability to customizably meet the necessary incident base reporting guidelines/restrictions, and/or (vii) chain of command approval process before final submission, as well as the dynamic submission of reports to their respective and required destinations. Some embodiments provide enhanced report capabilities that bring together the disparate data sources Regarding dispatch, there exists functionality to (i) alter appearance for clear distinction of modified calls, (ii) perform intelligent sorting (e.g., The ability to sort numerical columns, Alphanumeric columns, date, time, etc.), (iii) provide a built in messaging window that provides an auto chat room created on-the-fly for every call Automatic Communications Environment), that allows each responder assigned to call to be able to send/receive messages, that easily views all responders on same call, that provides quick access to dispatcher/first responder(s), and/or allows additional privileged individuals to view information, and/or (iv) provide a powerful grouping capability to segregate/group information by an number of combinations (City→Status, City→Zone, etc. . . . ), to provide user activity tracking within a daily log (e.g., All status, inquiries, and activities can be tracked within a daily log and accessed by the user and other privileged users), and/or to provide a timeline of events that are tracked for all activity (self initiated or not) occurring for the user. Daily logs can be sent dynamically and stored in other agency systems.

Regarding terminal emulation (Terminal Emulation), there exists the ability to (i) support most common protocols (e.g., 5250, 3270, VT200, ANSI, etc.), (ii) provide session persistence over unreliable network connections (e.g., Able to resume session to remote system without needing to lose work or log in again), and/or (iii) provide encrypted transmission to remote systems, unlike standard telnet applications.

A computer aided dispatch interface (Cerebro™/CADi™) is an interface that is capable of integrating numerous disparate CAD systems together and providing one interface to interact and access the information. There exists security within the interface, with access limited to authorized users. The ability to link numerous systems together as one unit is a very powerful tool for a number of industries, including public safety. This technology provides new types of applications and analysis.

A computer aided dispatch interface (CADi™) may be used to inform mobile clients (FATPOT™ PSI Powwow™) with unit, call, and other active information. CADi™ is also used to perform silent dispatching and cross agency coordination between multiple CAD systems. Some departments perform statewide real time statistical and crime analysis using our flexible product. In at least one embodiment, this is made possible because of the integration of disparate data (Cerebro™/CADi™) and the capability of analyzing integrated data for analysis and reporting through means of crystal reports or like applications and systems. This provides the capability of integrating disparate data in real time, and then scripting the uses and behavior to interface to applications and systems of choice. Mobile data client systems include 128 bit RSA AES based encryption covering all forms of communication to ensure that data and safety is never compromised.

In at least some embodiments, a touch screen friendly interface is provided that includes the following representative functionalities:

Messaging: Client applications, such as but not limited to FATPOT™ Landmark™ and Enfuego™, come with a fully featured messaging system that allows a user to have instant communication with other users of an agency as well as with professionals in other agencies. The applications access regular internet email, although support for scripts and executable attachments are removed to ensure that network security is not compromised. Chat rooms for individual or group chat allow for instant communication with other professionals that may have information relevant to the present call.

HotSheets™ and ATLs which are available digitally and as running tickers on computer devices, allow a specific place and instant awareness for time sensitive situations without losing the critical nature of high priority situations inside normal, lower priority messages. The application even takes advantage of text to speech capabilities of some computers to allow participation in a urgent chat, or hear the words of a new ATL without requiring the officer (user) having to pull over his unit, or take his/her eyes off the road as he/she is driving.

In some embodiments, Buddy Lists™ are supported to keep a user in quick contact with common associates. The server can also auto-populate groups so the user can instantly see who the current on duty dispatchers or HazMat™ globally specialists, and so forth are without even knowing them.

Logging: A variety of Fire and EMS users log some or all of their activities in the vehicles. To simplify this process, there exists a logging feature that can also push the completed results to a central server to satisfy reporting requirements from the unit.

Dispatch: Interface is made with disparate CAD systems to give fully detailed information to responding units without having to tie up valuable radio time. In cases where the CAD vendor allows integration, the system can even enable silent dispatching which can become a critical asset for any time sensitive operation. Silent dispatching is a process in which an officer clicks a button (i.e., en route, arrived, and so forth) which pushes the information regarding his/her position as it relates to responding to a call directly back into a CAD system. This can occur without having to use a radio.

The Dispatch screen has undergone considerable improvements to allow a single interface to support the first responder as well as the senior dispatch chiefs for an entire state. The columns of information can be sorted and customized in any order to support the needs of the user. Additionally, voice alerts are provided for updated information and the records are tagged with an exclamation to quickly draw your attention to new information.

A chat room is instantly associated with each individual call (Automatic Communications Environment). Accordingly, all responders to a situation, whether seen by Fire, Police, and EMS, or Patrol Sergeants, Dispatchers, or Hospital Workers can be brought together in this digital environment to ensure the fastest response is provided with all parties aware of every step of the solution.

In some embodiments, real-time dispatch information from dispatch centers all over a given area (e.g., a state, a country, etc.) is efficiently managed and the integrated call chat room allows coordination to occur without the delays of radio and telephone which could mean the difference between life and death. In a more simple example, two jurisdictions responding to a normal call are automatically and instantly enabled to communicate, making coordination of response and incident management much easier than it has heretofore been in the Public Safety industry.

Embodiments of the present invention also include an ability to group the information available by simply dragging columns into the order that supports the needs of the user. This provides unlimited flexibility in managing call centers with high volumes, or even to take multiple call centers and merge them in order to provide more efficient support to the tax payer's safety dollar.

In one embodiment a particular county is managed by grouping first by city and then by status to see exactly where the real activity is taking place.

FATPOT™ HazMat™: It is important to a Fire Professional to have up-to-date and detailed information of a location that has hazardous materials on hand. FATPOT™ Enfuego™ provides an interface that is tailored to connect to existing HazMat™ systems, or even a simple database a user can begin building on his/her own. By directly linking the call address to information in your system, a user has the ability to add, view, or change information regarding HazMat to maximize safety in a fire or other emergency situation regarding HazMat.

Terminal Service: Embodiments of the present invention further include allowing clients to access legacy systems from the field, home, or desk and not fear power or network outages. A terminal manager allows a user to shut down a system out in the patrol unit and walk into the office and continue a session where the user left off on his/her desk computer as though the user had been working there the entire time. No more lost work, no more frustration of having to repeatedly log in and navigate to the last location where the user lost the connection. Further, communications are encrypted over a 128 bit encrypted, which is FBI, or NCIC-approved technology.

Inquiries: Clients, including mobile clients, efficiently manage queries across multiple systems. Everything down to the input forms itself and is customizable by individual agencies using the scripting language (FPScript™) of the present invention. As the individual fields are input, the application performs all the data integrity checks and dynamically builds a list of all the available information sources. Embodiments have the ability to query directly into an RMS system from the field (Data Broker™). If the user is a member of the network, the user can query into other agency's RMS systems that have been authorized for sharing with the public safety community (see Peer Intelligence™ Data Sharing Network).

A "person" search for "John Doe" is easy to follow and work with using color coded fields, drop down lists, that are big enough to work with even on a touch screen laptop.

Investigations: A number of professionals, including Fire professionals, in particular are faced with the task of always explaining why something occurred. To support this, Enfuego™ has added an area specifically tailored to document, diagram, and annotate information regarding a fire, emergency, or other mishap. Provided that an agency already has stored information on premise information and floor plans, mobile clients of the present invention, including Enfuego™ can integrate into the existing system to view all available information, which dramatically reduces the amount of research concerning a particular incident, as well as other documentation required in the field that would be associated with a particular incident.

Data Sharing: Since criminals do not stay in one place, it is helpful that the network allows a user to access existing records systems to the public safety community without having to change either the user's system or the entire public safety community system. Accordingly, the system provides a DOJ compliant system. By then adding some intelligence to the way data is searched for and presented, quick research can be performed into the criminal background of a subject, with available information returning in seconds instead of what used to take detectives much longer, even weeks to discover. Embodiments allow the ability to receive far more information pertaining to a subject immediately through the searching capabilities of Peer Intelligence™.

Embodiments embrace an enhanced way to link together the data that already exists in current records without having to change the way records are kept. Agency control is provided as to who an agency authorizes data sharing with, and what information they can access.

Mapping: Capabilities are provided that allow visual management of vehicles, fleets, etc. as well as providing dynamic visual information relating to location. With a GPS receiver and a map scanned into our systems, a user can quickly have the user's unit, other units, calls, and other related data points plotted right in front of the user leaving no question where they are, where they are trying to go, and available resources and pertinent information relating the user's needs. Much time is saved adjusting new personnel to the area such as not having to memorize maps, locations, and other learning-curve logistics relating to an officer's beat. Time saved can be better utilized accessing resources to help with particular incidents relating to an officer's job.

When integrated with a FATPOT™ MAPView™ client, a mobile data client turns into a powerful display for responding to incident and crisis areas. The basic mobile mapping client will show the call and location, but MAPView™ can take all the criminal analysis already done, as well as other sources of information on locations and push them directly to the units. Thus, as an example, upon receiving a call for a missing child, a user can instantly see all the nearby sex offenders light up if that database is part of the network. Alternatively, assuming a fire hydrant database is integrated, the user can respond to a fire and gain information on all active and inactive hydrants in the area from someone using MAPView™ so no time is wasted figuring out where the closest hydrant is located. In the fire hydrant example, the data accessible through MAPView™ can also be very detailed, such as to inform users of whether a particular hydrant is active or inactive. This instant information availability can be life-saving given certain circumstances. Instant and reliable information on a location, surrounding resources, and other available data not only can shave seconds of response time which can often mean one more life saved, but can add needed information to assist in critical at-the-scene decision-making.

Patient Care Records: Embodiments of the present invention meet the customer's unique needs. For example, the patient care records portion of Enfuego™ is a global example of flexibility by understanding that between HL7, NEMSIS, NHTSA, etc. Every agency has different reporting needs. Patient care records are completely customizable to meet local needs as well as the ability to integrate into the user's current system. Enfuego™ integrates into patient monitoring devices to keep the hospital updated in real-time on the patient they are about to receive. Also, these patient care records are available and accessible to authorized individuals a seamless transfer of new, updated, and/or modified records can be performed. The process of access and transferring of such records from first response, ambulance care, to the hospital offer significant efficiencies in terms of miscommunication, duplication of data entry, and other key items relating to the process of an emergency incident.

Administrators can custom design forms to push out to the clients allowing maximum flexibility on information management and reporting. These forms are integrated within existing systems for efficiencies of job-related process.

In accordance with embodiments of the present invention, products are network agnostic and can even take advantage of multiple present connections. Thus, whether a user employs radio, cellular, wireless, or a regular LAN, the user will be getting the best performance without requiring any intervention or training for the user (FPSockets).

Mobile applications, including Landmark™ and Enfuego™ provide solutions for linking professionals in the field to the data they need to make decisions and save lives.

Some embodiments are integrated with SMTP and POP3 mail systems so that they can create a service on the backend that can be customized for users to access their personal, corporate, and agency mail systems so additional client software does not need to be installed in the mobile client wherever it may reside, because the product is already SMTP and POP3 compliant. Further, broker capabilities are available that limit which types of mail items can be sent to the user, what type of attachments can be sent and be filtered so that it would not overload a wireless connection. Thus, smaller data packets or abbreviated information is transmitted on lower bandwidth mediums, and more information is sent over an 802.11 medium.

In one embodiment, there is a hot key (Ctrl-Space) to quickly navigate to the last incoming message. The hot key is also relevant to instant messaging. For example, if someone was trying to invite a user to a chat room, or other communications environment, the user would have to navigate with the mouse or series of keys to get to the messaging screen, get to the buddy screen, double click on the invitation. Alternatively, with the hot key, the recent list is shown and then instantly the user is allowed to either join automatically or click into the invitation at the user's discretion. If it were a mail item, the user can use the hot key to open the mail message and take the user right there and read the message. If it's a modified CAD call, using the hot key takes the user right to the CAD screen, selects the CAD call, shows what's been modified, displays a narrative, and provides contact information.

In some embodiments, the inquiry results are dynamically grouped. When performing a look-up, the application moves into the query view. And, based upon every grouping of lookups, if a driver's license, warrants, and vehicle or insurance information of a person is looked up, the user selects all of these items and they are all grouped underneath the person's name. The user can see the current status of all the inquiry results (i.e., pending, completed, read or not). When the user is done with the inquiry and that particular tab is no longer needed, the user closes that item and it moves over to the user's history and is associated with the daily log. Thus, there is significantly less navigation, less clutter, and better grouping of the information related to the specific query that was performed. In some embodiments, a daily log is provided so users can keep track of everything they have done. It tracks being dispatched to a call, where their vehicles have been driving, etc. In the daily log, notes are created and comments made to every incident or case that the user has been involved with as well as all the lookups that were performed. Accordingly, users are able to manage all daily events, and this information is saved such that all information relating to a particular officer on any specific day can be retrieved from within the agency's system. This provides a powerful auditing and management tool.

With the dynamic integration of disparate systems, the mobile client communicates directly with the client service that's running on that computer and requests to see if there are any updates. If there are updates, the technology will gather available updates and perform the updates based on rules put in place for proper bandwidth and network allocation and data transmission coordination (DataSync™). So, if its wireless it will not do any updates until sufficient bandwidth exists, it will go ahead and use the network device and the client will perform the update and move everything across pertaining to transmitting, photos, email, to maps, or other databases that contain data for hydrants, floor plans, or other relevant information. These updates can be performed through streaming, clumping, or in a trickle-feeding method, depending on the rules established on the network.

As discussed above, embodiments embrace dynamic mapping technology. Such mapping technology is able to communicate to numerous hardware devices. It's a service that's installed on the machine that communicates to the different types of devices that would be plugged in either through serial, USB, or radio equipment. It gathers the coordinates and coverts them to the mobile products so a user can see where he or she is located on the corresponding map. Even when a mobile client loses its network connection, the view within the mobile client is unaffected. This is the case because this process does not flow through the network. The software is communicating directly with the device and the associated locations are plotted directly on the map within the mobile client without the need of a network interface.

In some embodiments, an alias capability is utilized, which allows a user to create an alias command, such that it can group a series of commands together. For instance if a user wanted to perform a particular lookup that he or she is accustomed to doing, which always includes drivers licenses and warrants, the user would just give that particular grouping of look ups a name of MI for multiple inquiry to create an alias called MI and it will look up these two systems. So, the system will automatically know to go ahead and do those lookups based upon the alias name created, and create a tab underneath the people vehicle property section and put it into the query. This facilitates dispatchers with quick access to predefined queries, using user friendly names without having to manually navigate through the system, clicking on each of those lookups. They can create these customized lookups themselves.

Embodiments of the present invention further embrace "automatically creating communications environments and/or automatically coordinating users placed within a communication environment). For example, users assigned to calls are dynamically identified, and can either be invited to enter a communication environment such as an electronic chat concerning that call, or can be immediately placed into said communications environment. Backend server technology automatically creates a communications environment for every dispatch call. So if a user has multiple agencies responding to a particular call, all of the first responders regardless of whether they are a fire truck, an EMT, a police car, a sheriff, etc., they all dynamically become members of that particular call or event. And all of the dispatchers, even on separate CAD systems, will be able to communicate together, as well as with all first responders. So, the user just types what he/she wants on the dispatch screen in the shared common communication environment and when the user types it, all the other first responders receive it. This facilitates—communication with all the first responders. This technology is made useful in the public safety industry and other industries.

In some embodiments, a sergeant, chief, or anybody else in administration, can go ahead and join a communications environment call or chat room even without being assigned to the call. They have pre-established network-associated authorized rights to join a particular dispatch call just to get a status of what is taking place.

At least some embodiments of the present invention provide further capabilities. Examples include an automated daily log, which ties across all systems to allow the automated recording of daily activities. Calls, time stamps, free form narratives, or anything relating to training, education, can be automatically populated into the daily log. Field Reporting dynamically sends a report to a desired location. An inventory provides a full enterprise-level inv-management/property management (chain of custody), up to the management level. It tracks and manages funding of accounts, delegation of responsibility to departments for managing accounts. This trickles to a first responder giving a shot, that item is deducted from a department all the way to a billing company. Thus, as discussed herein, the embodiments of the present invention embrace dynamically integrating disparate data systems. In particular, the present invention relates to systems and methods for seamlessly integrating disparate data systems to securely, customizably and dynamically collaborate, access and/or share information over unlimited protocols over multiple frequencies. Manage locations integrate floor plans for areas and a development of premise history from disparate records management systems. Thus, a response to an incident gives a full array of information to give knowledge to a response. Personnel management provides a roster, and intelligent scheduling shifts, track training, licensing, and certification for all associated personnel, performance recording, fitness reports, and however they manage their personnel.

Thus as discussed herein, embodiments of the present invention relate to dynamically integrating disparate data systems. In particular, embodiments of the present invention relate to systems and methods for seamlessly integrating disparate data systems to securely, customizably and dynamically collaborate and share real-time information, and for providing intelligent data sharing that supports multiple standards concurrently and provides automatic conversioning of data information. In at least some embodiments, based on the data translation process, the entire system becomes unified and acts as if it were a single highly effective system, with equal capabilities and functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Dynamically Integrating Disparate Computer-Aided Dispatch Systems

Systems and methods according to embodiments of the present invention provide clustering and interoperability between disparate computer-aided dispatch (CAD) systems. CAD systems are commonly used to automate the collection and tracking of information on emergency situations related public safety, and for the assignment of public safety personnel for the purpose of mitigating and resolving the emergency situations. In many instances, each municipality has its own CAD system. Additionally, each agency (e.g. police dispatch, fire dispatch, ambulance dispatch) within a municipality may have its own CAD system. It can be advantageous to have such CAD systems communicate with each other for various reasons. For example, within a municipality having multiple CAD systems, it can be advantageous to have CAD systems communicate with each other so that each associated entity/agency is aware of the resources available to respond to an emergency and/or aware of the resources allocated by the other entities/agencies. Similarly, many municipalities have agreements with one or more adjacent municipalities to share resources and/or response capabilities/responsibilities in the event of an emergency situation. Communication between CAD systems can be advantageous for other reasons not specifically enumerated herein.

Figure 28:
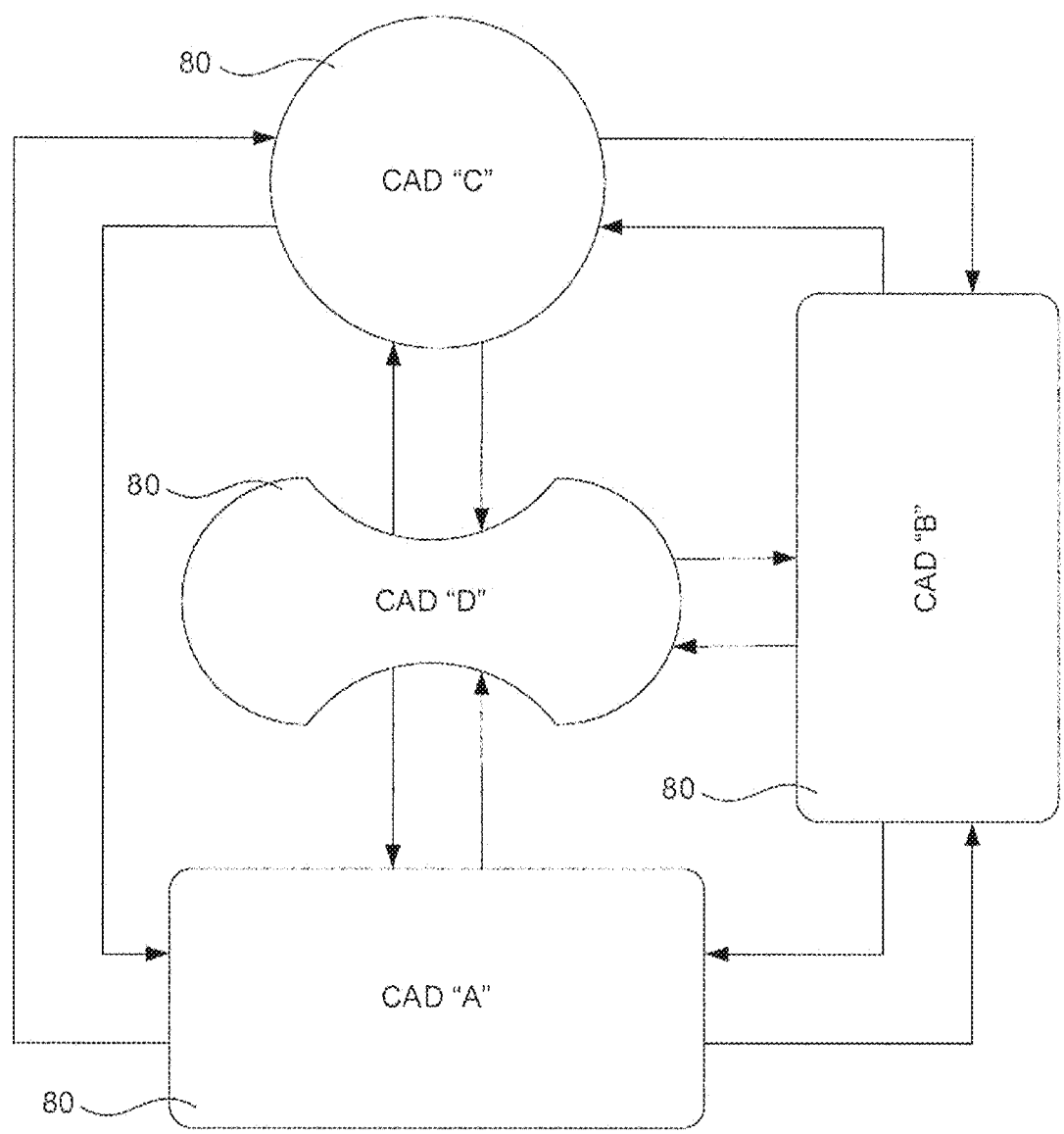
FIG. 28 illustrates communications necessities between interconnected computer-aided dispatch (CAD) system.

While communication between CAD systems is advantageous, it can be difficult to adequately implement. For example, FIG. 28 illustrates the communication necessities of communicatively interlinking four CAD systems 80, CAD "A," CAD "B," CAD "C," and CAD "D." If all four CAD systems 80 are to be communicatively interconnected in the manner shown, communications must be reliably exchanged between any two of the CAD systems 80. As each CAD system 80 may use different communications protocols, languages, codes, messages, field values, etc., interconnecting two CAD systems 80 requires that specific controlled transformations of information occur as the information is exchanged. Traditionally, such CAD-to-CAD interoperability solutions have been built using individually-tailored adapter and data transformation orchestrations that were rigid and customized. This approach requires a point-to-point design that is ill adapted to large-scale integration.

For example, consider the four-CAD arrangement of FIG. 28. To achieve interoperability between the four CAD systems 80, requires customizing and tailoring six bi-directional communication adaptations/transformations, or twelve uni-directional communication adaptations/transformations. If interoperability is desired with a fifth CAD system 80, an additional four bi-directional or eight uni-directional communication adaptations/transformations are required. Finally, if one CAD system 80 is changed, upgraded, etc., such as due to routine maintenance, a large number of communication adaptations/transformations require support, customization, and updating. Therefore, the costs of implementing and maintaining such interoperability have severely limited existing attempts to achieve interoperability. For example, in most existing systems when a communication is sent from one CAD system 80 to another, each interaction is considered complete as soon as it is translated and sent. The interactions are thus stateless in that once sent they convey no further information between systems. No further tracking and interoperability has been achieved by existing systems.

Systems and methods according to embodiments of the present invention achieve the desired interoperability depicted in FIG. 28 with additional benefits as will be described below. In embodiments of the invention, multiple disparate CAD systems 80 are provided with bi-directional interoperability such that requests, operations, and information can be translated and can flow in either or both directions between CAD systems 80. This allows the formation of unified regional systems across the multiple disparate CAD systems 80. In some embodiments, this is achieved by way of advanced processes and systems linking the CAD systems 80. The processes and systems include computer programs, data structures, algorithms, and may be implemented and deployed on computer-readable media. Embodiments of the invention have been termed CADfusion™.

Figure 29:
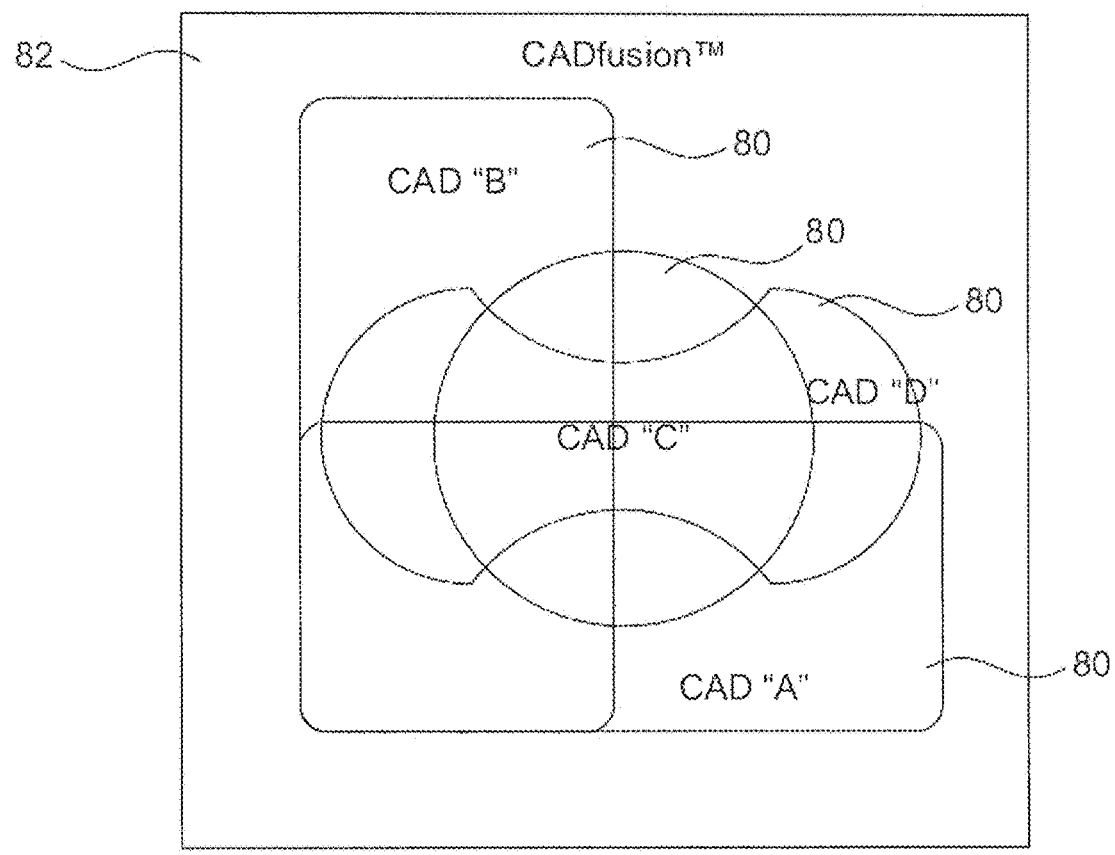
FIG. 29 illustrates how embodiments of the present invention provide communication between interconnected CAD systems at desired points of overlap.

FIG. 29 illustrates one way of viewing the function of CADfusion™. A CADfusion™ system 82 is illustrated as encompassing the various CAD systems 80. The CADfusion™ system 82 attempts to maintain complete and current perspectives of all CAD call and unit status information for each CAD system 80 connected to the CADfusion™ system 82, which acts as a clustering and interoperability system. The CADfusion™ system 82 tracks inbound information (what the CAD systems 80 have told the CADfusion™ system 82) and outbound information (what the CADfusion™ system 82 has told the CAD systems 80). The CADfusion™ system 82 also maintains a superset perspective of the state of all CAD systems 80, providing a master CAD perspective.

In this way, the CADfusion™ system 82 can manage a stateful ongoing interaction between CAD systems 80. As illustrated in FIG. 29, each CAD system 80 has a certain perspective of the relevant portion of the world, and the perspectives of multiple CAD systems 80 overlap in certain areas and not in others. The CADfusion™ system 82 understands each system's perspective and the overlaps, and intelligently manages the ongoing exchange of information, requests, and operations to share the data relative to a particular CAD system 80. Therefore, data not relative to a particular CAD system 80 need not be shared with that CAD system 80.

A CAD call that is shared across multiple CAD systems 80 is kept active in the CADfusion™ system 82 until all CAD systems 80 interested in the call have closed the call. The closing of the call indicates that each CAD system 80 is no longer interested in the call and no longer needs to receive information about the call. The CADfusion™ system 82 also synchronizes call and unit status updates between interested CAD systems 80 in like fashion. In this way, all parties have the latest information. Thus, the CADfusion™ system 82 provides a state machine of all critical CAD information from connected CAD systems 80.

In some embodiments, information objects in one CAD system 80 are replicated or related to objects in a different CAD system 80. The objects in the various CAD systems 80 need not be similarly represented, but as manipulations in one CAD system 80 may be passed to the other CAD system 80, the objects of the different systems are associated or otherwise bound together. A global call identifier (GCI) or other data key is used within the CADfusion™ system 82 to identify data from the connected CAD systems 80. Calls that are replicated between CAD systems 80 by the CADfusion™ system 82 have a common GCI.

In certain scenarios, multiple data items (e.g. calls, etc.) in a single CAD system 80 may reference a single GCI. One example of how this may occur is when a call from Agency A (having a CAD system 80) is forwarded through the CADfusion™ system 82 to Agency B. Agency B may evaluate the nature of the call and may create individual call records for police, emergency medical services (EMS), and/or fire, each with unique local call identifiers. Since all three calls map back to a single call originating with Agency A, they could all be associated with the same GCI within the CADfusion™ system 82.

One type of data item that can be shared between CAD systems 80 is a resource identifier representing a resource object such as a specific apparatus (e.g. a fire truck having a ladder). Resource objects are often made available through automatic aid or other mutual aid agreements, such as with neighboring agencies. Referencing resources that exist in a separate CAD system 80 utilizes a bound placeholder or virtual resource in the local CAD system 80 corresponding to an external resource somewhere else. The CADfusion™ system 82 supports both static and dynamic binding of shared resources between CAD systems 80.

With static binding, CAD systems connect with the CADfusion™ system 82 and the resources are initially identified (e.g. posted) to the CADfusion™ system 82. As one example, Agency A defines a virtual unit (e.g. labeled A-Ladder01) which is to be mapped to a physical unit of Agency B (e.g. labeled by Agency B as B-EngL03). Once the CAD systems 80 of both agencies are connected to the CADfusion™ system 82, the CADfusion™ system 82 binds the two objects together. Any status updates from Agency B for B-EngL03 are automatically transformed and sent to Agency A as A-Ladder01. The two objects (Agency A's virtual unit and Agency B's representation of its actual unit) are bound together (i.e. statically) as long as the CAD systems are connected to the CADfusion™ system 82.

With dynamic binding, binding of resource objects occurs at the time a CAD system requests (e.g. dispatches) a virtual unit. As an example, Agency A defines a virtual unit representing an external resource (e.g. labeled A-EMS01) that is of a certain class or type (e.g. ambulance). In this example, Agency B has agreed to provide mutual aid in the form of ambulance service to Agency A, but since Agency B has multiple ambulances and does not know which one will be available at the time it is needed by Agency A, Agency B does not wish to assign a specific unit until the time of need. Accordingly, when Agency A actually dispatches its virtual unit A-EMS01, Agency B is notified and prompted to assign a specific resource (e.g. labeled unit B-AMB03) to the request. Upon making the assignment, the CADfusion™ system 82 binds A-EMS01 to B-AMB03 until Agency A releases the unit, whereupon the binding (i.e. dynamic binding) terminates.

As the CADfusion™ system 82 tracks the states of various objects and information, the CADfusion™ system 82 also tracks which CAD system 80 owns or controls an object or data element. The CADfusion™ system 82 prevents transactions from non-controlling CAD systems 80 from modifying the state or value of certain critical objects, such as by maintaining a rights mask. In certain embodiments, control of an object can be transferred to another CAD system 80 through certain operations. For example, in the dynamic binding example discussed above, the assigning and binding of a dynamic resource to a virtual unit of another CAD system 80 temporarily transfers control of that unit to the receiving CAD system 80. In most instances, the loaning CAD system 80 cannot un-assign the loaned unit until the borrowing agency (CAD system 80) releases it.

The above examples of CAD call association and unit resource binding are only two of the many potential types of object associations and bindings that may occur with the CADfusion™ system 82. Establishing, managing, and removing object associations and bindings are functions provided by the CADfusion™ system 82. Once established, these connections assist in defining message publish and subscribe relationship which drive CAD-to-CAD communications.

Communications between CAD systems 80 are facilitated by an intelligent data transformation applied to each message or information exchange between the CAD systems 80. Disparate CAD systems 80 provide different methods for defining and storing information. Independent agencies, even within a single operating municipality or other organization, may also elect to encode their operations and field values differently. A message that needs to be forwarded from one CAD system 80 to another or to multiple other CAD systems 80 may contain many data elements that need to be transformed into the syntax of the target systems and that also need to be transformed into the proper semantics of the target systems.

Figure 30:
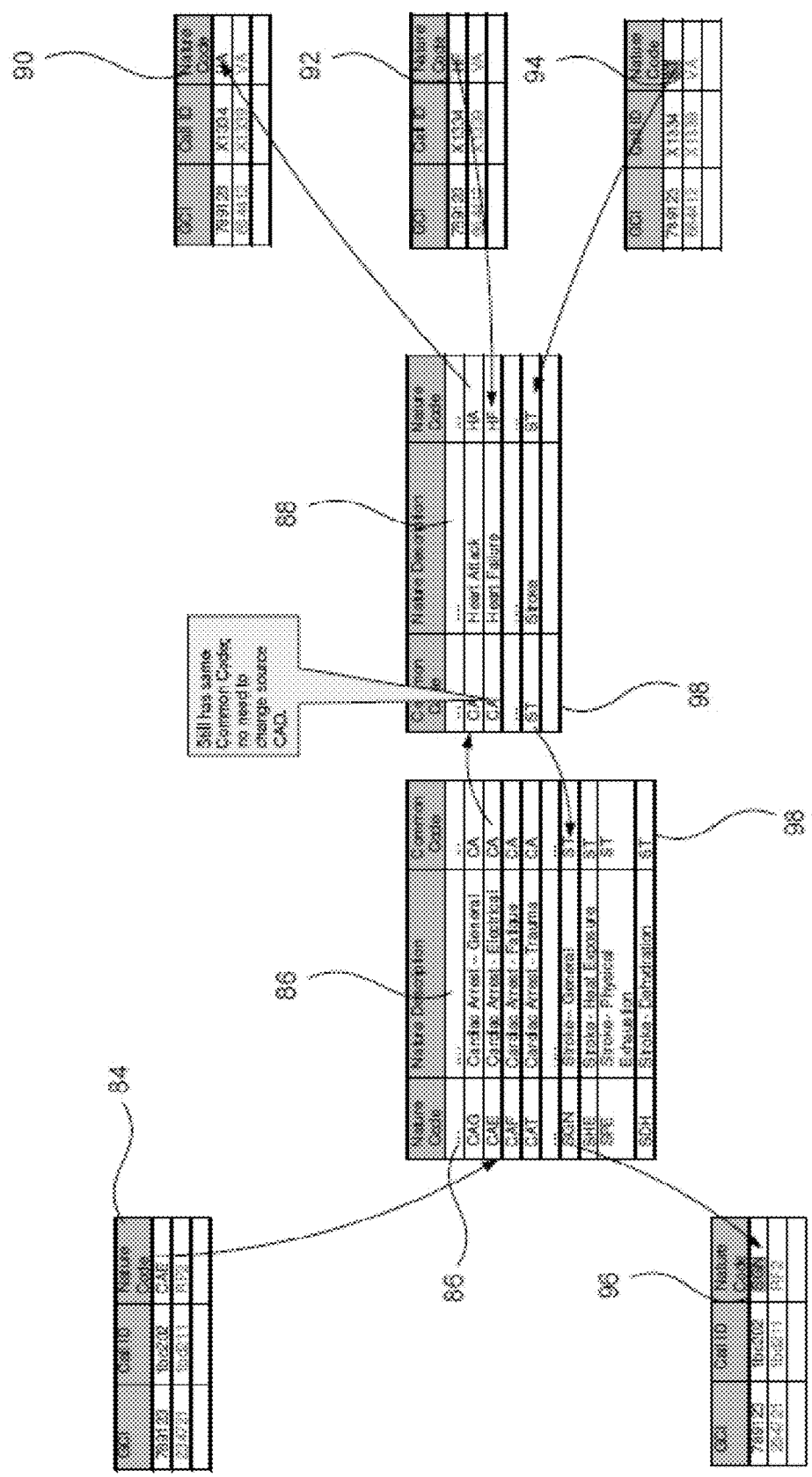
FIG. 30 illustrates intelligent information transformations provided by embodiments of the present invention.

While some data elements may only require a direct translation in either direct, such as A to B in one direction and therefore B to A in the other direction, many data elements are much more complicated. An intelligent transformation process provided by the CADfusion™ system 82 deals with transformation of the complicated data elements. One such data element type is nature codes. Each agency and associated CAD system 80 defines their table of nature codes to support their standard operating procedures. Generally, these codes are different than those used by neighboring entities and agencies. FIG. 30 illustrates how the CADfusion™ system 82 can intelligently transform data items between CAD systems 80 to provide interoperability between the CAD systems 80.

In the example illustrated in FIG. 30, a 9-1-1 dispatcher of Agency A sets the nature code of a call to "CAE" (representing Agency A's designation of Cardiac Arrest—Electrical) in Agency A's CAD system 80 as illustrated at 84. The call is then forwarded to the CADfusion™ system 82 for further forwarding to Agency B, such as to have an ambulance of Agency B respond to the call. As the call is forwarded, the CADfusion™ system 82 assigns a GCI to the call, in this case "789123." Agency B utilizes a different set of nature codes, and does not have a nature code of "CAE." Therefore, for Agency B to understand and properly respond to the call, a transformation of Agency A's CAE nature code is a necessary part of forwarding the message to Agency B. When the CADfusion™ system 82 receives the call, it references data element mapping 86 for Agency A's CAD system 80 as well as data element mapping 88 for Agency B's CAD system 80 and determines that the closest nature code in Agency B's CAD system 80 is code "HA" (representing Agency B's designation of Heart Attack). Therefore, when the CADfusion™ system 82 forwards the call to the CAD system 80 of Agency B, Agency A's nature code of CAE is transformed to HA, along with any other transformations necessary to permit Agency B's CAD system 80 to properly accept and deal with the call, as illustrated at 90.

As discussed previously, the CADfusion™ system 82 provides a stateful system in that it provides continued tracking and updating of information between systems. Therefore, when the call is transformed and passed to the CAD system 80 of Agency B, it is not necessarily terminated in the CAD system 80 of Agency A. Instead, updates of the call may be reflected back to Agency A's CAD system 80. Such reflections, if not intelligently handled and transformed, could create a thrashing situation where two CAD systems 80 can interminably debate the value of a particular data element. The CADfusion™ system 82 intelligently handles reflections to avoid such situations.

For example, suppose, as illustrated at 92 in FIG. 30, that Agency B's dispatched paramedic responding to the call forwarded from Agency A arrives at the scene and discovers a situation different from the situation defined by the nature code HA. Therefore, the paramedic changes the nature code to "HF" (representing Agency B's designation of Heart Failure). This information is reflected back to the CADfusion™ system 82, as the CADfusion™ system 82 maintains ongoing tracking and updating between systems. The updated information is not necessarily passed to Agency A's CAD system 80. Instead, the CADfusion™ system 82 utilizes the data element mapping 88 for Agency B's CAD system 80 and the data element mapping 86 for Agency A's CAD system 80 to determine whether any information update should be forwarded to Agency A's CAD system 80.

The CADfusion™ system 82 includes indirect mapping of each data element from CAD systems 80 to common values 98 across all interconnected CAD systems 80. The common values 98 are derived from and are configured as the greatest common denominators of all values for that element, as may be appreciated from the illustrative data element mapping 86 and the data element mapping 88 of FIG. 30. As illustrated in FIG. 30, the CAD system 80 of Agency A may have four cardiac arrest-related nature codes, namely "CAG" (representing Cardiac Arrest—General), "CAE" (representing Cardiac Arrest—Electrical), "CAF" (representing Cardiac Arrest—Fatigue), and "CAT" (representing Cardiac Arrest—Trauma). Meanwhile, Agency B's CAD system 80 may have two similar but different related nature codes, namely "HA" (representing Heart Attack) and "HF" (representing Heart Failure). When the various CAD systems 80 are initially connected to the CADfusion™ system 82, or when some change or update of the CAD systems 80 occurs, the various data elements (e.g. the nature codes in this case) are originally mapped to the common values 98. In the embodiment illustrated in FIG. 30, and in the case of the various cardiac arrest/heart attack-related nature codes, the common value 98 (representing the greatest common denominator between the various nature codes) is chosen to be "CA" (representing Cardiac Arrest).

Once the common value 98 for the data elements is chosen or selected, the data element mapping 86 and the data element mapping 88 may be generated, with each CAD system's data elements mapped to the selected common values 98. These mappings 86 and 88 and the mapped common values 98 determine how updates are reflected and passed on to other CAD systems 80 or not. In the case where the paramedic changes the Agency B designation from "HA" to "HF" as illustrated at 92, the information is reflected back to the CADfusion™ system 82, which determines that the change still corresponds to the same common value 98 (in this case "CA"), and therefore, no update is needed at the CAD system 80 of Agency A. Therefore, no update is provided to Agency A's CAD system 80.

If, instead, the paramedic arrives at the scene to discover that the true issue is a stroke and not a heart problem, the paramedic might change the nature code to "ST" (representing Agency B's designation of Stroke), as illustrated at 94. As before, this information is reflected back to the CADfusion™ system 82, and a determination is made whether an update should be provided to the CAD system 80 of Agency A. First, the new nature code of ST is transformed to a common value 98 using the data element mapping 88 of Agency B. In this case, the common value 98 is determined to be "ST," representing the greatest common denominator for stroke-related nature codes. Because the common value 98 is different than the original common value 98 of CA, the CADfusion™ system 82 determines that an update to the CAD system 80 of Agency A is needed, and the common value 98 of ST is transformed using the data element mapping 86 of Agency A and forwarded to the CAD system 80 of Agency A, as illustrated at 96. In this case, the nature code forwarded to the CAD system 80 of Agency A is illustrated as being "SGN" (representing Agency A's designation of Stroke—General). As is illustrated in FIG. 30, the GCI remains the same throughout, assisting in the provision of tracking and updates.

A transformation similar to that discussed above occurs for each data element that requires transformation in each message that is exchanged between CAD systems 80 and the CADfusion™ system 82. Although FIG. 30 illustrates specific details of one embodiment's common values 98 and agencies' nature codes, it will be appreciated that those details are merely illustrative. Other embodiments are envisioned with more specific and/or general common values 98 (e.g. each common value 98 being mapped to more or fewer data elements), and/or with common values 98 represented using other designators, including numbers or any other code or representation.

Figure 31:
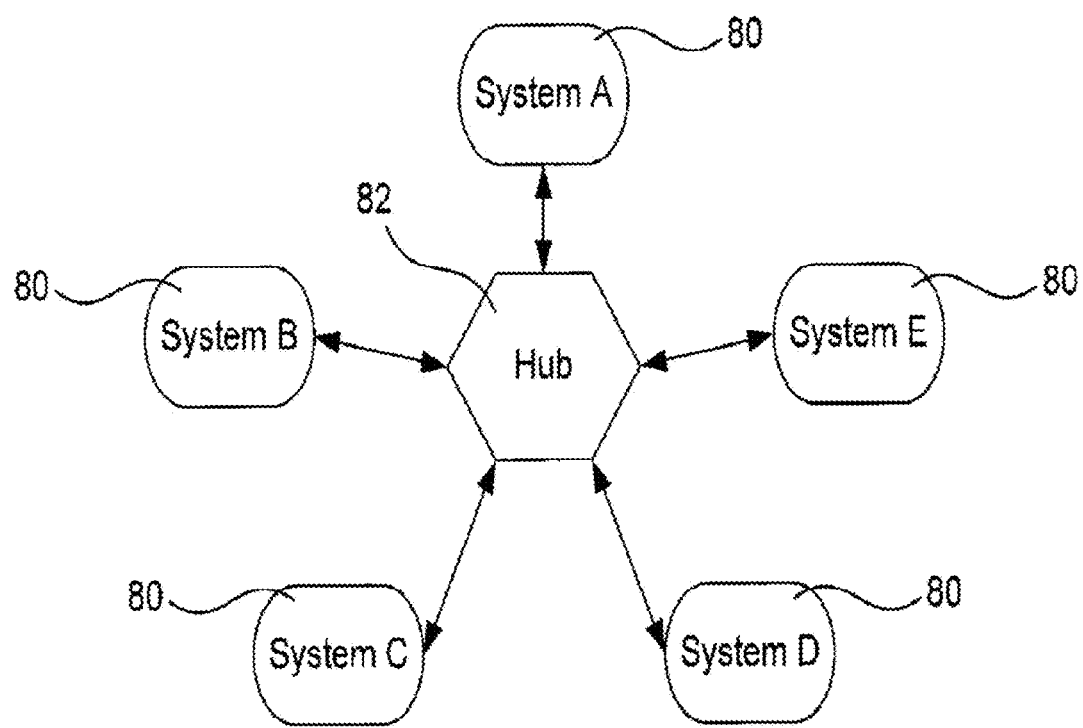
FIG. 31 illustrates an information hub format provided by embodiments of the present invention.

As will be appreciated, the CADfusion™ system 82 acts as a central hub receiving communications and other information from various CAD systems 80 and passing information and communications to the CAD systems 80. The information passed to the CAD systems 80 is modified so as to be understood and used by the receiving CAD systems 80. This communications arrangement is illustrated in FIG. 31. This communications arrangement is provided by the FATPOT™ messaging infrastructure, Peer Intelligence—Common Exchange. The Common Exchange handles transport-level interfaces to each CAD system 80 as well as basic data conversion and normalization. It also provides for reliable delivery of CADfusion™ messages between the interconnected CAD systems 80. This hub architecture eliminates the need for any point-to-point intelligence on the part of the individual CAD systems 80. Thus, as one CAD system 80 is added to the system, upgraded, or otherwise changed, only interactions between that system and the hub of the CADfusion™ system 82 needs to be updated, created, or modified.

The CADfusion™ system 82 therefore leverages this technology to largely eliminate the need for each individual CAD system 80 to be aware of and maintain information about the other interconnected CAD systems 80. To facilitate interfacing with the CADfusion™ system 82, the CAD systems 80 support the basic functions of the CADfusion™ system 82. These functions include, but are not limited to (each function includes whether it is directed from the CAD system 80 to the CADfusion™ system 82 or vice-versa): 1) post a CAD call—to CADfusion™, 2) post a unit—to CADfusion™, 3) correlate/subscribe to a CAD call—to CADfusion™, 4) close/unsubscribe to a CAD call—to CADfusion™, 5) post a message—to CADfusion™, 6) send a CAD call—from CADfusion™, 7) send unit status—from CADfusion™, and 8) send message—from CADfusion™. Beyond an initial setup within each CAD system 80 to define external resources and mapping of data items as discussed above, the CADfusion™ system 82 and methods intelligently handle all other information exchange between the interconnected CAD systems 80.

Because the entire state of the interconnected CAD systems 80 is maintained by the CADfusion™ system 82, state transition logic or business rules can be configured for the different agency policies. In this way, the agencies' standard operating environments are modeled. In some instances, processing certain business rules requires information from previous states and decisions. The CADfusion™ system 82 retains this perspective and makes it available as input to future business rule execution.

The CADfusion™ system 82 has a rich set of CAD-to-CAD transactions built in that can be configured through system-level parameters to deliver a customized operating environment based on customer requirements. However, because the CADfusion™ system 82 is built on the Peer Intelligence®—Common Exchange platform, it includes a multi-threaded virtual machine execution environment. Each transaction path thus includes multiple interface points for raising special handler events where additional customized business rules can be inserted. These can be written in the FATPOT™ scripting language (FPScript™) or through its plug-in component architecture it can support other methods for handling the event, such as COM objects, DLLs, Python, Web Services, just to name a few.

The CADfusion™ system 82, similar systems, and the accompanying methods seek to provide maximum interoperability and integration between disparate interconnected CAD systems 80. However, the maximum extent of interoperability between any two CAD systems 80 is largely defined by the common thread of the collective capabilities of the CAD systems 80 at issue. Thus, the scope of operations and the range of information that can be shared through the CADfusion™ system 82 is limited by the robustness of interfaces for the CAD systems 80. The following list of operations represents a desirable baseline of common capabilities to facilitate interoperability between CAD systems 80. CAD systems 80 lacking some of these capabilities will not experience all the benefits of the CADfusion™ system 82 and methods, although additional operations and capabilities are also supported by the CADfusion™ system 82.

1) Call Creation: CAD call creation and forwarding to one or more agencies is a desirable feature regardless of the CAD system 80 being used. CAD call creation and forwarding is in real time.

2) Call Updates: The ability to provide CAD call updates (supplements) to one or more agencies regardless of the CAD system 80 being used is also desirable. Supplements and updates are also in real time.

3) Assistance Requests: Enabling CAD assistance requests (e.g. mutual aid, automatic aid, etc.) for defined external resources is a desirable feature. Examples of these include a physical one-to-one mapping and a dynamic logical mapping resolved (bound) at the time of the request, as discussed above. This feature includes the ability to view and receive resource status updates on auto and mutual aid responses for all mapped resources and related agency systems.

4) Messaging: Allowing messaging between dispatch centers (public safety answering points (PSAPs)) and field units (or individuals) is desirable, regardless of which CAD system 80 and/or mobile system each dispatch center and/or unit is using. As one example standard text messaging formats are available between all users. Priority messaging is supported in some embodiments.

5) Alerting: Providing real-time alerting to workstations and field units (or individuals) is also desirable. In some embodiments, this includes a simulcast and alert to both police and fire agencies/units about a hazardous condition that may exist.

6) Unit Status and Automatic Vehicle Location (AVL) Information: Sharing unit status and AVL data between interconnected CAD systems 80 is beneficial. Example data elements have been or will be discussed.

7) Monitoring: Monitoring all call incident activity and unit status changes to be able to provide a common operating picture from all external agencies is also beneficial.

As discussed above, the CADfusion™ system 82 is not limited to these operations. As demand for more sophisticated levels of interoperability increases and as the capability of the interconnected CAD systems 80 and the interfaces of the CAD systems 80 evolve to meet that demand, the number of operations and amount of information exchange will increase. The CADfusion™ system 82 supports and will handle this expansion of capabilities.

Figure 32:
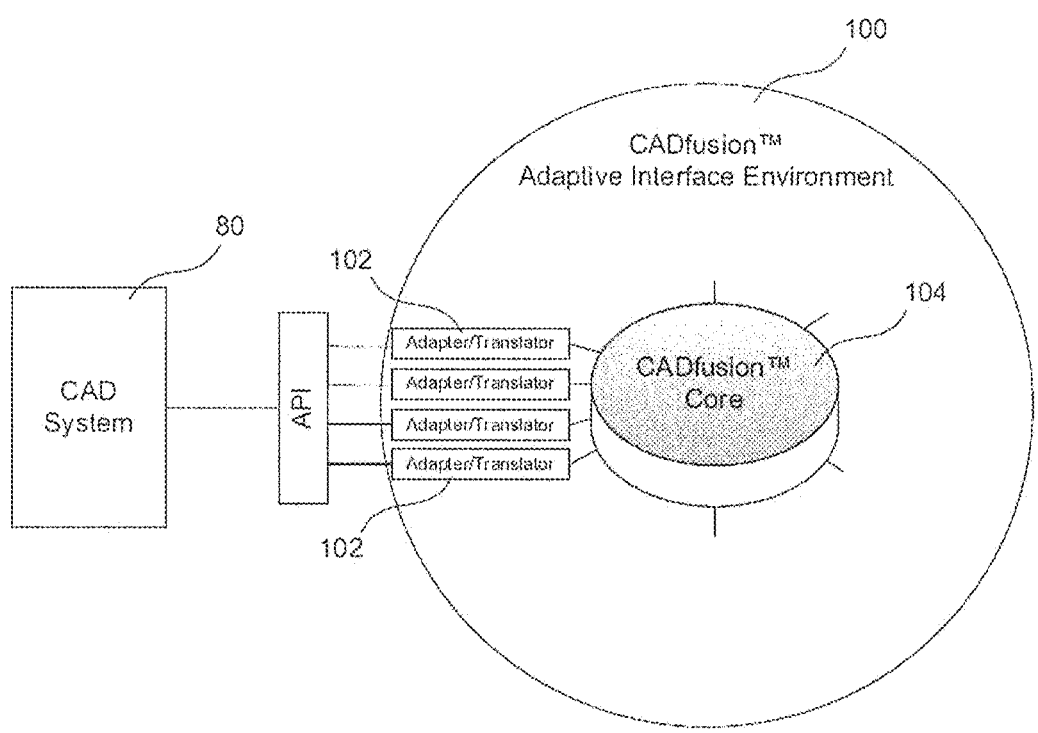
FIGS. 32 and 33 illustrate an adaptive interface environment for use with embodiments of the present invention.
Figure 33:
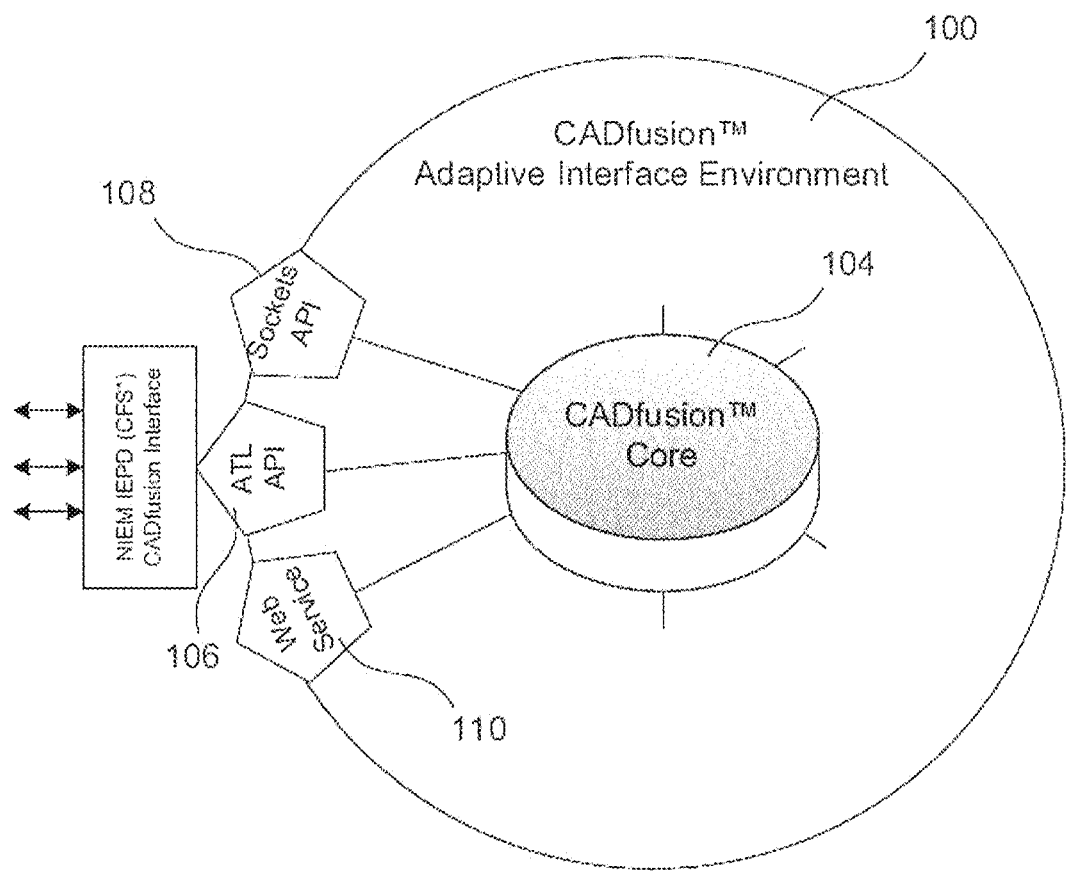

The CADfusion™ system 82 is designed to compensate for deficiencies in CAD system interfaces, as not all CAD systems 80 have equal capabilities or have capabilities that match the capabilities of the CADfusion™ system 82. FATPOT has created an adaptive interface environment (AIE 100) to address this need, as is illustrated in FIG. 32. Leveraging the Peer Intelligence®—Common Exchange platform to provide a flexible execution environment, adapters and translators 102 are developed to interface with each individual CAD system interface and its inherent capabilities. One of the purposes of the AIE 100 is to present a core 104 of the CADfusion™ system 82 a consistent functional CAD-to-CAD interface on which it can rely.

Where CAD system interface limitations exist, the AIE 100 provides a mechanism for overcoming those limitations. The Common Exchange also provides support for a variety of transport-level interfaces to the target CAD system 80. As illustrated in FIG. 33, the architecture also includes object-based interface mechanisms such as active template library-based application programming interfaces (ATL APIs 106), socket-based APIs 108, and web service APIs 110 that can be used to create dynamically-loadable interfaces to support emerging industry standards such as National Information Exchange Model (NIEM), or CAD-vendor-specific interfaces that have been developed specifically for the CADfusion™ system 82 and methods.

One capability of the CADfusion™ system 82 is the ability to respond to failures, outages, or disconnects that affect the ability of the system to communicate with one of its components. A failure, outage, or disconnect may be caused by a power or network failure, or it may result from a system or software failure of one of the CAD systems, or even a failure of the CADfusion™ system 82 itself. Upon such an event, the individual components are capable of recognizing a failure and switching over to either a limited operation mode or to a manual mode.

In a limited operation mode, the CADfusion™ system 82, continues to provide bi-directional interoperability between the remaining interconnected components, and interactions between such interconnected components is unaffected by the unavailability of the other component. The CADfusion™ system 82 detects the unavailability of the unavailable component and notifies other systems of the unavailability. Notification of a component's unavailability during active transactions on a shared incident serves as an alert to no longer rely on the CADfusion™ system 82 for communication and coordination with the unavailable system. Communication with the unavailable system is then handled manually.

If a single component (e.g. CAD system) becomes isolated from the CADfusion™ system 82 or CADfusion™ environment due to a failure, it is notified by its system-resident CADfusion™ interface that communication with the CADfusion™ system 80/environment has ceased. The operators of the component/CAD system will then know to handle communications with any other component of the environment manually.

The CADfusion™ system 82 continues to monitor the availability of all systems, and upon restoration of a disconnected or otherwise unavailable component, the CADfusion™ system 82 requests a complete refresh of all active data. In the case of a failure of the CADfusion™ system 82, the CADfusion™ system 82 reconnects to all CADfusion™ components upon its restoration and requests a complete refresh of all active data. The CADfusion™ system 82 then attempts to correlate and update all participating components on the status of shared resources and call information. This is facilitated by a global call index (GCI) for each active CAD incident.

Transactions with a GCI are easily correlated across the various CADfusion™ components allowing the entire environment to be resynchronized for those incidents. In addition, components that may have been operating manually for a period of time due to a failure may have created CAD incidents that do not have an associated GCI. In at least some embodiments, the CADfusion™ system 82 does not attempt to synchronize related transactions that were created manually, but allows the incidents to play out manually to termination. The creation of any new CAD incidents subsequent to the reconnection receive a GCI from the CADfusion™ system 82 and are automatically synchronized across all participating components.

FIGS. 34-39 illustrate the flow of representative processes occurring upon failures, outages, disconnects, or other isolations of one or more CADfusion™ components and/or connected CAD systems. In each of FIGS. 34-39, the steps of the processes are illustrated numerically, with smaller-numbered steps typically (although not necessarily in all embodiments) occurring before larger-numbered steps, and with columns illustrating where the processing occurs (e.g. at the CADfusion™ system 82, or at one or more of the CAD agencies). In FIGS. 34-39, downward vertical flow generally represents forward progression in time. The processes illustrated in FIGS. 34-39 are intended to be illustrative, and embodiments of the invention embrace other processes to deal with failures, outages, disconnects, and other isolations of the CADfusion™ system 82 or connected CAD systems.

In FIGS. 34-39, "manual" methods, negotiations, etc. (also "manually") refer to methods of sharing resources and calls between CAD systems and keeping disparate CAD systems aware of shared resources and calls without full utilization and synchronization provided to all the CAD systems by the CADfusion™ system 82. "Manual" and "manually" in the intended sense embraces fully manual methods that may be used when computer systems of one or more individual CAD systems is non-functional (e.g. power outage, computer failure, etc.) as well as fully- or partially-computer-aided methods with one or more manual (non-computer synchronized) steps occurring between CAD systems.

FIG. 34 illustrates processes that may occur when an agency CAD system experiences a disconnect (for whatever reason) and illustrates what may occur with potentially-shared resources. After one agency's system is disconnected from the CADfusion™ system 82, other agencies are notified and the CADfusion™ system 82 changes the resource status of potentially-shared resources of the disconnected agency to "link down" or some other identifier recognizing the unknown status of the resources, but only does this as to resources not currently assigned to other agencies' calls. The disconnected agency manually creates and/or tracks its calls and resources, even if loaned to other agencies, while the still-connected agencies negotiate with the disconnected agency manually and still forward updates of prior-assigned resources/calls to the CADfusion™ system 82. The CADfusion™ system 82 keeps tracking calls with GCIs in the event that other agencies are added to the calls (i.e. it maintains synchronization between still-connected CAD systems).

Upon reconnection of the disconnected agency, the disconnected agency refreshes the CADfusion™ system 82 with active information and the CADfusion™ system 82 correlates all information possible. In this embodiment, active calls without GCIs are not forwarded to other agencies or given GCIs, but are allowed to complete manually. When all manual processing is complete, synchronization resumes for calls, and all new calls are synchronized normally from the time of reconnect.

FIGS. 35 and 36 illustrate processes that may occur when an agency CAD system experiences a disconnect after loaning a resource to an agency that remains connected to the CADfusion™ system 82. In this instance, the CADfusion™ system 82 changes "ownership" of the borrowed resource to the borrowing agency that is still connected, and receives and synchronizes updates from the borrowing agency. Upon reconnection of the loaning agency, the CADfusion™ system 82 determines whether the reconnecting system still has a valid GCI for the loaned/borrowed resource. If (FIG. 35) the reconnecting system still has a valid GCI, the CADfusion™ system 82 correlates all call information and the most current resource status, notifies all parties, and changes resource "ownership" back to the loaning agency, and operations proceed as normally before the disconnect.

If, however (FIG. 36), the reconnecting system does not still have a valid GCI, the CADfusion™ system 82 does not retransfer "ownership" of the resource to the loaning agency and does not re-transfer GCI call information to the loaning agency. Thus, even if the loaned resource is returned (manually) to the loaning agency and the loaning agency reports an "available" status to the CADfusion™ system 82, the CADfusion™ system 82 ignores the status update until the borrowing agency (as "owner" of the resource) releases the resource and closes the call. Thereupon, the CADfusion™ system 82 returns "ownership" of the resource to the loaning agency and forwards any status(es) reported by the loaning agency.

FIGS. 37 and 38 illustrate processes that may occur when an agency CAD system experiences a disconnect after borrowing a resource from an agency that remains connected to the CADfusion™ system 82. In this instance, the CADfusion™ system 82 notifies the loaning agency of the disconnect, but does not change ownership from the loaning agency. Synchronization between the loaning agency and the borrowing agency occurs manually, but as loaning agency is still connected to the CADfusion™ system 82, the CADfusion™ system 82 receives and updates resource status of GCIs from the loaning agency as they are entered by the loaning agency. Upon reconnection of the borrowing agency, the CADfusion™ system 82 determines whether the reconnecting system still has a valid GCI for the borrowed resource. If (FIG. 37) the reconnecting system still has a valid GCI, the CADfusion™ system 82 correlates all call information and the most current resource status (as reported by the loaning agency), and notifies the borrowing agency of the current status. Thereupon, operations proceed as normally, with status updates from any agency being reflected to all through the CADfusion™ system 82.

If, however (FIG. 38), the reconnecting system does not still have a valid GCI, the CADfusion™ system 82 does not forward updates previously or later received from the loaning agency, but instead transfers a resource status of "unavailable" to the borrowing agency. Similarly, the CADfusion™ system 82 ignores attempts of the borrowing agency to update the status of the resource, and allows manual handling to continue. When the loaned resource is returned to the loaning agency and the loaning agency reports that the resource is available (and thus closes the call/GCI), the CADfusion™ system 82 then forwards the resource status as reported to the borrowing agency, and synchronization proceeds normally as before the disconnect occurred.

FIG. 39 illustrates processes that occur from the perspective of an isolated CAD system (either upon disconnect of the CAD system from the CADfusion™ system 82 or upon failure of the CADfusion™ system 82). The local CAD system interface notifies dispatchers of the disconnect and monitors for reconnect. Processing of aid sharing and resource sharing for new and existing calls proceeds manually, and the local CAD system maintains "ownership" of all local resources and updates resource statuses to borrowing agencies manually. The local CAD system also utilizes placeholders for external resources to track status changes manually.

When the CADfusion™ system 82 becomes available again, it issues a reconnection request, whereupon the local CAD system reconnects to the CADfusion™ system 82 and refreshes the CADfusion™ system 82 with active information. The CADfusion™ system 82 correlates all call information and the most current resource status information. All active calls without GCIs are not forwarded to other agencies, but are allowed to complete manually in this embodiment. The CADfusion™ system 82 also updates the reconnected CAD system with the most current information.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

We claim:

1. A method for dynamically integrating disparate computer-aided dispatch systems over a global computer network, the method comprising:
    providing a common exchange information hub;
    communicatively connecting (i) a first computer-aided dispatch system comprising a first data element and (ii) a second computer-aided dispatch system comprising a second data element to the hub through the global computer network;
    receiving the first data element and the second data element at the hub;
    identifying a common data element of the first data element and the second data element, wherein the common data element represents a shared data aspect between the first data element and the second data element;
    mapping the first data element to the common data element;
    mapping the second data element to the common data element;
    maintaining the mapping of the first data element to the common data element at the hub;
    maintaining the mapping of the second data element to the common data element at the hub; and
    enabling communication between the first and second computer-aided dispatch systems through the hub by transforming first information from the first computer-aided dispatch system having a first definition into second information understood at the second computer-aided dispatch system as having a second definition by:
        using the mapping of the first data element to the common data element and the mapping of the second data element to the common data element to:
            transform at the hub the first information to the second information when communicating from the first computer-aided dispatch system to the second computer-aided dispatch system through the hub; and
            transform at the hub the second information to the first information when communicating from the second computer-aided dispatch system to the first computer-aided dispatch system through the hub.

2. The method of claim 1, wherein the hub comprises multiple master nodes that comprise peer members of an indexing network, and wherein the master nodes comprise clones of each other such that when one master node is made aware of a piece of data that master node replicates such piece of data to such mater nodes peer master nodes.

3. The method of claim 2, wherein the master nodes provide an interface to lookup a location of a known data records matching an input indexable criterion.

4. The method of claim 1, further comprising:
    updating the second information from the second computer-aided dispatch system;
    transforming at the hub, the updated second information into updated information that is configured to be understood at the first computer-aided dispatch system; and
    sending the updated information that is configured to be understood at the first computer-aided dispatch system to the first computer-aided dispatch system.

5. The method of claim 1, wherein the first data element is different than the second data element.

6. The method of claim 1, further comprising:
    updating the second information from the second computer-aided dispatch system;
    referencing at the hub the mapping of the first data element to the common data element and a mapping of the updated second information to determine whether the mapping of the updated second information comprises the common data element, and not providing the updated second information to the first computer-aided dispatch where the mapping of the updated second information comprises the common data element.

7. The method of claim 1, further comprising:
updating the second information from the second computer-aided dispatch system;
referencing at the hub the mapping of the first data element to the common data element and a mapping of the updated second information to determine whether the mapping of the updated second information comprises the common data element, and
providing a translated version of the updated second information to the first computer-aided dispatch where the mapping of the updated second information does not comprise the common data element.

8. The method of claim 1, further comprising resolving a disconnect of the first computer-aided dispatch system and selectively synchronizing updated information with the first computer-aided dispatch system.

9. A method for dynamically integrating disparate computer-aided dispatch systems over a global computer network, the method comprising:
providing a common exchange information hub;
communicatively connecting: (i) a first computer-aided dispatch system comprising a first data element and (ii) a second computer-aided dispatch system comprising a second data element to the hub through the global computer network;
receiving the first data element and the second data element at the hub;
identifying a common data element of the first data element and the second data element, wherein the common data element represents a shared data aspect between the first data element and the second data element;
mapping the first data element to the common data element;
mapping the second data element to the common data element;
maintaining the mapping of the first data element to the common data element at the hub;
maintaining the mapping of the second data element to the common data element at the hub;
receiving through the network and at the hub a communication from the first computer-aided dispatch system with the first data element being associated with the communication;
referencing at the hub the mapping of the first data element to the common data element and the mapping of the second data element to the common data element to link the first data element with the second data element;
transforming the first data element into the second data element; and
forwarding the communication and the second data element to the second computer-aided dispatch system.

10. The method of claim 9, wherein the hub comprises multiple master nodes that comprise peer members of an indexing network, wherein the master nodes comprise clones of each other such that when one master node is made aware of information that master node replicates such information to its peer master nodes, and wherein the master nodes provide an interface to lookup a location of a known data record matching an input indexable criterion.

11. The method of claim 9, wherein the communication is maintained with the first computer-aided dispatch system when the communication is forwarded to the second computer-aided dispatch system.

12. The method of claim 11, further comprising assigning a global call identifier to the communication, and wherein the communication is used in conjunction with the global call identifier at both the first and the second computer-aided dispatch systems.

13. The method of claim 9, further comprising receiving through the network, at the hub, and from the second computer-aided dispatch system an update to the second data element; and referencing at the hub a mapping of the updated second data element to determine whether the mapping of the updated second data element comprises the common data element of the first data element and the second data element.

14. The method of claim 13, further comprising not providing the first computer-aided dispatch system with the updated second data element when the hub determines that the mapping of the updated second data element comprises the common data element of the first data element and the second data element.

15. The method of claim 13, further comprising providing the first computer-aided dispatch system with the updated second data element when the hub determines that the mapping of the updated second data element comprises the common data element of the first data element and the second data element.

16. The method of claim 9, further comprising providing a real-time communication channel between the first and second computer-aided dispatches and through the hub.

17. The method of claim 16, wherein the real-time communication channel comprises at least one of: (i) a chat room, (ii) paging, (iii) mapping, and (iv) cellular communication.

18. The method of claim 9, further comprising associating a resource from at least one of the first and second computer-aided dispatch systems with the communication, and providing a depiction of the resource on a map to each of the first and second computer-aided dispatch systems.

19. The method of claim 9, further comprising dynamically identifying a user assigned to the communication and including such user into a communication environment associated with the communication.

20. A system for implementing a method for integrating disparate computer-aided dispatch systems over a global computer network, the system comprising:
a processor;
an information hub;
a first computer-aided dispatch system; and
a second computer-aided dispatch system, wherein the first and second computer-aided dispatch systems respectively comprise a first data element and a second data element,
wherein the first and second computer-aided dispatch systems are communicatively connected to the information hub through the global computer network, and wherein the information hub is configured to:
identify a common data element of the first data element and the second data element, wherein the common data element represents a shared data aspect between the first data element and the second data element; map the first data element to the common data element;
map the second data element to the common data element;
maintain the mapping of the first data element to the common data element at the hub; maintain the mapping of the second data element to the common data element at the hub; and enable communication between the first and second computer-aided dispatch systems through the hub by transforming first information from the first computer-aided dispatch system having a first definition into second information understood at the second computer-aided dispatch system as having a second definition by:

using the mapping of the first data element to the common data element and the mapping of the second data element to the common data element to:

transform at the hub the first information to the second information when communicating from the first computer-aided dispatch system to the second computer-aided dispatch system through the hub; and transform at the hub the second information to the first information when communicating from the second computer-aided dispatch system to the first computer-aided dispatch system through the hub.

21. The system of claim 20, wherein the hub comprises multiple master nodes that comprise peer members of an indexing network, wherein the master nodes comprise clones of each other such that when one master node is made aware of a piece of data that master node replicates such piece of data to that master node's peer master nodes, and wherein the master nodes provide an interface to lookup a location of a known data record matching an input indexable criterion.

22. A system for implementing a method for integrating disparate computer-aided dispatch systems over a global computer network, the system comprising:

a memory;

an information hub;

a first computer-aided dispatch system; and a second computer-aided dispatch system, wherein the first and second computer-aided dispatch systems respectively comprise a first data element and a second data element, wherein the first and second computer-aided dispatch systems are communicatively connected to the information hub through the global computer network, and wherein the information hub is configured to:

identify a common data element of the first data element and the second data element, wherein the common data element represents a shared data aspect between the first data element and the second data element; map the first data element to the common data element;

map the second data element to the common data element; maintain the mapping of the first data element to the common data element at the hub; maintain the mapping of the second data element to the common data element at the hub; and enable communication between the first and second computer-aided dispatch systems through the hub by transforming first information from the first computer-aided dispatch system having a first definition into second information understood at the second computer-aided dispatch system as having a second definition by:

using the mapping of the first data element to the common data element and the mapping of the second data element to the common data element to:

transform at the hub the first information to the second information when communicating from the first computer-aided dispatch system to the second computer-aided dispatch system through the hub; and transform at the hub the second information to the first information when communicating from the second computer-aided dispatch system to the first computer-aided dispatch system through the hub.

* * * * *